(12) United States Patent
Abe

(10) Patent No.: US 7,330,291 B2
(45) Date of Patent: Feb. 12, 2008

(54) DITHER MASK CREATING METHOD AND CREATING DEVICE

(75) Inventor: Yoshito Abe, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 958 days.

(21) Appl. No.: 10/468,308

(22) PCT Filed: Mar. 1, 2002

(86) PCT No.: PCT/JP02/01903

§ 371 (c)(1),
(2), (4) Date: Aug. 19, 2003

(87) PCT Pub. No.: WO02/071738

PCT Pub. Date: Sep. 12, 2002

(65) Prior Publication Data

US 2004/0080790 A1    Apr. 29, 2004

(30) Foreign Application Priority Data

Mar. 2, 2001    (JP)    ............... 2001-058613

(51) Int. Cl.
G06K 15/00    (2006.01)

(52) U.S. Cl. ............... 358/3.06; 358/3.11; 358/3.12; 358/3.13; 358/3.14; 358/534; 358/1.9; 345/596; 347/131

(58) Field of Classification Search ............... 358/3.06, 358/3.11, 3.12, 3.13, 3.14, 534, 1.9; 345/596; 347/131
See application file for complete search history.

(56) References Cited

U.S. PATENT DOCUMENTS

| 4,551,768 A | | 11/1985 | Tsuchiya et al. |
| 5,172,248 A | * | 12/1992 | Urabe et al. ............... 358/3.2 |
| 5,204,760 A | * | 4/1993 | Murayama et al. ........ 358/3.03 |

(Continued)

FOREIGN PATENT DOCUMENTS

JP    60-029089    2/1985

(Continued)

OTHER PUBLICATIONS

Abe, Y. "Digital Halftoning for Press Printing" Digital Signal Processing Symposium of Electric Information and Communication Academy Japan (2000).

(Continued)

*Primary Examiner*—Twyler Lamb
*Assistant Examiner*—Jacky X. Zheng
(74) *Attorney, Agent, or Firm*—Ladas & Parry LLP

(57) ABSTRACT

In a computer generation of a dither mask for conversion of a continuous-tone image into a halftone image, a pixel array having a size in accordance with the dither mask is partitioned into blocks. Initial pixel values are determined such that the occurrences of pixel values will be substantially uniform in the blocks. A pair of exchange target pixels are selected at random from the pixels in one of the blocks and function values of a predetermined evaluation function that indicates a characteristic of the pixel value configuration of the pixels in this block are computed for the two cases where pixel values are exchanged among the exchange target pixels and where not exchanged. These function values are compared to judge whether exchange should be performed.

38 Claims, 31 Drawing Sheets

U.S. PATENT DOCUMENTS

| | | | |
|---|---|---|---|
| 5,270,835 A * | 12/1993 | Urabe et al. | 358/3.2 |
| 5,526,438 A | 6/1996 | Barton | |
| 5,586,203 A * | 12/1996 | Spaulding et al. | 382/270 |
| 5,684,932 A * | 11/1997 | Shu | 358/1.9 |
| 5,696,602 A | 12/1997 | Cooper et al. | |
| 5,761,325 A | 6/1998 | Barton | |
| 5,953,459 A * | 9/1999 | Ueda et al. | 382/237 |
| 6,111,658 A * | 8/2000 | Tabata | 358/1.9 |
| 6,134,024 A * | 10/2000 | Miura et al. | 358/1.9 |
| 6,930,800 B1 * | 8/2005 | Adachi et al. | 358/3.13 |

FOREIGN PATENT DOCUMENTS

| | | |
|---|---|---|
| JP | 7-170400 | 7/1995 |
| JP | 7-177351 | 7/1995 |
| JP | 9-130608 | 5/1997 |
| JP | 9-275493 | 10/1997 |
| JP | 11-146203 | 5/1999 |

OTHER PUBLICATIONS

Abe, Y. "Ordered Dither Matrix Design Method for Artistic Screening" Workshop in Circuit and System, Karuizawa, Japan (2001).

Abe. Y. "Digital Halftoning with Optimized Dither Array" Proc. IEEE ISCAS 2001, Sydney (2001).

Abe, Y. "Optimization of Dither Matrix by Simulated Annealing" Symposium of Japan Picture Academy (2001).

* cited by examiner

| 5 | 6 | 8 | 6 |
|---|---|---|---|
| 5 | 15 | 14 | 7 |
| 13 | 3 | 10 | 9 |
| 10 | 1 | 10 | 0 |

PIXEL VALUE P — 13

$0 \leq P \leq 15$

| 11 | 0 | 9 | 13* |
|---|---|---|---|
| 3 | 6 | 12 | 14 |
| 13 | 4 | 10 | 7 |
| 5 | 2 | 8 | 1 |

PIXEL VALUE T — 13

$0 \leq T < 15$

PIXEL VALUE Q

"0" : BLACK
"1" : WHITE

WHEN P > T, Q = "1"
WHEN P ≤ T, Q = "0"

P(i,j)

Fig.13A
| 12 | 4  | 8 | 13 |
|----|----|---|----|
| 11 | 0  | 1 | 5  |
| 7  | 3  | 2 | 9  |
| *  | 10 | 6 | 14 |
Fig.13B
| 5  | 9  | 6  | 10 |
|----|----|----|----|
| 13 | 1  | 14 | 2  |
| 7  | 11 | 4  | 8  |
| *  | 3  | 12 | 0  |
Fig.14A
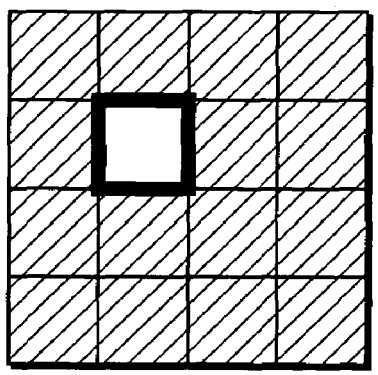
Fig.14B
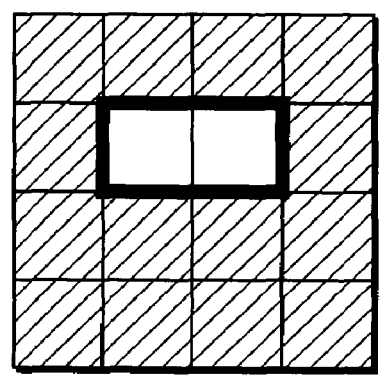
Fig.14C
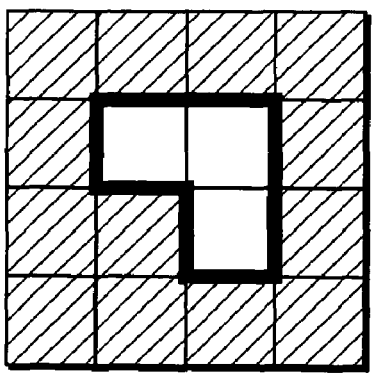
Fig.14D
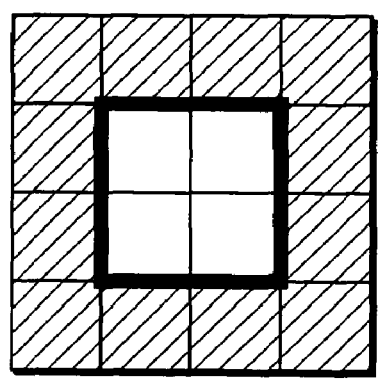

DIFFERENCE IN REGARD TO DIRECTION ①

$$\left|2f(i,j) - f(i-1,j) - f(i+1,j)\right|$$

DIFFERENCE IN REGARD TO DIRECTION ②

$$\left|2f(i,j) - f(i,j-1) - f(i,j+1)\right|$$

DIFFERENCE IN REGARD TO DIRECTION ③

$$\left|2f(i,j) - f(i-1,j-1) - f(i+1,j+1)\right|$$

DIFFERENCE IN REGARD TO DIRECTION ④

$$\left|2f(i,j) - f(i+1,j-1) - f(i-1,j+1)\right|$$

TOTAL SUM OF ABSOLUTE VALUES OF DIFFERENCES BETWEEN PIXEL VALUE $f(i,j)$ AND PIXEL VALUES OF NEAR PIXELS $$\sum_{k=-2,\ m=-2}^{2,\ 2} \left| f(i,j) - f(i+k, j+m) \right|$$

DITHER MASK CREATING METHOD AND CREATING DEVICE

TECHNICAL FIELD

This invention concerns a method and a device for generating a dither mask to be used in the conversion of a continuous-tone image to a halftone image, and in particular, concerns an art by which the respective pixel values of a pixel array that makes up a dither mask of desired characteristics are determined by computer computation using random numbers.

BACKGROUND ART

In offset printing, etc., printing must be performed after converting a continuous-tone image to a halftone image. This is because whereas a continuous-tone image (full-tone image) is an image with gray scale information of continuous tones, in ordinary offset printing, etc., one cannot use a plurality of types of inks that differ in concentration in accordance with the gray scale information. A halftone image is basically a binary image in which parts to which ink is to be attached and parts to which ink is not to be attached are distinguished, and it is thus suited for offset printing, etc. However, even in the case where a continuous-tone image, which has been given as an original image, is converted into a halftone image, the gray scale information must be expressed as the area ratios or densities of halftone dots in the halftone image in order to maintain the gray scale information expressed in the original image. Consequently, the halftone image that is obtained can be a pseudo-tone image (pseudo-gray-scale image) that expresses the continuous tones in a simulated manner.

Generally for conversion of a continuous-tone image, which has been provided as an original image, into a half-tone image while maintaining the gray scale information, a halftone mask, called an "AM screen," is used. This AM screen is a screen for literally performing amplitude modulation of the tone information (gray scale information) possessed by the continuous-tone image and enables conversion in a manner such that the pixel values of the original image are reflected in the areas of halftone dots and halftone images are obtained which comprise halftone dots that are periodic and clustered. In actual form, an AM screen is an aggregation of data comprising a two-dimensional pixel array and the process of conversion from a continuous-tone image to a halftone image is executed by a computing process by a computer that uses these data. A "halftone mask" comprising two-dimensional pixel array data is called a "screen" since it is analogous in function to a contact screen used in traditional photolithography.

Meanwhile, recently, "halftone masks," by which halftone images with a dispersed type halftone dot configuration can be obtained, have come to be used and a form of image processing called the FM screening process has come to be carried out. Though the "halftone mask" used in such applications has generally been called a "threshold matrix", "dither matrix", "dither mask", etc., in actual form, the mask is, yet again, data comprising a two-dimensional pixel array. Dither masks that are called "art screens," in which special design patterns are embedded, have also come to be used. When a conversion process using such an art screen is applied, a continuous-tone image, which is provided as an original image, is modulated by the design pattern, which is embedded in the art screen, to provide a special effect such that the halftone image appears to be embossed with the design pattern.

Though such two-dimensional pixel array data used for conversion of a continuous image into a halftone image by a computational process by a computer are called in various ways, for example, "halftone mask", "AM screen", "FM screen", "threshold matrix", "dither matrix", "dither mask", "art screen", etc., the unified term, "dither mask" shall be used in the present specification. That is, in this specification, "dither mask" shall refer widely to two-dimensional pixel array data used for conversion of a continuous image into a halftone image by a computational process carried out by a computer.

Though various methods have been proposed for generating such a dither mask, each carries problems to be solved. For example, though the type of dither mask that is generally referred to as an "AM screen" enables a halftone image having periodic and clustered halftone dots as mentioned above, there is a problem that unnatural texture, moire pattern or Rosette pattern is observed. In the type of dither mask that is generally called an "FM screen", though the above problem will not occur since the periodicity of halftone dots can be eliminated, the occurrences of such problems as poor transfer of ink, lowering of the reproducibility of the gray scale characteristics of the original image, etc., have been indicated. Furthermore, with the type of dither mask that is generally called an "art screen," since there is a need to embed a special design pattern, the procedure for generation is complicated and requires much labor and time.

Thus an object of this invention is to provide a dither mask generation method and generation device by which a dither mask of the desired characteristics can be prepared in accordance with practical application, and a further object of this invention is to provide dither masks generated by such a generation method, and to provide high-quality halftone images and printed objects prepared use of such dither masks.

DISCLOSURE OF INVENTION (1) The first feature of the present invention resides in a method of generating a dither mask which is used for conversion of a continuous-tone image into a halftone image, the method comprising the steps of:

a preparation step for defining a pixel array having a size in accordance with a dither mask to be generated and partitioning the pixel array into a plurality of blocks;

an initial pixel value determination step for determining an initial pixel value for respective pixels which are members of the pixel array, in a manner such that frequencies of occurrence of pixel values within a predetermined numerical value range that is required by the dither mask become substantially uniform in each individual block;

a function value computation step for selecting a plurality of exchange target pixels at random from among pixels in a single block and computing function values of a predetermined evaluation function that indicates a characteristic of a pixel value configuration of pixels in the single block for two cases of performing exchange of pixel values among the plurality of exchange target pixels and not performing the exchange;

an exchange judgment step for judging whether or not the exchange of pixel values among the plurality of exchange target pixels should be performed by comparing the function values for the two cases; and a pixel value exchange step for performing a process of the exchange of pixel values among the plurality of exchange target pixels, when it has been judged in the exchange judgment step that the exchange should be performed;

wherein the function value computation step, the exchange judgment step and the pixel value exchange step are executed repeatedly for all blocks until a predetermined condition is met and the dither mask is generated by pixel values of the pixel array that is finally obtained.

(2) The second feature of the present invention resides in a method of generating a dither mask according to the first feature, wherein:

in the exchange judgment step, a judgment that exchange should be performed is made if a function value of the evaluation function approaches a predetermined target value as a result of performing the exchange, and if a function value of the evaluation function does not approach a predetermined target value as a result of performing the exchange, a judgment that exchange should be performed is made based on a predetermined exchange probability and the exchange probability is decreased in accordance with the number of times of repetitions.

(3) The third feature of the present invention resides in a method of generating a dither mask according to the first feature, wherein:

an initial value of a temperature parameter Tn (0<Tn) and a temperature decrease factor α (0<α<1) are set in advance, a process of renewing a value of the temperature parameter Tn with a new value of Tn×α is performed each time the number of repetitions increases, and the exchange probability P is determined by the formula of P=exp(−|ΔE|/Tn), where ΔE is a difference in function values for the two cases.

(4) The fourth feature of the present invention resides in a method of generating a dither mask according to the first to the third features, wherein:

a function, which indicates a difference of pixel values of a plurality of pixels that are positioned near each other, is used as the evaluation function and exchange judgment is made based on whether or not a function value approaches a target value of 0 as a result of the exchange.

(5) The fifth feature of the present invention resides in a method of generating a dither mask according to the fourth feature, wherein:

a function, which determines "an absolute value of a difference between pixel values of a noted pixel and another pixel adjacent the noted pixel" for each of all pixels within a single block as being a noted pixel and then indicates a sum of determined values, is used as the evaluation function.

(6) The sixth feature of the present invention resides in a method of generating a dither mask according to the fourth feature, wherein:

a function, which determines "an absolute value of two-dimensional Laplacian for a pixel in the case where a pixel value configuration within a single block is expressed by a function f(x, y) in a two-dimensional xy-coordinate system" for each of all pixels within a single block and then indicates a sum of determined values, is used as the evaluation function.

(7) The seventh feature of the present invention resides in a method of generating a dither mask according to the fourth feature, wherein:

a two-dimensional xy-coordinate system having an x-axis and a y-axis as coordinate axes is defined on the pixel array and a function, which determines "with respect to a noted pixel, a sum of absolute values of one-dimensional Laplacians for four axial directions of the x-axis direction, the y-axis direction, and two axial directions that form a 45° angle with respect to the coordinate axes" for each of all pixels within a single block and then indicates a total sum of determined sums, is used as the evaluation function.

(8) The eighth feature of the present invention resides in a method of generating a dither mask according to the seventh feature, wherein:

a function expressed by the following formula is used as the evaluation function:

$$E = \Sigma_{i=0 \text{ to } I-1, j=0 \text{ to } J-1}$$

$$|2f(i, j) - f(i-1, j) - f(i+1, j)| +$$
$$|2f(i, j) - f(i, j-1) - f(i, j+1)| +$$
$$|2f(i, j) - f(i-1, j-1) - f(i+1, j+1)| +$$
$$|2f(i, j) - f(i+1, j-1) - f(i-1, j+1)|$$

wherein

E: function value of the evaluation function

I: total number of rows of a pixel array that makes up a single block

J: total number of columns of the pixel array that makes up the single block i: row number of a noted pixel in the single block (0, 1, 2, . . . , I−1)

j: column number of the noted pixel in the single block (0, 1, 2, . . . , J−1)

f(i, j): pixel value of a pixel of i-th row and j-th column.

(9) The ninth feature of the present invention resides in a method of generating a dither mask according to the first to the third features, wherein:

a function, which indicates a difference of pixel values of a plurality of pixels that are positioned near each other, is used as the evaluation function and exchange judgment is made based on whether or not a function value approaches a target value of ∞ as a result of the exchange.

(10) The tenth feature of the present invention resides in a method of generating a dither mask according to the ninth feature, wherein:

a function, which determines "an absolute value of a difference between pixel values of a noted pixel and another pixel positioned near the noted pixel" for each of all pixels within a single block as being a noted pixel and then indicates a sum of determined values, is used as the evaluation function.

(11) The eleventh feature of the present invention resides in a method of generating a dither mask according to the tenth feature, wherein:

a function, which defines, for a noted pixel, a plurality of near pixels that are positioned near the noted pixel, determines "a sum of absolute values of differences between pixel values of the noted pixel and the near pixels," for each of all pixels within a single block as being a noted pixel, and then indicates a total sum of determined sums, is used as the evaluation function.

(12) The twelfth feature of the present invention resides in a method of generating a dither mask according to the eleventh feature, wherein:

a function expressed by the following formula is used as the evaluation function:

$$E = \Sigma_{i=0 \text{ to } I-1, j=0 \text{ to } J-1} \Sigma_{k=-q \text{ to } q, m=-q \text{ to } q} |f(i,j) - f(i+k, j+m)|$$

wherein

E: function value of the evaluation function

I: total number of rows of a pixel array that makes up a single block

J: total number of columns of the pixel array that makes up the single block i: row number of a noted pixel in the single block (0, 1, 2, . . . , I−1)

j: column number of the noted pixel in the single block (0, 1, 2, . . . , J−1)

k: separation from the noted pixel in the row direction (number of pixels)

m: separation from the noted pixel in the column direction (number of pixels)

q: parameter that sets a range of near pixels (number of pixels)

f(i, j): pixel value of a pixel of i-th row and j-th column.

(13) The thirteenth feature of the present invention resides in a method of generating a dither mask according to the eleventh feature, wherein:

a function expressed by the following formula is used as the evaluation function:

$$E=\Sigma_{i=0 \text{ to } I-1, j=0 \text{ to } J-1} \Sigma_{k^2+m^2 \leq r^2} |f(i,j)-f(i+k, j+m)|$$

wherein

E: function value of the evaluation function

I: total number of rows of a pixel array that makes up a single block

J: total number of columns of the pixel array that makes up the single block i: row number of a noted pixel in the single block (0, 1, 2, . . . , I−1)

j: column number of the noted pixel in the single block (0, 1, 2, . . . , J−1)

k: separation from the noted pixel in the row direction (number of pixels)

m: separation from the noted pixel in the column direction (number of pixels)

r: parameter that sets a range of near pixels f(i, j): pixel value of a pixel of i-th row and j-th column $\Sigma k^2+m^2 \leq r^2$ indicates a total sum concerning pixels within a circular region of radius r.

(14) The fourteenth feature of the present invention resides in a method of generating a dither mask according to the first to the third features, wherein:

a function, which indicates a difference of a pixel value configuration in a single block that makes up the dither mask and a pixel value configuration of a priorly prepared primitive design image, is used as the evaluation function and exchange judgment is made based on whether or not a function value approaches a target value of 0 as a result of the exchange.

(15) The fifteenth feature of the present invention resides in a method of generating a dither mask according to the fourteenth feature, wherein:

a primitive design image, which has a same pixel array as a pixel array of a single block that makes up the dither mask, is prepared, an absolute value of a difference between pixel values of a pair of corresponding pixels at mutually corresponding positions in the respective pixel arrays is determined for all pixels inside the single block and a function that indicates a sum of determined values is used as the evaluation function.

(16) The sixteenth feature of the present invention resides in a method of generating a dither mask according to the fifteenth feature, wherein:

a function expressed by the following formula is used as the evaluation function:

$$E=\Sigma_{i=0 \text{ to } I-1, j=0 \text{ to } J-1} |f(i,j)-g(i,j)|$$

wherein

E: function value of the evaluation function

I: total number of rows of a pixel array that makes up a single block

J: total number of columns of the pixel array that makes up the single block i: row number of a noted pixel in the single block (0, 1, 2, . . . , I−1)

j: column number of the noted pixel in the single block (0, 1, 2, . . . , J−1)

f(i, j): pixel value of a pixel of i-th row and j-th column of the dither mask g(i, j): pixel value of a pixel of i-th row and j-th column of the primitive design image.

(17) The seventeenth feature of the present invention resides in a method of generating a dither mask according to the fourteenth to the sixteenth features, wherein:

in addition to the evaluation function, a function, which indicates a difference of pixel values of a plurality of pixels that are positioned near each other, is used as a sub-evaluation function and whether or not a function value of the sub-evaluation function approaches 0 as a result of the exchange is added as a condition of the exchange judgment.

(18) The eighteenth feature of the present invention resides in a method of generating a dither mask according to the seventeenth feature, wherein:

a function, which determines "an absolute value of a difference between pixel values of a noted pixel and another pixel adjacent the noted pixel" for each of all pixels within a single block as being a noted pixel and then indicates a sum of determined values, is used as the sub-evaluation function.

(19) The nineteenth feature of the present invention resides in a method of generating a dither mask according to the seventeenth feature, wherein:

a function, which determines "an absolute value of two-dimensional Laplacian for a pixel in the case where a pixel value configuration within a single block is expressed by a function f(x, y) in a two-dimensional xy-coordinate system" for each of all pixels within a single block and then indicates a sum of determined values, is used as the sub-evaluation function.

(20) The twentieth feature of the present invention resides in a method of generating a dither mask according to the seventeenth feature, wherein:

a two-dimensional xy-coordinate system having an x-axis and a y-axis as coordinate axes is defined on the pixel array and a function, which determines "with respect to a noted pixel, a sum of absolute values of one-dimensional Laplacians for four axial directions of the x-axis direction, the y-axis direction, and two axial directions that form a 45° angle with respect to the coordinate axes" for each of all pixels within a single block and then indicates a total sum of determined sums, is used as the sub-evaluation function.

(21) The twenty-first feature of the present invention resides in a method of generating a dither mask according to the twentieth feature, wherein:

a function expressed by the following formula is used as the sub-evaluation function:

$$Esub = \Sigma_{i=0 \text{ to } I-1, j=0 \text{ to } J-1}$$

$$|2f(i, j) - f(i-1, j) - f(i+1, j)| +$$
$$|2f(i, j) - f(i, j-1) - f(i, j+1)| +$$
$$|2f(i, j) - f(i-1, j-1) - f(i+1, j+1)| +$$
$$|2f(i, j) - f(i+1, j-1) - f(i-1, j+1)|$$

wherein

Esub: function value of the sub-evaluation function

I: total number of rows of a pixel array that makes up a single block

J: total number of columns of the pixel array that makes up the single block i: row number of a noted pixel in the single block (0, 1, 2, . . . , I−1)

j: column number of the noted pixel in the single block (0, 1, 2, . . . , J−1)

f(i, j): pixel value of a pixel of i-th row and j-th column.

(22) The twenty-second feature of the present invention resides in a method of generating a dither mask according to the twenty-first feature, wherein:

a synthetic evaluation function G=We·E+Ws·Esub (where We and Ws are parameters that indicate weight), which is defined as a linear sum of an evaluation function E and a sub-evaluation function Esub, is used and the exchange judgment is made based on whether or not a function value of the synthetic evaluation function G approaches a target value of 0 as a result of the exchange.

(23) The twenty-third feature of the present invention resides in a method of generating a dither mask according to the first to the twenty-second features, wherein:

in order to generate a dither mask to be used for conversion of a continuous-tone image with W-bit pixel values to a halftone image with 1-bit pixel values, in the preparation step, block partitioning is performed in a manner such that each individual block contains one or a plurality of unit cells with $2^w$ pixels, in the initial pixel value determination step, a total of ($2^w31$ 1) types of pixel values, corresponding to pixel values in a range of 0 to ($2^w-2$) or pixel values in a range of 1 to ($2^w-1$), are made to be respectively written into predetermined positions for ($2^w-1$) pixels among the $2^w$ pixels of each unit cell, and for a remaining odd pixel, any one pixel value among the total of ($2^w-1$) pixel values is made to be written.

(24) The twenty-fourth feature of the present invention resides in a method of generating a dither mask according to the twenty-third feature, wherein:

frequencies of occurrence of pixel values that are respectively written into the odd pixel of each of the plurality of unit cells are made substantially uniform for the total of ($2^w-1$) pixel values.

(25) The twenty-fifth feature of the present invention resides in a method of generating a dither mask according to the twenty-third feature, wherein:

a unit cell comprising a square pixel array in which $2^{w/2}$ pixels are aligned along one side is defined.

(26) The twenty-sixth feature of the present invention resides in a method of generating a dither mask according to the first to the twenty-second feature, wherein:

in order to generate a dither mask to be used for conversion of a continuous-tone image with W-bit pixel values to a halftone image with 1-bit pixel values, in the preparation step, block partitioning is performed in a manner such that each individual block contains one or a plurality of unit cells with ($2^w-1$) pixels, in the initial pixel value determination step, a total of ($2^w-1$) types of pixel values, corresponding to pixel values in a range of 0 to ($2^w-2$) or pixel values in a range of 1 to ($2^w-1$), are made to be respectively written into predetermined positions of each unit cell.

(27) The twenty-seventh feature of the present invention resides in a method of generating a dither mask according to the twenty-sixth feature, wherein:

a unit cell with a rectangular pixel array arrangement having ($2^w-1$) pixels is defined.

(28) The twenty-eighth feature of the present invention resides in a method of generating a dither mask according to the twenty-seventh feature, wherein:

W=8 and a unit cell with a rectangular pixel array arrangement, selected from the group consisting of 1×255, 3×85, 5×51, 15×17, 17×15, 51×5, 85×3, or 255×1, is defined.

(29) The twenty-ninth feature of the present invention resides in a method of generating a dither mask according to the first feature, wherein:

a Simulated Annealing Method is used in making judgment in the exchange judgment step.

(30) The thirtieth feature of the present invention resides in a method of generating a dither mask according to the first feature, wherein:

a process using a Discrete Combinatory Optimization Method, selected from the group consisting of Genetic Algorithms, Great Deluge Algorithm, Ant Colony Algorithm, and Tabu Search Algorithm, is executed to gradually vary a pixel value configuration and make pixel values finally converge.

(31) The thirty-first feature of the present invention resides in a dither mask generating device, which generates a dither mask for conversion of a continuous-tone image into a halftone image, the dither mask generating device comprising:

a mask storage unit which stores a pixel array along with pixel values of individual pixels, the pixel array having a size that is in accordance with the dither mask to be generated;

a block partitioning unit which partitions the pixel array stored in the mask storage unit into a plurality of blocks;

a random number generating unit which has a function of generating predetermined random numbers and executes an initial pixel value determination process, by which for each pixel that is a member of the pixel array, pixel values are allocated randomly in a manner such that frequencies of occurrence of the pixel values within a predetermined numerical value range that is deemed necessary for the dither mask are substantially uniform in each individual block, and an exchange target pixel selection process, by which a plurality of exchange target pixels are selected randomly from among the pixels in a single block;

an evaluation function value computing unit which computes function values of a predetermined evaluation function that indicates a characteristic of a pixel value configuration of the pixels in a single block for two cases of a case where pixel values of the plurality of exchange target pixels are exchanged and a case where exchange is not performed;

an exchange judgment unit which compares function values determined for the two cases by the evaluation function value computing unit to judge whether or not pixel values should be exchanged among the plurality of exchange target pixels;

a pixel value exchange unit which performs a process of exchanging the pixel values among the plurality of exchange target pixels that are stored in the mask storage unit, when the exchange judgment unit makes a judgment that exchange should be performed; and a repetitive process unit which performs control so that a process concerning a pixel exchange for a single block, that are executed by the random number generating unit, the evaluation function value computing unit, the exchange judgment unit, and the pixel value exchange unit, are executed repeatedly until a predetermined condition is satisfied with all blocks.

(32) The thirty-second feature of the present invention resides in a dither mask generating device according to the thirty-first feature, wherein:

a primitive design image storage unit which stores image data that make up a primitive design image, is furthermore equipped and the evaluation function value computing unit computes function values by using an evaluation function that indicates a degree of matching or a difference of an image, which is expressed by pixels in a single block that makes up the dither mask, and the primitive design image.

(33) The thirty-third feature of the present invention resides in an image conversion device which uses a dither mask that has been generated by a dither mask generating method according to the first to the thirtieth features to convert a continuous-tone image into a halftone image.

(34) The thirty-fourth feature of the present invention resides in a program for making a computer execute the respective steps that make up a dither mask generating method according to the first to the thirtieth features and computer-readable recording medium, in which the program is stored.

(35) The thirty-fifth feature of the present invention resides in a computer-readable recording medium, in which is recorded data of a pixel array that makes up a dither mask that has been generated by a dither mask generating method according to the first to the thirtieth features.

(36) The thirty-sixth feature of the present invention resides in a computer-readable recording medium, in which is stored an image data of a halftone image obtained by performing a conversion process on a continuous-tone image using a dither mask that has been generated by a dither mask generating method according to the first to the thirtieth features.

(37) The thirty-seventh feature of the present invention resides in a computer-readable recording medium, in which is stored an image data of a multi-color halftone image obtained by performing a conversion process on color separated images of respective color components of a multi-color continuous-tone image using a same dither mask that has been generated by a dither mask generating method according to the first to the thirtieth features.

(38) The thirty-eighth feature of the present invention resides in a computer-readable recording medium, in which is stored an image data of a multi-color halftone image obtained by performing a conversion process on color separated images of respective color components of a multi-color continuous-tone image using different dither masks that has been generated by a dither mask generating method according to the first to the thirtieth features.

(39) The thirty-ninth feature of the present invention resides in a printed matter prepared using image data according to the thirty-sixth to the thirty-eighth features.

BRIEF DESCRIPTION OF DRAWINGS

FIG. 3 is a pixel array diagram, showing the pixel value configuration of a simple 16-tone image having a 4×4 pixel array.

FIG. 4 is a pixel array diagram, showing the pixel value configuration of a simple dither mask having a 4×4 pixel array.

FIG. 5 is a plan view, showing the black-and-white pattern of a halftone image obtained by converting the 16-tone image shown in FIG. 3 using the dither mask of FIG. 4.

FIG. 13A is a pixel array diagram of a type of dither mask called the spiral type and FIG. 13B is a pixel array diagram of a type of dither mask called the Bayer type.

FIG. 14A through FIG. 14D are plan views, showing the black-and-white patterns that are obtained by conversion of 16-tone images with which all pixel values are 1, 2, 3, and 4, respectively, using the spiral type dither mask shown in FIG. 13A.

BEST MODE FOR CARRYING OUT THE INVENTION

<<<§1. Basic Properties of a Dither Mask>>>

Figure 1:
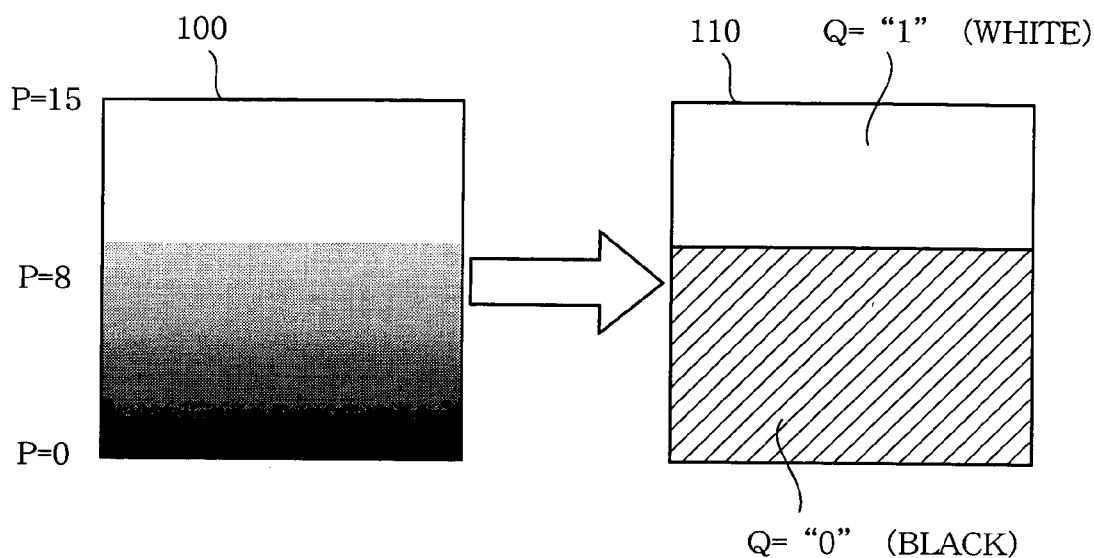
FIG. 1 is a plan view, showing images before and after conversion of a continuous-tone image into a binary image using only a single threshold value.

First in order to facilitate the understanding of this invention, the basic properties of a general dither mask shall be described briefly. As has been mentioned already, a dither mask is two-dimensional pixel array data that are used in the computation for conversion of a continuous-tone image into a halftone image. For example, the case where a continuous-tone image 100, shown at the left side of FIG. 1, is given as an original image and this image is to be converted into a binary image 110, shown at the right side of FIG. 1, shall now be considered. Here, for the sake of description, it shall be deemed that continuous-tone image 100 is a 4-bit image, that is, an image expressed by the 16 stages of pixel values P=0 to 15, with the pixel value P=0 expressing black and the pixel value P=15 expressing white.

The continuous-tone image 100 is an image with which the lower side is black, the upper side is white, and the parts in between take on gray tones, and if for example, a threshold for binarization is determined pixel values P=8 uniformly, a process of replacing pixel values P of 8 or less with a new pixel value Q=0 (black) and replacing pixel values P of 9 or more with a new pixel value Q=1 (white), the binary image 110 shown at the right side of FIG. 1 will be obtained. However, though this binary image 110 expresses the general gray scale trend of the continuous-tone image 100 that has been provided as the original image (the trend of being white at the upper side and black at the lower side), the detailed gray scale information is lost.

Figure 2:
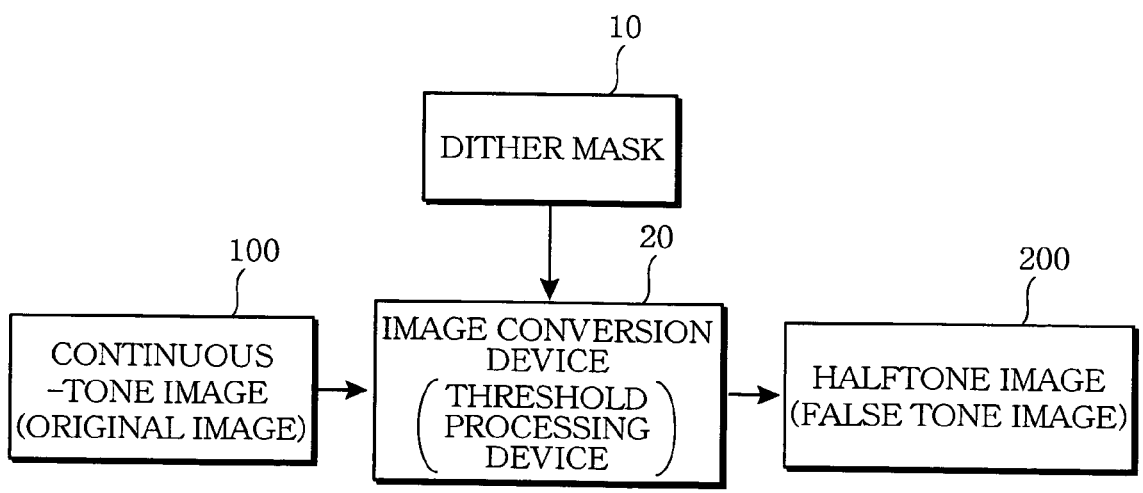
FIG. 2 is a block diagram, illustrating the concepts of the process of converting a continuous-tone image into a halftone image using a dither mask.

A halftone image is a pseudo-tone image which, though being essentially a binary image, reproduces as faithfully as possible the gray scale information of the continuous-tone image 100, provided as the original image, and can be obtained by an image conversion device 20 that operates using a dither mask 10 as shown in FIG. 2. That is, image conversion device 20 has a function of performing a process of converting the continuous-tone image 100, provided as the original image, into a halftone image (pseudo-tone image) 200. This conversion process is basically a process wherein the pixel value P of each pixel that makes up continuous-tone image 100 is compared with a predetermined threshold and is converted into a new pixel value Q=0 or Q=1 in accordance with the relationship of magnitude, and image conversion device 20 functions as a threshold processing device. However, this threshold is not determined uniformly in the manner of pixel value P=8 as in the above-described example but is prepared in the form of dither mask 10.

Here, for the sake of description, the case where a continuous-tone image 100, comprising an extremely small pixel array of 4×4 as shown in FIG. 3, is provided as the original image and this original image is converted into a halftone image 200 shall now be considered. The continuous-tone image 100 shown in FIG. 3 is an image that is expressed by 4-bit pixel values and the pixel value P of each pixel takes a value in the range of 0 to 15. In order to convert a continuous-tone image 100 expressed by such 4-bit pixel values into a halftone image, a dither mask 10, such as shown in FIG. 4, is prepared. With this dither mask 10, a predetermined pixel value T is provided to each pixel of a pixel array of the same 4×4 size as the continuous-tone image 100 shown in FIG. 3.

However, a dither mask 10 has the following two characteristics. The first characteristic is that whereas the allowable range of pixel values P of the respective pixels of the continuous-tone image 100 shown in FIG. 3 was 0 to 15 (numbers that can be expressed with 4 bits), the allowable range of pixel values T of the respective pixels of the dither mask 10 shown in FIG. 4 is 0 to 14 (one less than the number of numerical values that can be expressed with 4 bits). The reason for this shall be given later. A second characteristic is that whereas each individual pixel value P of the continuous-tone image 100 shown in FIG. 3 is determined by the image to be expressed, each individual pixel value T of dither mask 10 is determined so that the respective values 0 to 14 within the allowable range will be substantially uniform in the frequency of occurrence. Actually with the dither mask 10 shown in FIG. 4, though just the pixel value T=13 occurs twice as an exception, all of the other pixel values occur uniformly once each. In FIG. 4, a "*" mark is provided to the pixel value of 13 at the upper right corner to indicate that it is a pixel value that is used one time extra.

To convert the continuous-tone image 100 using the dither mask 10 shown in FIG. 4, a process, in which the pixel value P and pixel value T of pixels at mutually corresponding positions are compared, a new pixel value Q=1 is allocated in the place of the pixel value P if P>T, and a new pixel value Q=0 is allocated in the place of the pixel value P if P≦T, is performed. Such a process is generally called a dither process, masking process, or threshold process.

FIG. 5 shows a halftone image 200 that is obtained by such a process. Here with halftone image 200, in order to enable the gray scale of halftone image to be readily grasped visually, a pixel that was allocated the pixel value Q=1 (white) is indicated as a white square and a pixel that was allocated the pixel value Q=0 (black) is indicated as a hatched square. For example, since the pixel value of the pixel of the first row and first column of the continuous-tone image 100 shown in FIG. 3 is P=5 and the pixel value of the first row and first column of the dither mask 10 shown in FIG. 4 is T=11, the relationship P≦T holds for the pixels of this position and thus a new pixel value Q=0 is allocated in place of the pixel value P. As a result, the pixel value of the pixel of the first row and first column of the halftone image 2000 shown in FIG. 5 is Q=0 and this pixel is thus hatched.

Figure 6:
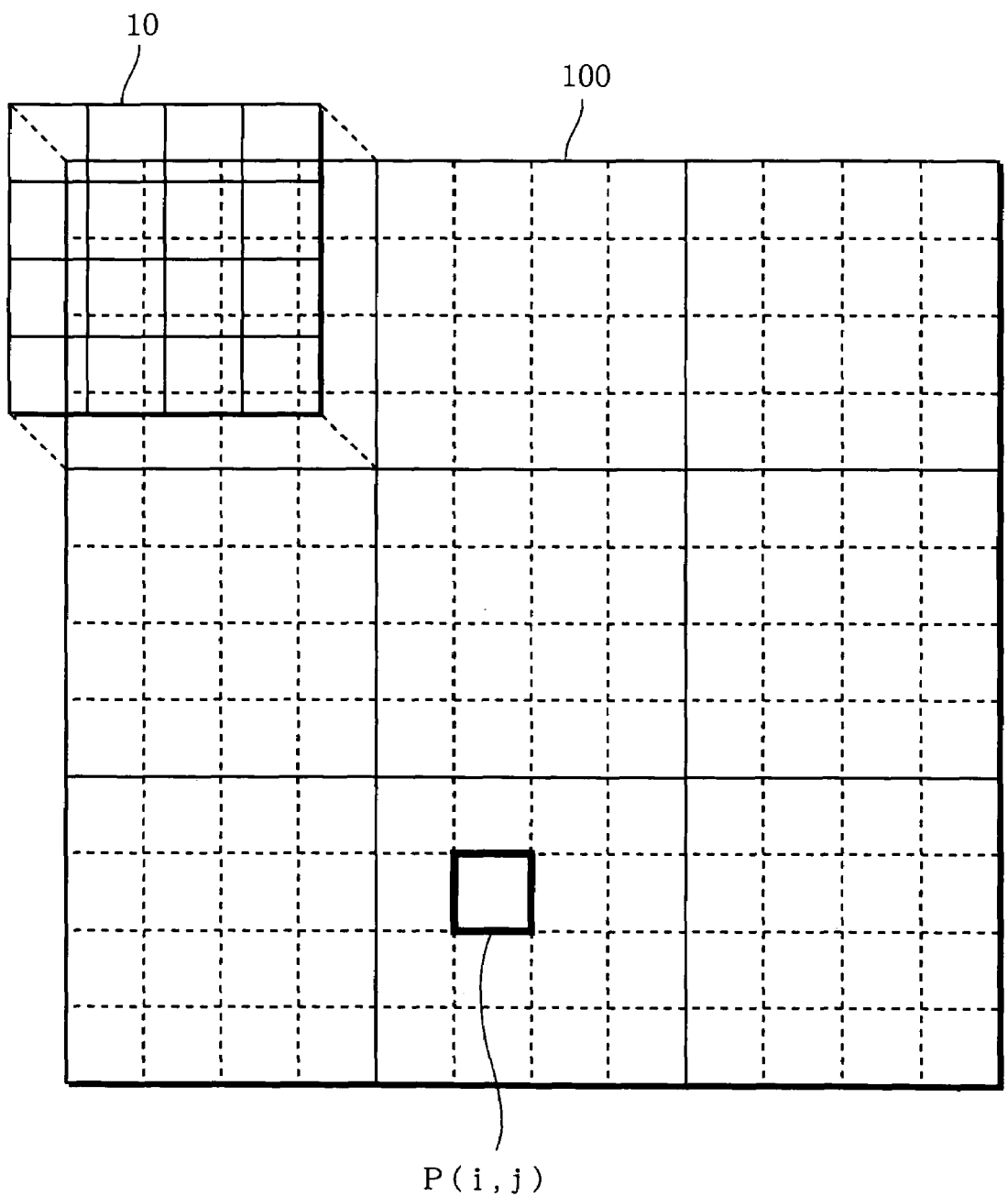
FIG. 6 is a diagram for explaining a method of processing a continuous-tone image that is greater than the size of a dither mask.

Though a dither mask 10 of the same size as continuous-tone image 100 was used in the above example, a dither mask 10 of the same size does not have to be prepared necessarily for practical use. For example, to convert a continuous-tone image 100, which is large in comparison to a prepared dither mask 10 as shown in the example of FIG. 6, dither mask 10 is moved vertically and horizontally at a pitch equal to its size and the process of replacing the pixel value P(i, j) of the pixel of the i-th row and j-th column of continuous-tone image 100 by a binary image pixel value Q(i, j) by the same method as that of the above-described example is performed. That is, if dither mask 10 is arranged as a k-row, m-column matrix, the modulus operations (i mod k) and (j mod m) are applied to a pixel value P(i, j) of continuous-tone image 100 to determine the corresponding pixel of dither mask 10 and then the operation of comparing the magnitudes of the pixels is performed.

The reason why the gray scale information possessed by a continuous-tone image 100 can be expressed in a simulated manner by conversion of continuous-tone image 100 to a halftone image 200 by a dither process using a dither mask 10, such as that shown in FIG. 4, shall now be explained briefly.

Figure 7:
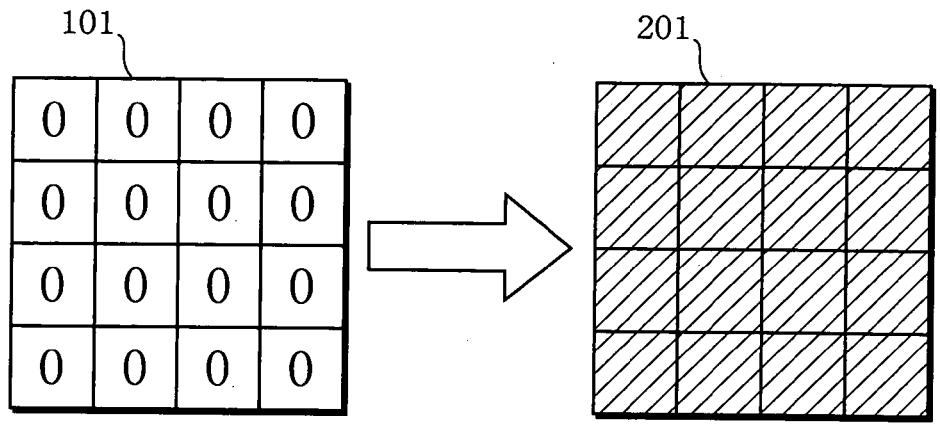
FIG. 7 shows a pixel array diagram of a 16-tone image with which all pixel values are 0 and a plan view of the black-and-white pattern that is obtained by converting this 16-tone image into a halftone image using the dither mask shown in FIG. 4.

First, it can be understood that when the conversion process using the dither mask 10 shown in FIG. 4 is performed on a continuous-tone image 101, shown at the left side of FIG. 7, a halftone image 201, shown at the right side of FIG. 7, is obtained. Continuous-tone image 101 is an all-black image with which all pixel values P=0, and the halftone image 201 that is obtained is also an all-black image with which all pixel values Q=0.

Figure 8:
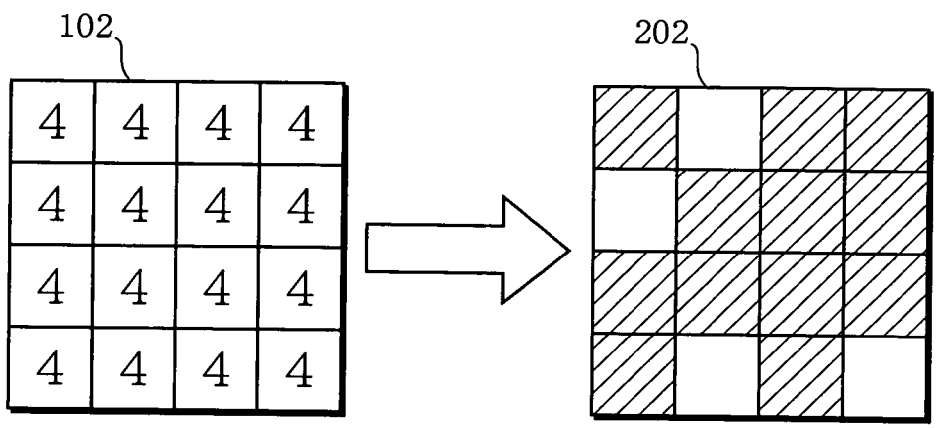
FIG. 8 shows a pixel array diagram of a 16-tone image with which all pixel values are 4 and a plan view of the black-and-white pattern that is obtained by converting this 16-tone image into a halftone image using the dither mask shown in FIG. 4.

Meanwhile, when the conversion process using the dither mask 10 shown in FIG. 4 is performed on a continuous-tone image 102, shown at the left side of FIG. 8, a halftone image 202, shown at the right side of FIG. 8 is obtained. The continuous-tone image 102 is a dark gray image with which all pixel values P=4, and the halftone image 202 that is obtained is one with which ¼ of the entirety is white and ¾ of the entirety is black and is recognized as a dark gray image by macroscopic observation.

Figure 9:
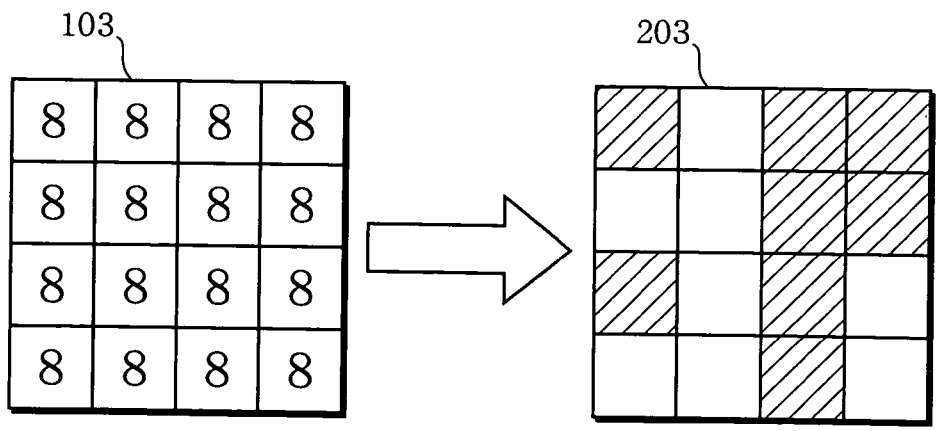
FIG. 9 shows a pixel array diagram of a 16-tone image with which all pixel values are 8 and a plan view of the black-and-white pattern that is obtained by converting this 16-tone image into a halftone image using the dither mask shown in FIG. 4.

Furthermore, when the conversion process using the dither mask 10 shown in FIG. 4 is performed on a continuous-tone image 103, shown at the left side of FIG. 9, a halftone image 203, shown at the right side of FIG. 9 is obtained. The continuous-tone image 103 is an intermediate gray image with which all pixel values P=8, and the halftone image 203 that is obtained is one which is half black and half white and is recognized as an intermediate gray image by macroscopic observation.

Figure 10:
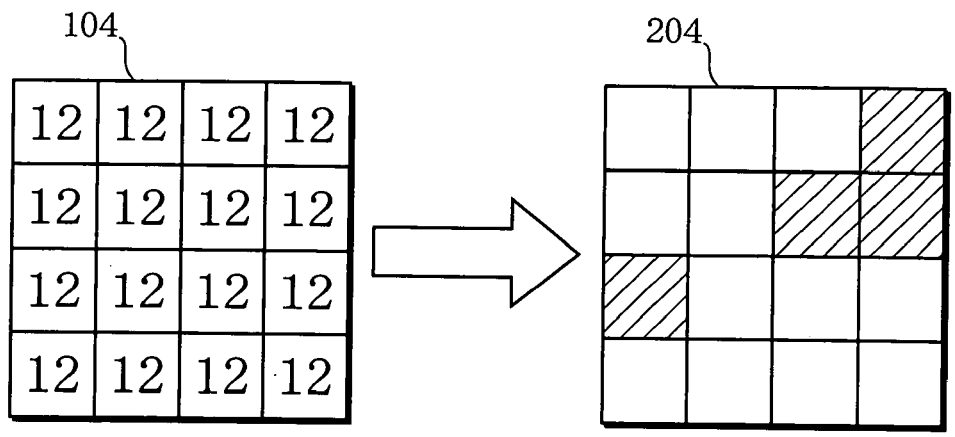
FIG. 10 shows a pixel array diagram of a 16-tone image with which all pixel values are 12 and a plan view of the black-and-white pattern that is obtained by converting this 16-tone image into a halftone image using the dither mask shown in FIG. 4.

Also, when the conversion process using the dither mask 10 shown in FIG. 4 is performed on a continuous-tone image 104, shown at the left side of FIG. 10, a halftone image 204, shown at the right side of FIG. 10 is obtained. The continuous-tone image 104 is a light gray image with which all pixel values P=12, and the halftone image 204 that is obtained is one with which ¾ of the entirety is white and ¼ of the entirety is black and is recognized as a light gray image by macroscopic observation.

Figure 11:
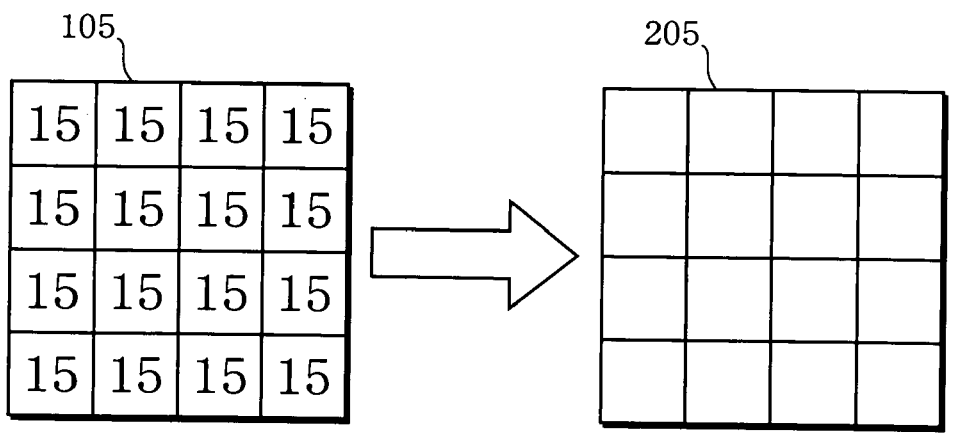
FIG. 11 shows a pixel array diagram of a 16-tone image with which all pixel values are 15 and a plan view of the black-and-white pattern that is obtained by converting this 16-tone image into a halftone image using the dither mask shown in FIG. 4.

Lastly, when the conversion process using the dither mask 10 shown in FIG. 4 is performed on a continuous-tone image 105, shown at the left side of FIG. 11, a halftone image 205, shown at the right side of FIG. 11, is obtained. Continuous-tone image 105 is an all-white image with which all pixel values P=15 and the halftone image 205 that is obtained is also an all-white image with which all pixel values Q=1.

Consequently, a halftone image that is obtained by conversion using dither mask 10 is, upon microscopic observation, a binary image expressed by a mixture of white pixels and black pixels, but, upon macroscopic observation, provides a gray scale expression by the quantitative proportions of white pixels and black pixels and thus expresses in simulated manner the gray scale information of the continuous-tone image that is the original image. This is the reason why gray scale information can be expressed in a simulated manner when a continuous-tone image 100 is converted into a halftone image 200 by a dither process using a dither mask 10, such as shown in FIG. 4.

As was mentioned above, a dither mask 10, such as shown in FIG. 4, has two characteristics. These two characteristics are characteristics that are necessary for the expression of gray scale information in a simulated manner in a halftone image. That is, the characteristic that "with a dither mask 10, the respective pixel values 0 to 14 within the allowable range are substantially uniform in the frequency of occurrence" is a characteristic that is necessary for matching the quantitative proportions of white pixels and black pixels in the halftone image that is obtained to the gray scale information of the continuous-tone image that is the original image, and unless a dither mask with such a characteristic is used, simulated expression of the gray scale information will not be possible. For example, in the example shown in FIG. 10, the continuous-tone image 104 was converted into the halftone image 204 because the pixel values of ¼th (4 pixels) of all of the pixels of dither mask 10 were greater than or equal to the pixel value P=12 of the continuous-tone image 104 and if the frequencies of occurrence of the pixel values of dither mask 10 were not uniform, the simulated expression of the gray scale information could not be performed.

The reason for the other characteristic, that is, the reason for the allowable range of pixel values T of the respective pixels of the dither mask 10 shown in FIG. 4 being 0 to 14 (one less than the number of numerical values that can be expressed with 4 bits) whereas the allowable range of pixel values P of the respective pixels of the continuous-tone image was 0 to 15 (the numerical values that can be expressed with 4 bits) is to perform correct conversion of an all-white or all-black original image. For example, consider the case where an actual conversion is performed using a dither mask 11, shown in FIG. 12A, in place of the dither mask 10 shown in FIG. 4. With the dither mask 11 shown in FIG. 12A, the pixel value of 13 at the upper left corner of the dither mask 10 shown in FIG. 4 is replaced by the pixel value of 15 and the allowable range of pixel values T is made 0 to 15.

Figures 12A, 12B:
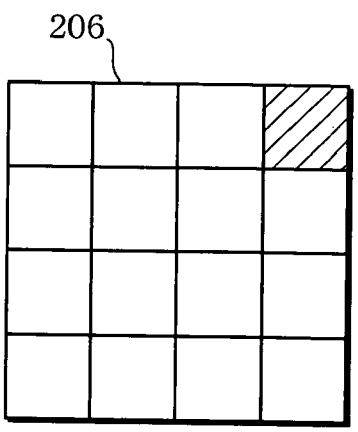
FIG. 12A is a pixel array diagram, showing a dither mask containing all pixel values within the range of 0 to 15.
FIG. 12B is a plan view, showing the black-and-white pattern that is obtained by converting a 16-tone image with which all pixel values are 15 into a halftone image using the dither mask shown in FIG. 12A.

With this dither mask 11, the pixel values 0 to 15 appear just once each and since the frequencies of occurrence of the respective pixel values are thus completely uniform, this mask seems at first sight to be better than the dither mask 10 shown in FIG. 4. However, when the dither mask 11 shown in FIG. 12A is used, though converted images that are nearly the same as the halftone images 201 to 204 can be obtained for the continuous-tone images 101 to 104 shown in FIG. 7 through FIG. 10, for the continuous-tone image 105 shown in FIG. 11, the half-tone image 206 shown in FIG. 12B is obtained instead of the halftone image 205 that should be obtained. This is because "when P≦T, Q=0" is applied as shown in FIG. 5 and thus just the pixel value of the pixel at the upper right corner of halftone image 206 becomes Q=0 (black). If in order to avoid this, the formulae shown in FIG. 5 are changed to "when P≧1, Q=1" and "when P<T, Q=0," then for a halftone image 201 obtained for the continuous-tone image 101 shown in FIG. 7, which should properly be all black, the pixel at the position of the first row and second column (the position corresponding to the pixel in which the pixel value T=0 is set in dither mask 11) will be a white pixel.

With practical applications, all-white portions or all-black portions are frequently contained in an original image, and a critical problem may arise unless these portions are correctly expressed in a halftone image. The pixel values in the dither mask are thus restricted to the range of 0 to 14 in the above-described example. In the case where the formulae shown in FIG. 5 are changed to "when P≧1, Q=1" and "when P<T, Q=0," the pixel values in the dither mask are restricted to the range of 1 to 15.

In any case, whereas 16 different pixel values are used in a continuous-tone image that is expressed in 4 bits, only 15 different pixel values can be used in a dither mask for 4-bit images. Thus in the case of a dither mask 10 with a 4×4 size as shown in FIG. 4, if the 15 different pixel values from 0 to 14 are allocated one by one to each pixel, just one odd pixel will remain at the final step. Anyone of the 15 different pixel values from 0 to 14 may be allocated redundantly to this odd pixel. With the example shown in FIG. 4, the pixel value 13 is allocated redundantly to the odd pixel at the upper right corner (marked with an *). Though as a result, the frequencies of occurrence of the pixel values are no longer completely uniform and the gray scale information of the original image cannot be reflected accurately, this will not present a major problem in terms of practical use.

Various types of such dither masks are known. For example, the dither mask shown in FIG. 13A is generally called a spiral type with which it is possible to obtain a halftone image having a characteristic that the halftone dots are clustered at the center. On the other hand, the dither mask shown in FIG. 13B is generally called the Bayer type with which it is possible to obtain a halftone image having a characteristic that fine halftone dots are dispersed. With any of these dither masks, pixel values from 0 to 14 are written once each in a 4×4 pixel array (the pixel with the * is an odd pixel and one pixel value among the pixel values of 0 to 14 is written into this pixel redundantly). The abovementioned differences in characteristics arise, because of differences in the configuration of the pixel values.

That is, with the spiral type dither mask shown in FIG. 13A, a locus that spirals from the central part to the outer side is drawn when the pixel values are traced from small values in the order of: 0, 1, 2, etc. On the other hand, with the Bayer type dither mask shown in FIG. 13B, only a completely random locus can be drawn even when the pixel values are likewise traced from small values in the order of: 0, 1, 2, etc. Though the differences are not pronounced with these examples since only dither masks of small pixel arrays of size 4×4 are illustrated for the sake of description, extremely significant differences in the pixel value configurations arise between a spiral type and a Bayer type dither mask in practical applications where dither masks with pixel arrays of much larger sizes are used and such significant differences in the pixel value configurations bring about significant differences in the halftone image that is obtained.

When a dither process using the spiral type dither mask shown in FIG. 13A is performed on an original image (4-bit continuous-tone image) with which the pixel values of all pixels are such that P=1, the halftone image shown in FIG. 14A is obtained. Likewise, when the dither process is performed on original images for which the pixel values of all pixels are such that P=2, 3, or 4, respectively, the halftone images shown in FIGS. 14B, 14C, and 14D are obtained respectively. Though macroscopically, the proportions of the numbers of white pixels and black pixels of the halftone images that are obtained correspond to the gray scale of the original image, as can be understood from FIG. 14A through FIG. 14D, a halftone image that is obtained by a process using the spiral type dither mask shown in FIG. 13A has a characteristic that the regions of white pixels are clustered at the central part. This holds in the case of original images for which all pixels have a pixel value of P=5 to 15 as well and for halftone image pixel arrays of a 4×4 size, a cluster of white pixels will always be positioned at the central part (the outline of which is indicated by thick lines in each of the Figures).

Actually, such positioning of a cluster of white pixels at the central part is extremely convenient for offset printing, with which ink is deposited onto white pixel parts and ink is not deposited onto black pixel parts. That is, with offset printing, the white pixel cluster part that is positioned at the center functions as a halftone dot and ink is placed on this halftone dot part and transferred to paper. When such an ink transfer process is considered, it is preferable that each halftone dot has an adequate size that is suitable for ink transfer. This is because ink may not be transferred adequately onto the paper side for a halftone dot of small area due to the surface tension of the ink and other physical factors.

For example, when an original image with which all pixels have a pixel value P=4 is converted using the dither mask 10 shown in FIG. 4, the halftone image 202 shown at the right side of FIG. 8 is obtained as has been described above. However, when exactly the same original image is converted using the spiral type dither mask shown in FIG. 13A, the halftone image shown in FIG. 14D is obtained. The halftone image 202 shown in FIG. 8 and the halftone image shown in FIG. 14D share the characteristic that ¼ (4 pixels) of all pixels are white pixels and macroscopically, both halftone images accurately express the gray scale information of the original image. However, with the halftone image 202, the 4 white pixels are dispersed and in offset printing, halftone dots of small area will be formed at 4 locations. On the other hand, with the halftone image shown in FIG. 14D, the 4 white pixels are clustered at the central part, and a halftone dot of 4 times the area will be formed at a single location in offset printing. Though theoretically, the same gray scale information should be printed onto paper in both cases, in actuality, adequate transfer of ink may not be accomplished with the halftone image 202 shown in FIG. 8 due to the surface tension of ink and other physical factors.

Consequently, in the case of performing offset printing based on an obtained halftone image, it is more preferable to perform a dither process, with which the halftone dots become clustered at a single location as much as possible, by using a spiral type dither mask such as that shown in FIG. 13A. However, the circumstances change for example in the case where printing by an ink jet printer is to be performed based on the obtained halftone image. A problem with a printed matter prepared by an ink jet printer is that a granular texture is made apparent by each ink drop that is deposited onto the paper. Thus in order to restrain the granular texture, halftone dots are preferably made as small and dispersed as possible. To meet such a requirement, a halftone image can be obtained using a Bayer type dither mask, such as that shown in FIG. 13B.

As has been described above, dither masks differ greatly in characteristics in accordance with the pixel value configurations, and the present circumstances are such that the necessary dither mask is generated as suited according to the application. With a dither mask that is generally called an "art screen," since there is a need to embed a special design pattern, the pixel value configuration must be in accordance with the design pattern that is to be embedded and the dither mask is usually prepared through complex procedures. An object of this invention is to provide a dither mask generating method and generating device by which a dither mask with the desired characteristics that are in accordance with the application can be prepared readily. The basic concept and specific embodiments of this invention shall now be described in that order.

<<<§2. Dither Mask Generating Device by This Invention>>>

Figure 15:
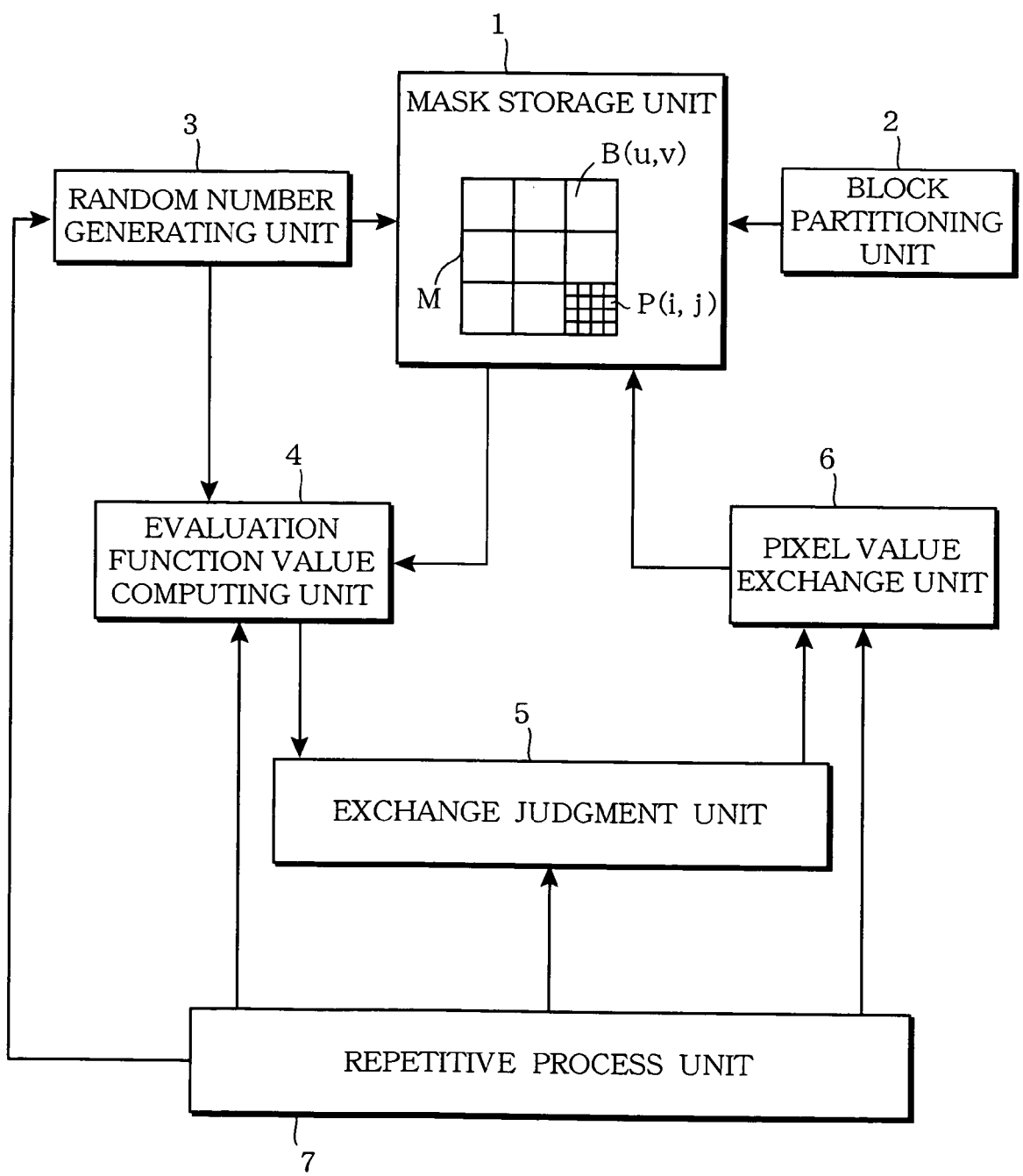
FIG. 15 is a block diagram, showing the basic arrangement of a dither mask generating device by this invention.

First, the basic concepts of this invention shall be described by indicating the basic arrangement of a dither mask generating device by this invention. FIG. 15 is a block diagram, which shows the basic arrangement of this invention's dither mask generating device. As illustrated, this generating device comprises a mask storage unit 1, block partitioning unit 2, random number generating unit 3, evaluation function value computing unit 4, exchange judgment unit 5, pixel value exchange unit 6, and repetitive process unit 7. In actuality, this generating device is arranged by incorporating a dedicated software in a computer, and the individual component elements shown as blocks in FIG. 15 are elements that indicate individual functions that are to be realized by the cooperative actions of the hardware and software of the computer.

Mask storage unit 1 stores a pixel array M, with a size that is in accordance with the dither mask that is to be generated, along with the pixel values of the respective pixels. As shall be described later, in the initial preparation stage, a predetermined initial pixel value is provided to each pixel that makes up the pixel array M, these pixel values are successively rewritten during the generation process, and the dither mask to be generated is made up by the set of pixel values possessed by the respective pixels in the final stage of the process. In actuality, this mask storage unit 1 comprises a memory to be used as working area of a computer.

Block partitioning unit 2 is a device that partitions the pixel array M stored in mask storage unit 1 into a plurality of blocks and has a function of defining the plurality of blocks on the pixel array M. With the example shown in FIG. 15, pixel array M is partitioned into 3×3 blocks, that is, nine blocks. Here, the block of the u-th row and v-th column shall be referred to as "block B (u, v)." The partitioning into blocks is carried out in pixel units and each block makes up a pixel array having an integer number of pixels as members. With the example shown in FIG. 15, each block comprises a 4×4 pixel array. Here, the pixel of the i-th row and j-th column of a single block shall be referred to as "pixel P(i, j)."

Since the pixel array M is to become, at the final stage, the pixel array that makes up the dither mask to be generated, it must be made the same in size as the dither mask to be generated. However, the size of each block (in other words, the number of block partitions) maybe set suitably to a suitable value. However, since the initial values to be provided to the pixels within one block must satisfy predetermined conditions as shall be described later, it is not preferable to define a block with which the number of pixels contained therein is extremely small.

Random number generating unit 3 has a function of generating random numbers of predetermined form. As the random numbers, uniform random numbers (may be pseudo-random numbers) may be used and though the spectrum thereof is preferably a white noise spectrum, random numbers with a colored noise spectrum may also be used. The use of a function, which has been prepared in a computer for the generation of random numbers in a simulated manner (such as the rnd function), is normally sufficient. Random number generating unit 3 has the processing function of executing the following two processes using the random numbers generated. The first processing function is the initial pixel value setting process, by which pixel values f(i, j) are allocated randomly to the respective pixels P(i, j) that are members of the pixel array M, which has been prepared inside mask storage unit 1. To be more specific, this is the process of writing randomly generated pixel values into the respective pixels of pixel array M inside mask storage unit 1. However, the following two conditions must be satisfied in regard to the writing of pixel values in a random manner.

The first condition is that the pixel value that is to be written is set to a pixel value within a predetermined numerical range that is deemed to be necessary for the dither mask. As has been described in §1, there is a predetermined allowable range for the numerical value of the pixel value of each pixel that makes up a dither mask. For example, the allowable range for the pixel values T of the respective pixels of the dither mask 10 shown in FIG. 4 is 0 to 14, and in this case, pixel values within the range of 0 to 14 must be generated and written randomly. As has been described above, whereas the range of pixel values of pixels that make up an original image expressed by 4-bit tones is 0 to 15, the allowable range of the pixel values of the pixels that make up the dither mask must be set to 0 to 14 in order to accurately express all-white parts.

The second condition is that the frequencies of occurrence of the pixel values be made substantially uniform in each block. For example, in the case of the dither mask 10 shown in FIG. 4, the frequencies of occurrence of the pixel values within the range of 0 to 14 are substantially uniform. Though the frequencies of occurrence cannot be made completely uniform in actuality due to the occurrence of the odd pixel marked by *, as was described above, the frequency of occurrence of each pixel value is 1 or 2 (the frequency of occurrence is 2 only for the pixel value allocated to the odd pixel) and is substantially uniform. The frequencies of occurrence of the pixel values are set to be uniform in each block in this manner in order to express the gray scale information in block units as was described above.

The second processing function of random number generating unit 3 is the function of performing an exchange target pixel selection process, in which a pair of pixels to be subject to exchange are selected randomly from among the pixels within a predetermined single block in the pixel array M stored in mask storage unit 1. For example, if a predetermined block B(u, v) has been designated, two pixels, for example, pixel P(i1, j1) and pixel P(i2, j2) are selected from block B (u, v) as pixels to be subject to exchange in a completely randomly manner using random numbers.

Evaluation function value computing unit 4 has a function of computing and determining the function value of a predetermined evaluation function that expresses characteristics of the pixel value configuration of the pixels within a single block. Though the specific contents of the evaluation function shall be described in detail later by way of some examples, any function may be used as long as it is a function by which characteristics concerning the spatial configuration of pixel values can be evaluated quantitatively. For example, in the case where an evaluation function that quantitatively indicates the similarity of the pixel values of mutually adjacent pixels is used, whereas a function value that indicates a comparatively high similarity will be obtained when the spiral type dither mask shown in FIG. 13A is evaluated, a function value that indicates a comparatively low similarity will be obtained when the Bayer type dither mask shown in FIG. 13B is evaluated. A predetermined evaluation function is incorporated in advance in evaluation function value computing unit 4 and the computation of the function value is executed based on this incorporated evaluation function.

Here, evaluation function value computing unit 4 has a function of computing and determining function values using such an evaluation function for both the case where the pixel values of the pair of the exchange target pixels have been exchanged and the case where the exchange has not been performed. As was mentioned above, the pair of exchange target pixels are the two pixels that have been selected randomly by random number generating unit 3. The exchange of pixel values is not actually executed at this point and only the evaluation function value is computed for the hypothetical case where the exchange of pixel values have been exchanged.

On the other hand, exchange judgment unit 5 has a function of comparing the two function values determined by evaluation function value computing unit 4 and thereby judging whether or not the pixel values of the pair exchange target pixels should be exchanged, and in the case where it has been judged by exchange judgment unit 5 that exchange should be performed, pixel value exchange unit 6 performs a process of actually exchanging the pixel values of the pair of exchange target pixels stored in mask storage unit 1. Though the algorithm for the judgment by exchange judgment unit 5 shall be described in detail later by way of examples, as a basic policy, a predetermined target value is set for the function value of an evaluation function and judgment is made based on whether or not the function value is made to approach the target value as a result of the exchange. That is, if arrangements are made so that the "should exchange" judgment will be made if the function value after exchange is closer to the predetermined target value than the function value prior to exchange, the pixel value configuration of the corresponding block will become one that will provide a function value that is closer to the target value. The target value for this purpose is set in exchange judgment unit 5 in accordance with the evaluation function incorporated in evaluation function value computing unit 4.

Repetitive process unit 7 has the function of performing control so that the above-described processes executed by random number generating unit 3, evaluation function value computing unit 4, exchange judgment unit 5, and pixel value exchange unit 6 (the processes concerning the exchange of pixels of a single block; for random number generating unit 3, the exchange target pixel selection process) will be executed for all blocks and executed repeatedly until predetermined conditions are satisfied.

Consequently, the series of procedures, wherein, for a block B(u, v) within mask storage unit 1, random number generating unit 3 randomly selects a pair of exchange target pixels, evaluation function value computing unit 4 computes the evaluation function values before and after pixel exchange for the block, and in the case where exchange judgment unit 5 compares the computation results and makes the "should exchange" judgment, the pixel values of the corresponding exchange target pixels are exchanged by pixel value exchange unit 6, are executed respectively for all blocks and executed repeatedly until predetermined conditions are met. Here, if as a predetermined condition, a condition of the number of times of repetition, such as "until the processes are repeated a predetermined number of times N," is set, the above-described processes will be executed repeatedly until the number of times of repetition reaches N.

By executing such processes, the configuration of pixel values within each of the blocks that make up pixel array M inside mask storage unit 1 is made to gradually approach a configuration with specific properties indicated by the evaluation function. Needless to say, even if the same evaluation function is used, configurations of different properties will be approached depending on the manner in which the target values are set with respect to the function values. For example, when an evaluation function that quantitatively indicates the "similarity" of pixel values of mutually adjacent pixels is used as described above and the target value is set to ∞, the pixel value configuration in each block will change in the direction in which the pixel values of mutually adjacent pixels will become similar by the execution of the above-described process. However, even if the same evaluation function is used, if the target value is set to 0, the pixel value configuration in each block will change oppositely in the direction in which the pixel values of mutually adjacent pixels will differ. Also, when an evaluation function that quantitatively indicates the "difference" of the pixel values of mutually adjacent pixels is used, a change in the direction in which the pixel values of mutually adjacent pixels will differ will be achieved if the target value is set to ∞ and a change in the direction in which the pixel values of mutually adjacent pixels will become similar will be achieved if the target value is set to 0.

Thus a basic concept of this invention is that the pixel value configuration in a single block is made to approach desired characteristics by repeating the processes of randomly selecting a pair of exchange target pixels and performing the exchange of pixel values if it is predicted that an evaluation function value will approach a desired target value as a result of the exchange of these pixel values. By adopting such a method and setting a suitable evaluation function and a suitable target value, a dither mask having the desired characteristics that are in accordance with the application can be prepared readily. <<<§3. Basic Procedures of This Invention's Dither Mask Generation Method>>>

The basic concepts of this invention were described above through a simple description of the basic arrangement and basic operations of this invention's dither mask generating device. Here, the basic procedures of this invention's dither mask generation method shall be described based on a more specific embodiment and referencing the flowchart shown in FIG. 16.

Figure 16:
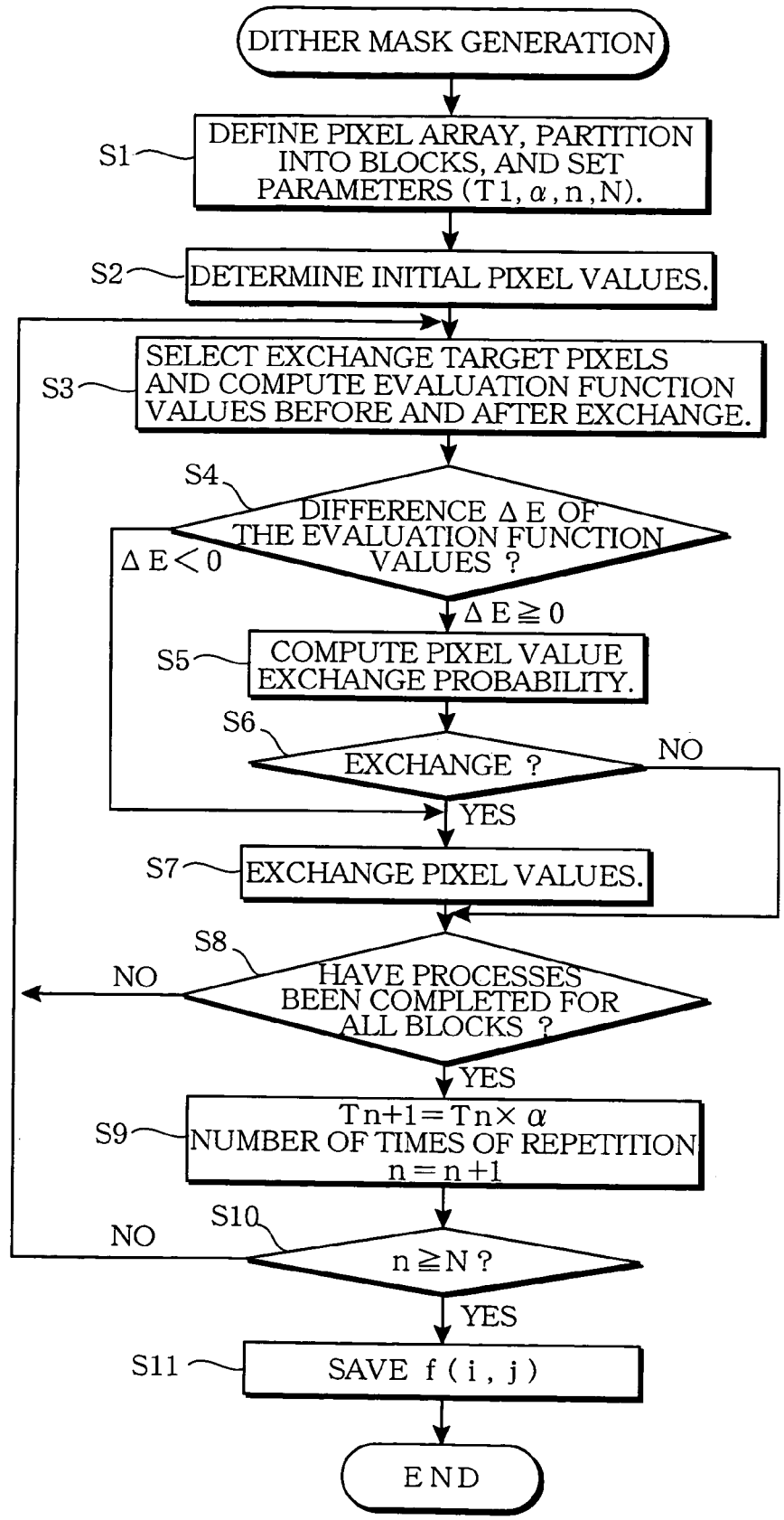
FIG. 16 is a flowchart, showing the basic procedures of a dither mask generating method by this invention.

First in the preparation step of step S1 in FIG. 16, a pixel array M, having a size that is in accordance with the dither mask to be generated, is defined and this pixel array M is partitioned into a plurality of blocks B(u, v). The setting of various parameters (T1, α, n, and N) is also performed in this preparation step. The meanings of these parameters shall be given later. Here, pixel array M is stored inside mask storage unit 1 and the partitioning into blocks is executed by block partitioning unit 2 as has been described in §2.

With the embodiment described here, an example that generates a dither mask, which is used for the conversion of a continuous-tone image with 8-bit tones into a halftone image and has a pixel array of a 256×256 size, shall be described. A pixel array M with a 256×256 size (made up of 65536 pixels in total) is thus prepared inside mask storage unit 1. It shall also be deemed that this pixel array M is partitioned into 16 parts in each of the vertical and horizontal directions by block partitioning unit 2, thereby defining a total of 256 blocks. The pixel array M that has been partitioned into blocks in such a manner is shown at the upper side of FIG. 17, and the block B(u, v), which is hatched, corresponds to being the block of the u-th row and v-th column in the block array of 16 rows and 16 columns. An enlarged view of this block B(u, v) is shown at the lower side of FIG. 17. The other blocks are exactly the same in arrangement as block B(u, v) and, as is illustrated, comprises a pixel array of a 16×16 size (made up of a total of 256 pixels). Here, each pixel shall be referred to as P(i, j) and the pixel value thereof shall be referred to as f(i, j) Here, the variables i and j are local variables for each block and take on values within the ranges of $0 \leq i \leq 15$ and $0 \leq j \leq 15$.

In step S2 that follows, the process of determining the respective predetermined initial values for the total of 65536 pixels that are the members of pixel array M is performed. With the present example, the process of writing a random number generated by random number generating unit 3 as the initial pixel value f(i, j) of each pixel is performed. However, the initial pixel value f(i, j) that is to be written is made to satisfy the condition, $0 \leq f(i, j) < 255$ (that is, a value among 0 to 254 is written). This is done since though pixel values within a range of 0 to 255 is used in a continuous-tone image with 8-bit tones, pixel values ranging from 0 to 254 and excluding the tone value 255 must be allocated to a dither mask in order to correctly convert all-white or all-black parts. Also, in order for the gray scale information to be reflected correctly in the halftone image, the condition that the frequencies of occurrence of the respective pixel values from 0 to 254 be substantially uniform in each block must also be satisfied.

Consequently, though the process of step S2 is one in which random numbers that have been generated by random number generating unit 3 are written in as initial pixel values for the respective pixels, it is not a process in which random numbers that are completely random are written into completely random positions but can said to be a process of allocating initial pixel values to the respective pixels so that a pixel value configuration that is as random as possible can be obtained while satisfying the above-described conditions.

Figure 17:
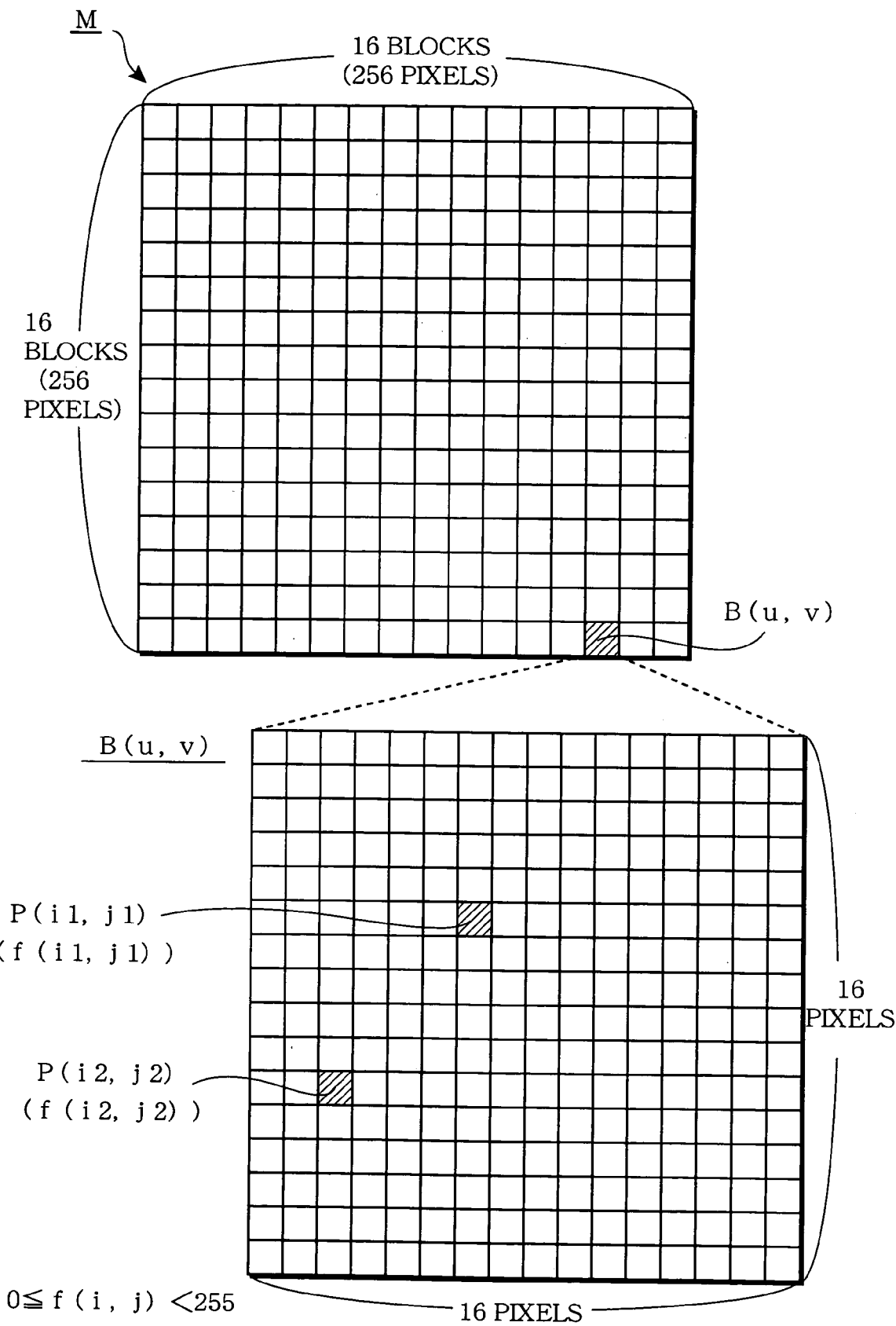
FIG. 17 is a plan view, showing the condition where a pixel array M is arranged from a plurality of blocks and one block is arranged from a 16×16 pixel array.

To be more specific, if for example the process of allocating pixel values of 0 to 254 to the 256 pixels in block B(u, v), shown at the lower side of FIG. 17, is to be performed, the following method is employed. That is, first, a single pixel value among 0 to 254 is selected at random using a random number. This selected pixel value is adopted as an initial pixel value if it is a pixel value that has been obtained for the first time. However, if the selected pixel value is a pixel value that has already been adopted as an initial pixel value, a random selection is repeated until a pixel value that has been obtained for the first time is obtained. Thereby the adopted pixel values are allocated to the respective pixels one by one. By doing so, one pixel value among 0 to 254 will be allocated successively without redundancy to each of the 255 pixels and the last 256th pixel will remain as the odd pixel. For this odd pixel, a single pixel value is selected at random from among 0 to 254 and this value is allocated redundantly.

When the allocation of initial pixel values to a single block B(u, v) has thus been completed, the same process is repeated for the other blocks. Initial pixel values are thus determined for all 65536 pixels of pixel array M.

In putting this invention into practice, the process of step S2 does not necessarily have to be performed using random numbers generated by random number generating unit 3. For example, it may be performed to allocate pixel values 0, 1, 2, 3, . . . , 254 as initial pixel values successively, starting from the upper left side, to the 256 pixels that make up the block B(u, v) shown at the lower side of FIG. 17, and to allocate the pixel value 0 to the odd pixel at the lower right that remains in the final stage. As shall be described later, since the exchange of the pixel values in a block will be carried out randomly in subsequent processes, the pixel values within a block will become mixed up randomly eventually.

The method of performing the process of allocating initial pixel values to a single block and then copying the results thereof to other blocks may also be employed. By employing this method, the process of allocating initial pixel values to each of the 256 blocks separately and independently can be eliminated. Though all blocks will be exactly the same in pixel value configuration at the initial stage in this case, since the exchange of pixel values will be carried out randomly according to each individual block in subsequent processes, the pixel value configurations of the respective blocks will come to differ consequently.

For practical purposes, the process of step S2 is preferably performed using random numbers generated by random number generating unit 3 and performed separately and independently for each individual block. This is because if a periodicity is contained in the pixel value configuration of the dither mask lastly obtained, there is a possibility that unnatural texture, moire pattern or Rosette pattern is observed on a halftone image produced by a conversion process using said dither mask. The periodicity, which is contained in the pixel value configuration at the initial stage, will be lost gradually by the pixel values being exchanged randomly as has been described above in subsequent processes. However, more favorable results can be obtained if periodicity is eliminated from the initial stage and initial pixel values can be allocated randomly to the individual pixels.

When the initial pixel values have been provided to all pixels, the processes of step S3 to step S7 are executed on a single block. First in step S3, the function value computation step is executed in which a pair of exchange target pixels are selected at random from among the pixels in the single block and the function values of a predetermined evaluation function, which indicates characteristics of the pixel value configuration of the pixels in the single block, are computed and determined for the two cases of performing exchange of the pixel values of the selected pair of exchange target pixels and not performing exchange. As was mentioned above, the predetermined evaluation function is incorporated inside evaluation function value computing unit 4 and computation of a function value that indicates characteristics of the pixel value configuration; for example, of the 256 pixels in block B(u, v) is performed using this evaluation function. At this point, since the result of selection of the pair of exchange target pixels is indicated from random number generating unit 3, evaluation function value computing unit 4 can calculate the two function values of the function value prior to exchange and the function value after exchange.

More specifically, when for the block B(u, v) shown at the lower side of FIG. 17, pixel P(i1, j1) and pixel P(i2, j2) have been selected as the exchange target pixels as illustrated, the evaluation function value is determined for the condition where the pixel values of these pixels are not exchanged, that is, for the current pixel value configuration as it is, and subsequently, the evaluation function value is determined for the pixel value configuration of the hypothetical case where the pixel values f(i1, j1) and f(i2, j2) of these pixels have been exchanged. Whether or not the pixel values of the pair of exchange target pixels P(i1, j1) and P(i2, j2) should be exchanged is then judged by comparing the two function values, and if the "should exchange" judgment is made, the process of actually exchanging the pixel values f(i1, j1) and f(i2, j2) is performed. Here, as has been mentioned above, the "should exchange" judgment is basically made if the function value approaches a predetermined target value as a result of the exchange.

However, the processes of step S4 to step S7 of the flowchart shown in FIG. 16 provide a possibility for a "should exchange" judgment to be made even if the function value does not approach the predetermined target value as a result of the exchange. The reason for this is that the two function values that are determined in step S3 take note of only the pixel value configuration at the current point in time and indicate two values for the very restricted phenomenon of exchanging just two pixel values. In other words, even if the function value is made further away from the target value as a result of the exchange when the pixel value configuration at the current point is considered, if the variations of future pixel value configurations are considered, there exists the possibility that performing the exchange will result in making the function value approach the target value at the final stage. Thus with the present embodiment, the judgment that exchange should be performed is made unconditionally if the function value of the evaluation function approaches the target value as a result of the exchange, and the judgment that exchange should be performed is made based on a predetermined exchange probability if the function value of the evaluation function does not approach the target value as a result of the exchange.

To be more specific, the following processes are performed in step S4 to step S7 of FIG. 16. Here, as the evaluation function to be computed in step S3, a function that theoretically takes on the value 0 or a positive value shall be defined and the function value thereof shall be expressed as E ($0 \leq E < \infty$). It shall also be deemed that the value E=0 is set as a target value of the evaluation function. Thus in general terms, an environment wherein the pixel value configuration varies in the direction in which the value E of the evaluation function decreases is provided.

Here, if E1 is the function value prior to exchange of the pixel values of the exchange target pixels, E2 is the function value after exchange, and the difference $\Delta E$ of the evaluation function values is defined as $\Delta E = E2 - E1$, when the difference $\Delta E < 0$, this will mean that the function value E2 after exchange is smaller than the function value E1 prior to exchange and that the function value E of the evaluation function will approach the target value of 0 as a result of the exchange. Oppositely, if the difference $\Delta E > 0$, this will mean that the function value E2 after exchange is greater than the function value E1 prior to exchange and that the function value E of the evaluation function will be made further away from the target value of 0 as a result of the exchange. Also, if the difference $\Delta E = 0$, this will mean that there will be no change in the function value E of the evaluation function even if the exchange is performed.

This difference $\Delta E$ is judged in the procedure of step S4 of FIG. 16, and if $\Delta E < 0$, that is, if the function value E of the evaluation function approaches the target value of 0 as a result of the exchange, step S7 is entered unconditionally and the exchange of pixel values is carried out. On the other hand, if $\Delta E \geq 0$, that is, in the case where the function value E of the evaluation function will not approach the target value of 0 as a result of the exchange (the case where the function value E is made further away from the target value or the case where there is no change), step S5 is entered and the pixel value exchange probability computation is performed and the "should exchange" judgment is made based on a predetermined probability and the computation result (step S6). Then whereas if the "should exchange" judgment is made, step S7 is entered from step S6 and the exchange of pixel values is performed, if the "should not exchange" judgment is made, step S8 is entered from step S6 and the exchange of pixel values is not performed. Substantially the same results will be obtained even if the branching logic at step S4 is changed so as to branch to step S7 when $\Delta E \leq 0$ and to branch to step S5 when $\Delta E > 0$.

When the exchange process or non-exchange process has thus been completed for a pair of exchange target pixels, a return to step S3 from step S8 is performed and the same processes are executed for the next block. When the processes from step S3 to step S8 have thus been executed for all 256 blocks, the procedures for the first round are completed. When the procedures for the first round have thus been completed, the respective parameters are renewed at step S9, a return to step S3 from step S10 is performed, and the processes for the second round are executed in a repeated manner. That is, the first block is returned to and the exchange process or non-exchange process is executed for a pair of exchange target pixels. Such repetitive processes are performed until the predetermined conditions are satisfied. When the predetermined conditions are satisfied, step S11 is entered from step S10 and the respective pixel values f(i, j) of the pixel array M that is obtained finally in mask storage unit 1 are saved in a storage device, such as a hard disk, etc. The data of the pixel array that has thus been saved make up the dither mask that was intended.

With the embodiment shown in FIG. 16, the predetermined condition that is to be the criteria in step S10 is the number of times that repetition has been executed. The parameter n that was set in step S1 is a counter for counting the number of times of repetition and the initial value is n=1. The parameter N is a parameter that indicates the number of times repetition needs to be executed, and when a total of N repetitions have been completed, the judgment that the predetermined condition has been satisfied is made at step S10. The counter n is thus incremented by just 1 in step S9.

The parameters T1 and a that were set in step S1 are variables for performing the pixel value exchange probability computation in step S5. With the present embodiment, the computation of determining an exchange probability P based on the formula, $P=\exp(-|\Delta E|/Tn)$, is performed in step S5. Here, $\Delta E$ is the difference of the evaluation function values provided by the formula, $\Delta E=E2-E1$, where E1 is the evaluation function value prior to exchange and E2 is the evaluation function value after exchange as was mentioned above and Tn is a temperature parameter that indicates a hypothetical temperature at the point of the n-th repetition process. The initial value T1 of this temperature parameter is set to a predetermined value (0<T1) at step S1 and is renewed in a manner such that it is decreased gradually by the parameter renewal process of step S9. That is, the parameter α that is set at step S1 is a temperature decrease factor that indicates a hypothetical cooling rate and takes on a value in the range of 0<α<1, and by performing the renewal process expressed by the equation Tn+1=Tn·α in step S9, the value of temperature parameter Tn is decreased by α times. The smaller the value to which the temperature decrease factor α is set, the higher the cooling rate of temperature parameter Tn.

Since the exchange probability P is given by the formula, $P=\exp(-|\Delta E|/Tn)$, as was mentioned above, it always takes on a value in the range, 0<P≤1. Also, the greater the absolute value of the difference $\Delta E$ of the evaluation function values, the smaller the exchange probability P and, oppositely, the greater the value of temperature parameter Tn, the greater the exchange probability P. Such setting of the exchange probability P is suitable for making the evaluation function value approach the target value gradually.

That is, the exchange probability P of pixel values is computed in step S5 because it has been judged priorly in step S4 that the difference of the evaluation function values is such that $\Delta E \geq 0$, that is, because it has been judged that "the function value will not approach the target value even if exchange is performed." As was mentioned above, the reason why exchange based on a predetermined exchange probability P is performed in the case where exchange should not be performed primarily is that, in consideration of future variations of the pixel value configuration, there is a possibility that the exchange will result in the function value approaching the target value in the final stage.

However, if the absolute value of $\Delta E$ is too great, since this will mean that the function value will be made extremely far from the target value if exchange is performed, the exchange probability P should be made small in this case. In consideration of this point, settings are made in the above formula so that the greater the absolute value of $\Delta E$ the smaller the exchange probability P. Also, if an exchange that makes the function value further away from the target value is allowed despite the counter n being close to the predetermined number of executions N, there will be the problem that the system cannot be converged towards the provided target value. Thus in consideration of this point, settings are made in the above formula so that whereas the exchange probability P will be large when the value of temperature parameter Tn is large, the exchange probability P decreases as the value of temperature parameter Tn decreases. That is, whereas an initial stage in which the value of counter n is small corresponds to a state of high temperature and the exchange of pixels is performed actively in this stage, as the value of counter n becomes large, the temperature is cooled so that the exchange of pixels will become relaxed and convergence of the system will be achieved.

Such a computer simulation method, wherein a hypothetical temperature parameter Tn and temperature decrease factor α are set, the entire system is varied gradually while gradually decreasing the temperature of the system, and the system is thereby guided to a predetermined convergence state in the final stage, is generally referred to as simulated annealing method. With the embodiment illustrated in the flowchart of FIG. 16, this simulated annealing method is used to determine the exchange probability P and make a judgment at the exchange judgment stage so that the variation of the pixel value configuration by pixel value exchange will converge gradually. Besides this method, various other methods, such as methods that apply a so-called Discrete Combinatory Optimization Algorithm, such as Genetic Algorithms, Great Deluge Algorithm, Ant Colony Algorithm, Tabu Search Algorithm, etc., are known as computer simulation methods by which a system is guided towards a predetermined convergence state in the final stage while the entire system is varied gradually, and such various methods may also be applied to the present invention.

The evaluation function corresponds to the objective function in a discrete combinatory optimization algorithm and is generally called the cost function in the simulated annealing method and is generally called the fitness in Genetic Algorithms.

The exchange probability P corresponds to the factor that is generally called the Boltzmann factor in the simulated annealing method and corresponds to the factor that is generally called the mutation rate in Genetic Algorithms. The parameter N, which indicates the number of times that repetition is executed corresponds to the freezing temperature in the simulated annealing method and corresponds to the number of generations until the final generation in Genetic Algorithms.

Consequently if the procedures shown in the flowchart of FIG. 16 are executed, the pixel value configuration of the pixel array M is varied in the direction in which the function value E of the evaluation function used in the computation stage of step S3 will approach the target value 0 in the end. What kind of pixel value configuration is obtained in the end will be depends on the evaluation function that is used. Also with the present embodiment, since a process of using an evaluation function with which the function value E takes the value of 0 or a positive value and setting the target value to 0 was performed, the variation of pixel value configuration occurred in the direction in which the function value E decreases. However, if the target value is set to ∞, the variation of pixel value configuration will occur in the direction in which the function value E increases. In such a case where the target value is set to ∞, the branching logic at step S4 is reversed so that branching to step S7 will be performed in the case where $\Delta E \geq 0$ (or the case where $\Delta E > 0$) and branching to step S5 will be performed in the case where $\Delta E < 0$ (or the case where $\Delta E \leq 0$).

Obviously, the target value does not have to be set to 0 or ∞ and may be set to an arbitrary value. In any case, it is sufficient that the branching logic at step S4 be such that step S7 is entered if the function value approaches the target value as a result of the exchange and step S5 is entered if the function value does not approach the target value.

A first characteristic of this invention's dither mask generating method is that in the preparation step, the initial pixel values are determined so that the frequencies of occurrence of the respective pixel values will be substantially uniform in each individual block and that the exchange in a subsequent pixel value exchange process is performed only within the range of the same block. As a result, the frequencies of occurrence of pixel values within a single block will be substantially uniform even with the dither mask that is finally obtained. This is a basic function of a dither mask that is required for reproduction of the gray scale information of a continuous-tone image in a halftone image and with a dither mask that is generated by this invention's generation method, this basic function is equipped by each block unit.

A second characteristic of this invention's dither mask generation method is that the pixel value exchange process is carried out randomly in each individual block. By thus performing the pixel value exchange process randomly in block units, periodicity will be eliminated in the pixel value configuration of the dither mask finally obtained. As mentioned above, according to the conventional dither mask so-called "AM screen", there is a problem that unnatural texture, moire pattern or Rosette pattern may be observed due to the existence of periodicity. However, this problem will not occur with the dither mask prepared by this invention's method.

A third characteristic of this invention's dither mask generating method is that an evaluation function that indicates characteristics of the pixel value configuration can be set arbitrarily and the method of exchange judgment based on function values of this evaluation function can be set arbitrarily. Since the characteristics of the pixel value configuration of the dither mask that is finally obtained are varied simply by change of these settings, a dither mask with the desired characteristic can be prepared readily. In particular, the generation of a dither mask called an "art screen," in which a special design pattern is embedded, is made extremely easy.

<<<§4. Dither Mask for Securing the Connectivity of Dots>>>

As was mentioned above, with this invention's dither mask generating method, dither masks of various characteristics can be generated according to the evaluation function and method of exchange judgment used. Thus a method for generating a dither mask that is suited for offset printing shall now be described as specific, practical embodiment.

As was mentioned in §1, for achieving adequate transfer of ink onto the paper side in offset printing, each individual halftone dot preferably has an appropriate area by which satisfactory transfer of ink will be achieved. To be more specific, when the halftone image 202 shown in FIG. 8 and the halftone image shown in FIG. 14D are compared, though in terms of logic, the number of pixels for ink transfer (white pixels in the case of these examples) is four with both images, the latter image in which the individual dots (the pixels for ink transfer) are clustered is preferable for offset printing. Thus a dither mask, which can gather together individual dots and thereby form halftone dots with areas that are suited for ink transfer, that is, a dither mask, with which the connectivity of dots can be secured, is suited for offset printing. As a dither mask with such a characteristic, a spiral type dither mask, such as that shown in FIG. 13A, has been used since priorly. However, with a halftone image that is prepared using such a spiral type dither mask, since the halftone dots are positioned at the central part of the region corresponding to the size of the dither mask, the halftone dots have a periodicity of a period of the size of the dither mask and this causes a problem of generating moire pattern, etc.

With a dither mask generated by this invention's method, since random exchange of pixel values is carried out as has been mentioned above, periodicity is eliminated. However, for obtaining a dither mask that is suited for offset printing, the individual dots must be gathered together as much as possible to form halftone dots of appropriate areas. Obviously since periodicity is eliminated by this invention's method, the locations at which dots concentrate are determined randomly.

In order to generate a dither mask with a characteristic such that individual dots (pixels for ink transfer) will gather together in the halftone image, in other word a characteristic having connectivity of dots, a function that indicates the "similarity" of the pixel values of a plurality of pixels that are positioned near each other is used as the evaluation function and exchange judgment is made based on whether or not the function value approaches a target value of ∞ as a result of the exchange. For example, with the spiral type dither mask shown in FIG. 13A, there is a trend that comparatively small pixel values concentrate near the center and comparatively large pixel values gather near the periphery (this trend is not very significant with the example of FIG. 13A since it is a dither mask with a comparatively small size of 4×4). Thus in both the central part and the peripheral part, the "similarity" of the pixel values of a plurality of pixels that are positioned near each other is high. Thus by executing the pixel value exchange process under the policy of making the function value of an evaluation function that indicates the "similarity" of pixel values approach a target value of ∞ as was mentioned above, a dither mask by which the connectivity of dots is secured will be obtained.

However with regard to the evaluation function, a function that indicates the "difference" of pixel values can be defined more readily and enables easier computation than a function that indicates the "similarity" of pixel values. Thus for practical use, a function that indicates the "difference" of the pixel values of a plurality of pixels that are positioned near each other is used as the evaluation function and exchange judgment is made based on whether or not the function value approaches a target value of 0 as a result of the exchange. Here, the setting of the target value of "difference" to 0 is equivalent to the setting of the target value of "similarity" to ∞. For determination of the "difference" of pixel values, a function, which determines "the absolute value of the difference between pixel values of a single noted pixel and other pixels that are adjacent the noted pixel" for each of all pixels within a single block as a noted pixel and then indicates the sum of the determined values, is defined as the evaluation function. The greater the difference of pixel values with respect to other adjacent pixels, the higher the "difference," and by determining the sum of the absolute values of these differences, the cumulative value of the "difference" within a single block can be obtained.

Figure 18:
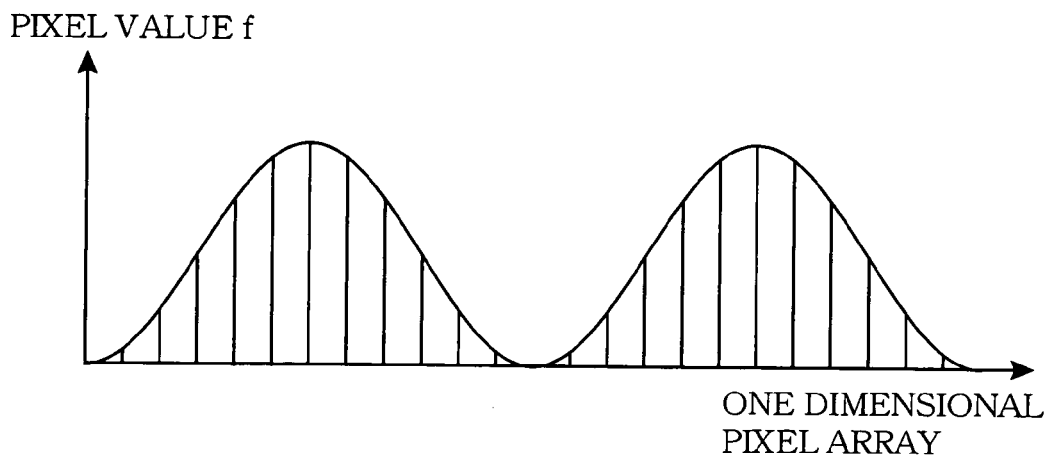
FIG. 18 is a graph, showing a one-dimensional pixel array with which the pixel values vary gradually among neighboring pixels and the "dissimilarity" of the pixel values of adjacent pixels is extremely small.
Figure 19:
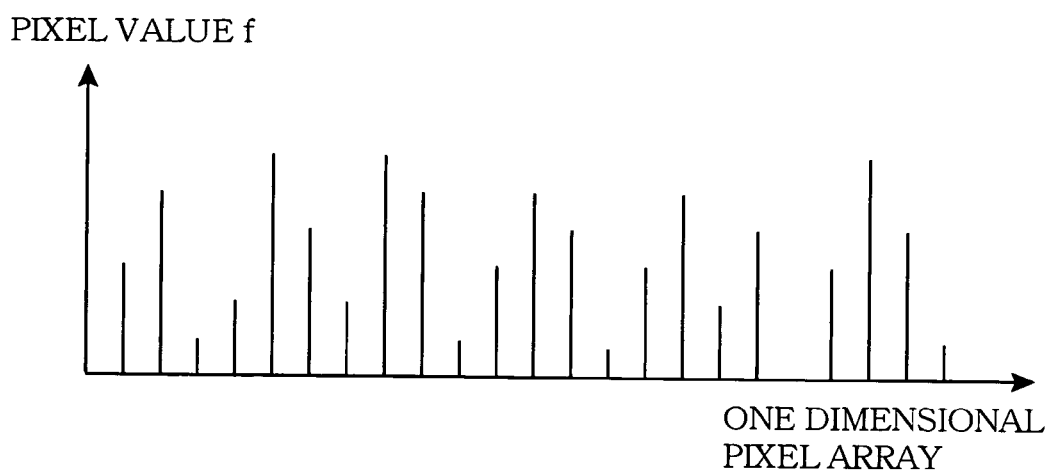
FIG. 19 is a graph, showing a one-dimensional pixel array with which the pixel values vary steeply among neighboring pixels and the "dissimilarity" of the pixel values of adjacent pixels is extremely large.

To help conceptual understanding of the abovementioned principles, one-dimensional pixel arrays, such as those shown in FIG. 18 and FIG. 19, shall be considered. In both of these cases, the abscissa indicates a one-dimensional pixel array and the ordinate indicates the pixel value f of each pixel. With the example shown in FIG. 18, the pixel values of adjacent pixels vary smoothly and the "difference" of pixel values of adjacent pixels is extremely small. In other words, when a certain pixel is noted, a comparison of its pixel value with those of adjacent pixels to the left and right shows the values to be extremely similar. A dither mask with such a characteristic has the characteristic of gathering together individual dots in the halftone image and can said to be dither mask that is suited for the case where offset printing is to be performed. In contrast, with the example shown in FIG. 19, the pixel values of adjacent pixels vary abruptly and the "difference" of pixel values of adjacent pixels is extremely large. In other words, when a certain pixel is noted, a comparison of its pixel value with those of adjacent pixels to the left and right shows the values to be extremely different. A dither mask with such a characteristic has the characteristic of dispersing individual dots on the halftone image and though unsuitable for offset printing, such a dither mask is suitable for printing by an ink jet printer as shall be described in §5.

Figure 20:
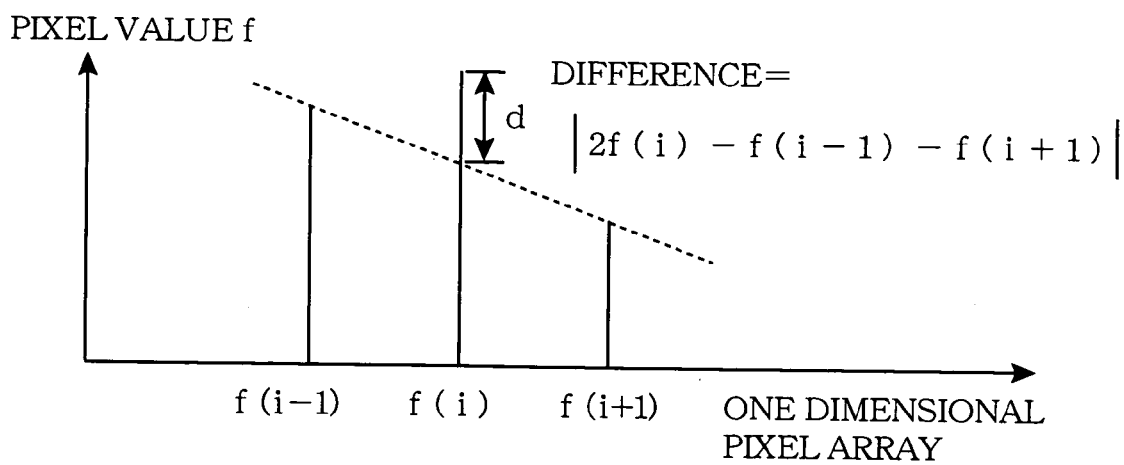
FIG. 20 is a graph, showing an example of comparing the pixel value f(i) of a noted pixel with the pixel values f(i−1) and f(i+1) of pixels that are adjacent to the left and right.

Thus in order to define the "difference" between the pixel values of adjacent pixels in a one-dimensional pixel array, the pixel value f(i) of a noted pixel may be compared with the pixel values f(i−1) and f(i+1) of the pixels that are adjacent to the left and right as shown in FIG. 20. If the pixel value f(i) of the noted pixel is plotted on a gradual envelope indicated by a broken line in the Figure, the envelope of the pixel values of the respective pixels will be extremely smooth and it can be judged that the "difference" is extremely small. However, when as in the case of the illustrated example, the pixel value f(i) of the noted pixel is greater by an amount d (or smaller by an amount d) than the envelope indicated by the broken line, the "difference" of pixel values with respect to adjacent pixels can be expressed by the value d for the noted pixel. Actually in consideration of the ease of computation, the value;

$$|2f(i)-f(i-1)-f(i+1)|$$

(corresponding to twice the value of d indicated in the Figure) may be defined as the "difference" for the noted pixel. Mathematically, the value determined by the above formula corresponds to the absolute value of a one-dimensional Laplacian.

Since a dither mask is actually a two-dimensional pixel array, the difference of pixel value of a noted pixel with respect to two-dimensionally adjacent pixels can be defined by "the absolute value of the two-dimensional Laplacian for each pixel in the case where the pixel value configuration within a single block is expressed by the function f(x, y) in a two-dimensional xy-coordinate system," and a function, which determines such a difference for single pixel for each of all pixels within a single block and then indicates the total sum of these differences, is defined as the evaluation function. For practical use, instead of determining a two-dimensional Laplacian, it is sufficient to determine the total of the absolute values of one-dimensional Laplacians for the four axial directions in total, that is, the x-axis direction, y-axis direction, and two axial directions that form a 45° angle with respect to these coordinate axes.

Figure 21:
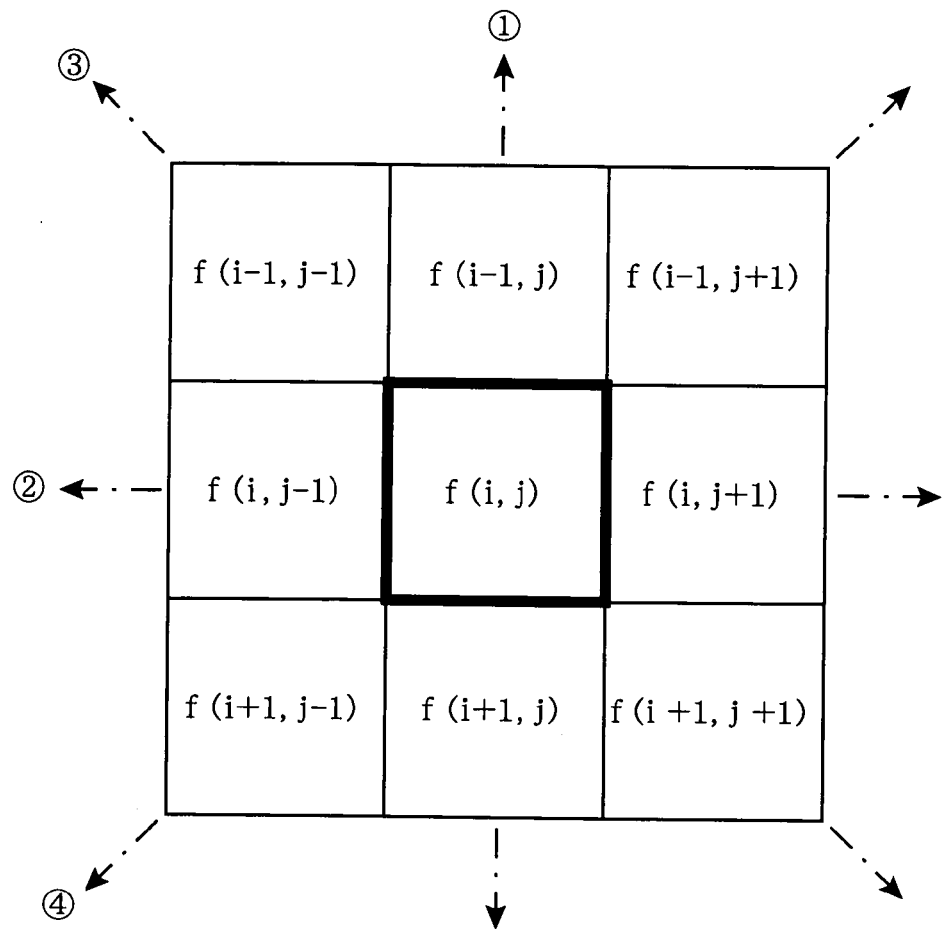
FIG. 21 is a plan view, illustrating the principles of computing a one-dimensional Laplacian for four axial directions of a pixel array.

FIG. 21 is a plan view, which illustrates the principles for computing such one-dimensional Laplacians for four axial directions. The pixel indicated at the center of the upper side of the Figure is the noted pixel and has a pixel value f(i, j). When the pixel values of the eight pixels that are adjacent the noted pixel are defined as shown in the Figure, the differences in regard to the respective axial directions are defined by the formulae shown at the lower side of the Figure. Thus if the sum of the differences in the four axial directions is defined as the difference for the noted pixel and the function that indicates the total sum of the differences of all pixels within one block is defined as evaluation function E1, the evaluation function E1 with the following expression can be defined:

$$E1 = \Sigma_{i=0 \ to \ I-1, \ j=0 \ to \ J-1}$$

$$|2f(i, j) - f(i-1, j) - f(i+1, j)| +$$
$$|2f(i, j) - f(i, j-1) - f(i, j+1)| +$$
$$|2f(i, j) - f(i-1, j-1) - f(i+1, j+1)| +$$
$$|2f(i, j) - f(i+1, j-1) - f(i-1, j+1)|$$

In the above formula;

E1: function value of the evaluation function

I: total number of rows of the pixel array that makes up a single block

J: total number of columns of the pixel array that makes up a single block i: row number of the noted pixel in a single block (0, 1, 2, . . . , I−1)

j: column number of the noted pixel in a single block (0, 1, 2, . . . , J−1)

f(i, j): pixel value of the pixel of the i-th row and j-th column

Though in performing the above computation with the noted pixel being the pixel positioned at the outermost side of the pixel array that makes up a single block, there may arise a case wherein an adjacent pixel does not exist, in this case it may be presumed that periodicity exists within the same block and a computation using a cycling of the pixel values may be performed. To be more specific, when i=0, (I−1) may be used in place of the value of (i−1), when j=0, (J−1) may be used in place of the value of (j−1), when i=(I−1), 0 may be used in place of the value of (i+1), and when j=(J−1), 0 may be used in place of the value of (j+1).

The above-described evaluation function E1 indicates a characteristic value that is generally called the contour strength and is a function that theoretically takes on a value of 0 or a positive value (0≦E1<∞). Here, the closer the function value is to 0, the smaller the "difference," indicating that a dither mask that secures the connectivity of dots and is suited to offset printing can be realized. Here, when the process of step S3 shown in the flowchart of FIG. 16 is executed using the evaluation function E1 expressed by the above formula (as was mentioned above, the branching at step S4 of this FIG. 16 is a branching process with which the target value is set to 0), the connectivity of each dot becomes high and a dither mask that is suited for offset printing of good ink transfer can be obtained.

Lastly, in order to illustrate the effects of this invention, the differences that arise in actual printed matter prepared using a prior-art dither mask that is generally called an "AM screen" and those prepared using a dither mask generated by this invention's method using the above-described evaluation function E1 (this dither mask shall be referred to hereinafter as the "offset printing mask") shall be described.

Figure 22:
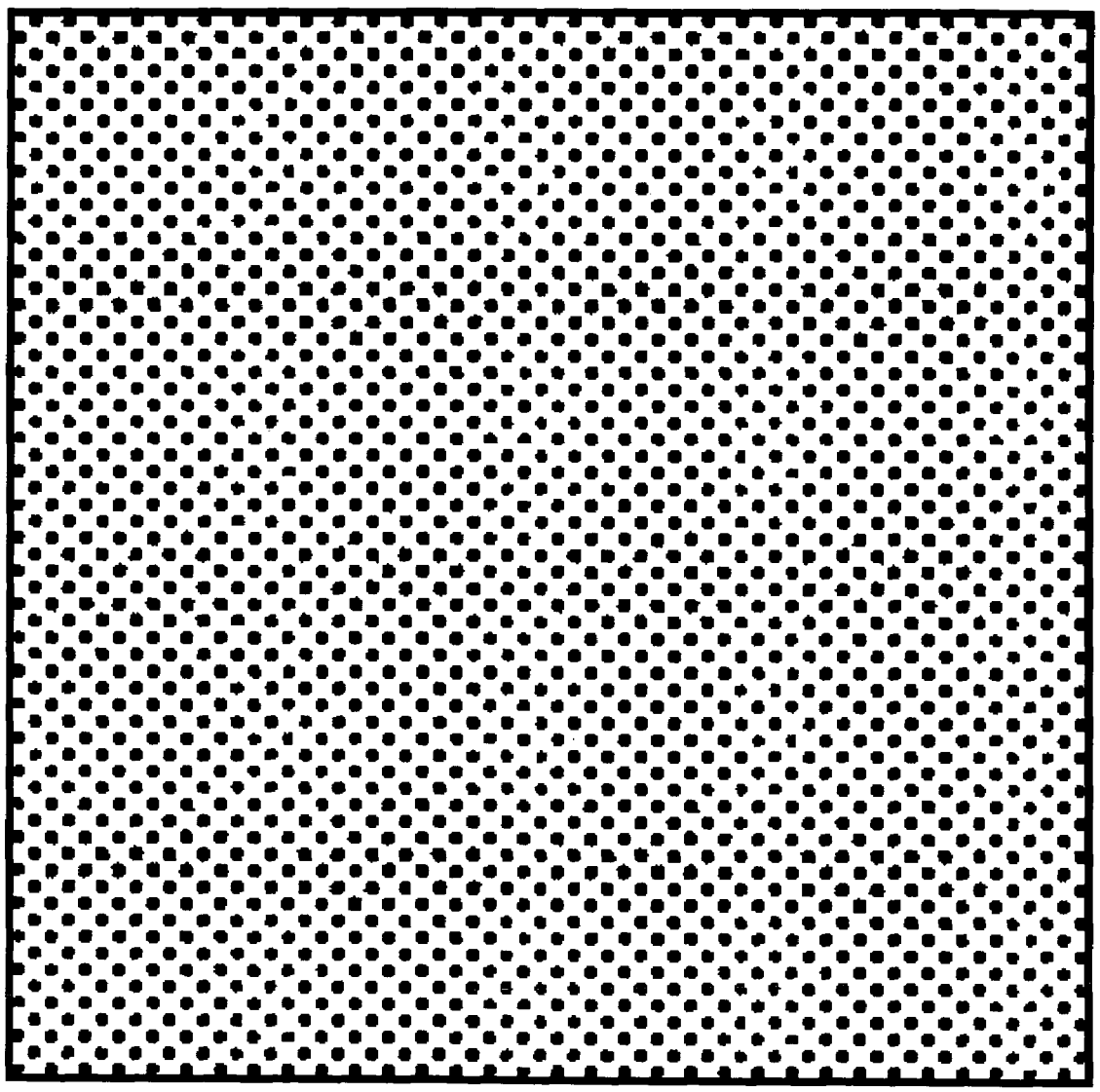
FIG. 22 is a plan view, showing the printing result of a halftone image obtained from an original image, comprising a gray pattern of single density, using a prior-art "AM screen" as the dither mask.
Figure 23:
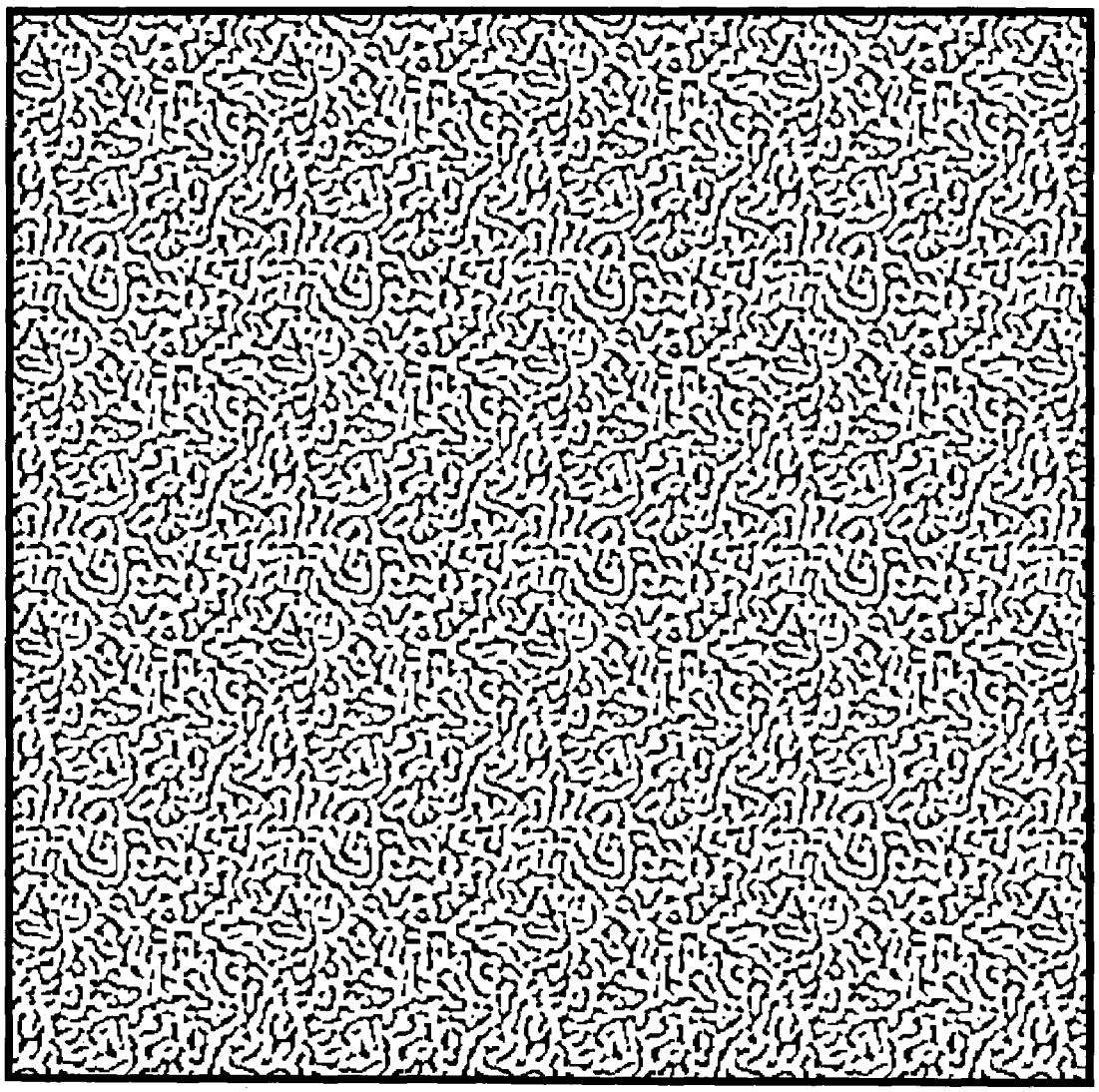
FIG. 23 is a plan view, showing the printing result of a halftone image obtained from an original image, comprising a gray pattern of single density, using an "offset printing mask" by this invention as the dither mask.

Both the printing result of FIG. 22 and the printing result of FIG. 23 are printing results of halftone images obtained using, as an original image, an 8-bit tone (pixel values ranging from 0 to 255) continuous-tone image of a single-density pattern with which all pixel values P=192. Whereas FIG. 22 is the printing result obtained using the prior-art "AM screen" as the dither mask, FIG. 23 is the printing result obtained using this invention's "offset printing mask" as the dither mask. Both results share in common the points that the area of white parts take up approximately 192/255 of the entirety and that each individual halftone dot has a comparatively wide area. Thus in both cases, the conditions of transfer of ink are satisfactory and good offset printing halftone images are obtained. However, with the printing result of FIG. 22, it can be seen that each individual halftone dot has a substantially circular shape and the halftone dots are positioned at fixed pitch in the vertical and horizontal directions. This kind of periodicity of dot configuration causes a problem of moire pattern, etc. On the contrary, according to the printing result of FIG. 23, individual halftone dots have an arbitrary shape respectively and locate at random position. Therefore, the periodicity of the halftone dots is completely eliminated and there is no factor to cause a problem of moire pattern, etc.

Figure 24:
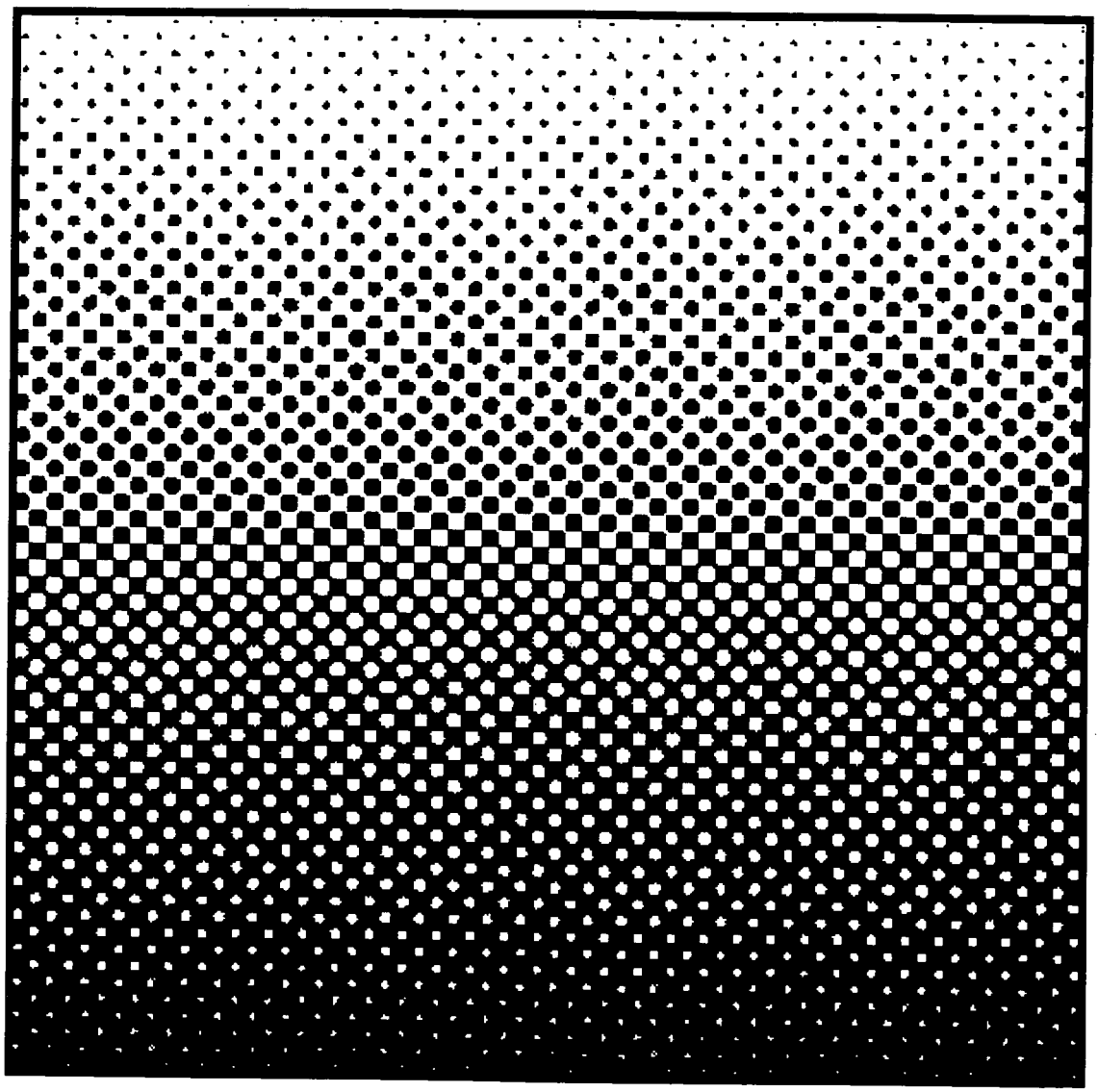
FIG. 24 is a plan view, showing the printing result of a halftone image obtained from an original image, comprising a gradation pattern such as that shown at the left side of FIG. 1, using a prior-art "AM screen" as the dither mask.
Figure 25:
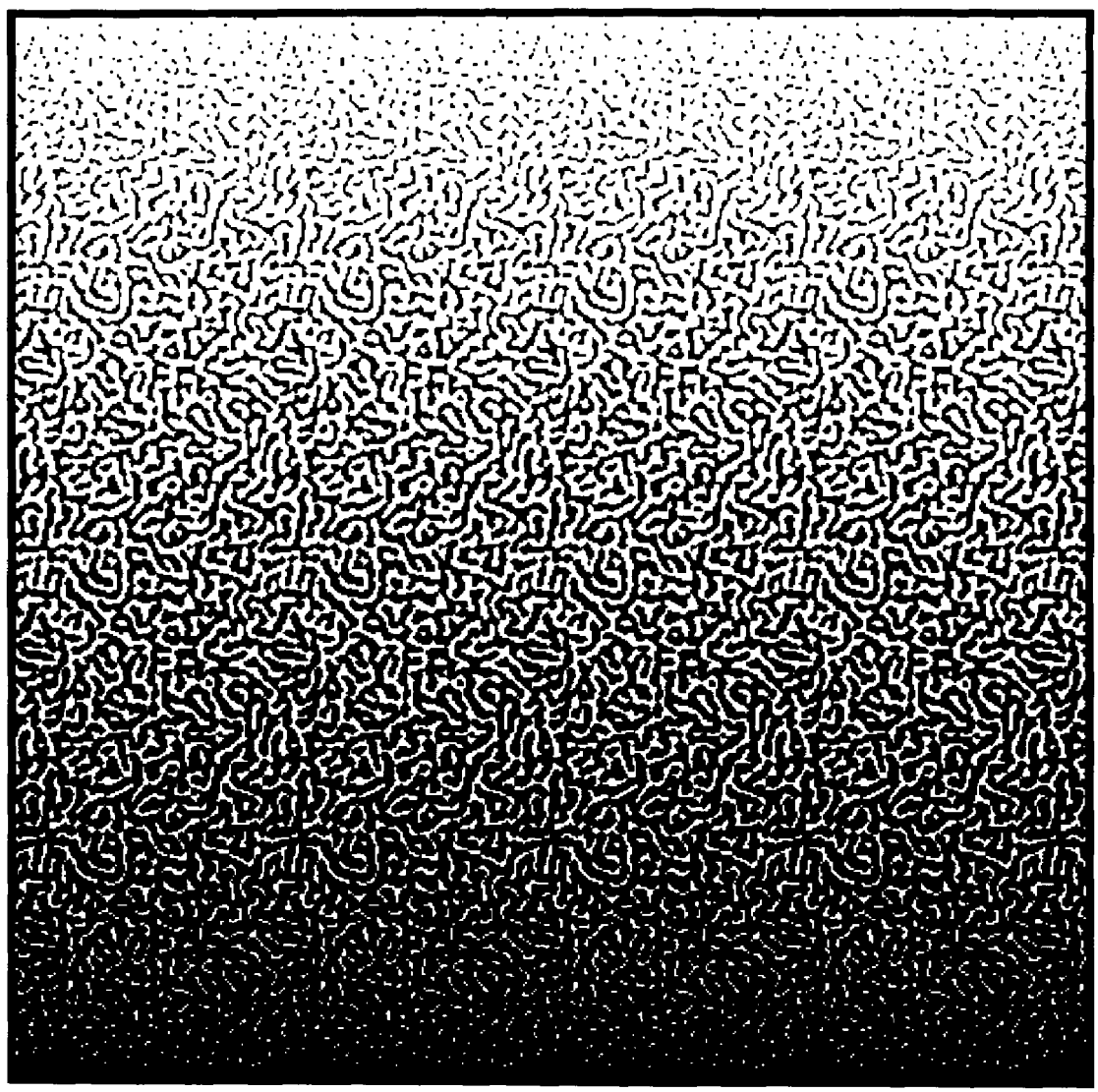
FIG. 25 is a plan view, showing the printing result of a halftone image obtained from an original image, comprising a gradation pattern such as that shown at the left side of FIG. 1, using an "offset printing mask" by this invention as the dither mask.

Next, the printing result of FIG. 24 and the printing result of FIG. 25 are printing results of halftone images obtained using, as an original image, an 8-bit tone (pixel values ranging from 0 to 255) continuous-tone image of a gradation pattern (for example, a pattern such as that of the continuous-tone image 100 shown in FIG. 1) with which the pixel values are varied gradually in the range of P=0 to 255 in the up/down direction. Whereas FIG. 24 is the printing result obtained using the prior-art "AM screen" as the dither mask, FIG. 25 is the printing result obtained using this invention's "offset printing mask" as the dither mask. Both results share in common the points of being gradation patterns in the up/down direction and that each individual halftone dot has a comparatively wide area. Thus in both cases, the conditions of transfer of ink are satisfactory and good offset printing halftone images are obtained. However, whereas with the printing result of FIG. 24, periodicity can be seen in the halftone dot configuration which causes a problem of moire pattern, etc., with the printing result of FIG. 25, periodicity of the halftone dots is completely eliminated and there is no factor to cause a problem of moire pattern, etc.

Figure 26:
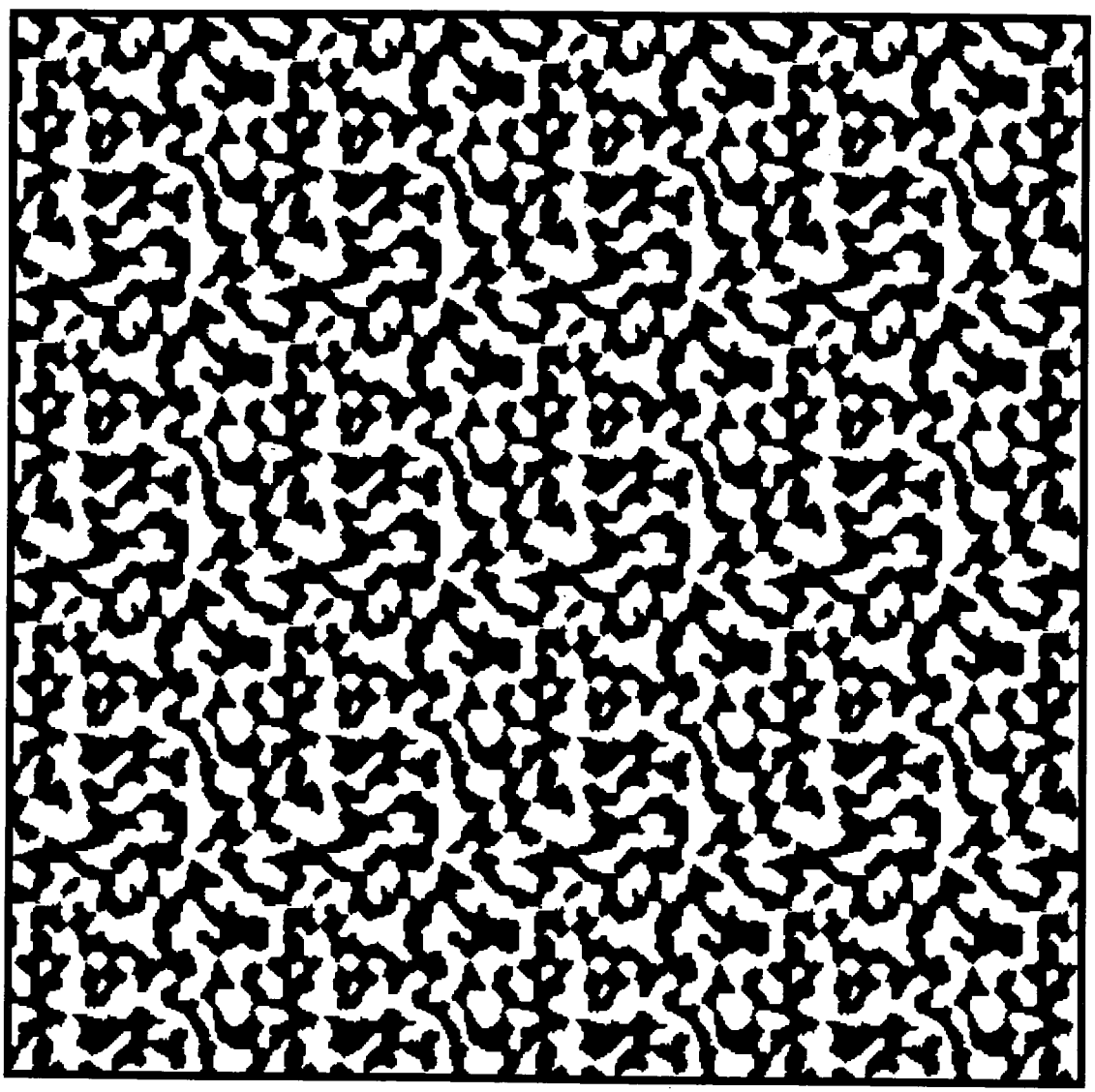
FIG. 26 is a plan view, showing the printing result of a halftone image obtained from an original image, comprising a gray pattern of single density, using an "offset printing mask," generated by a first parameter setting, as the dither mask.
Figure 27:
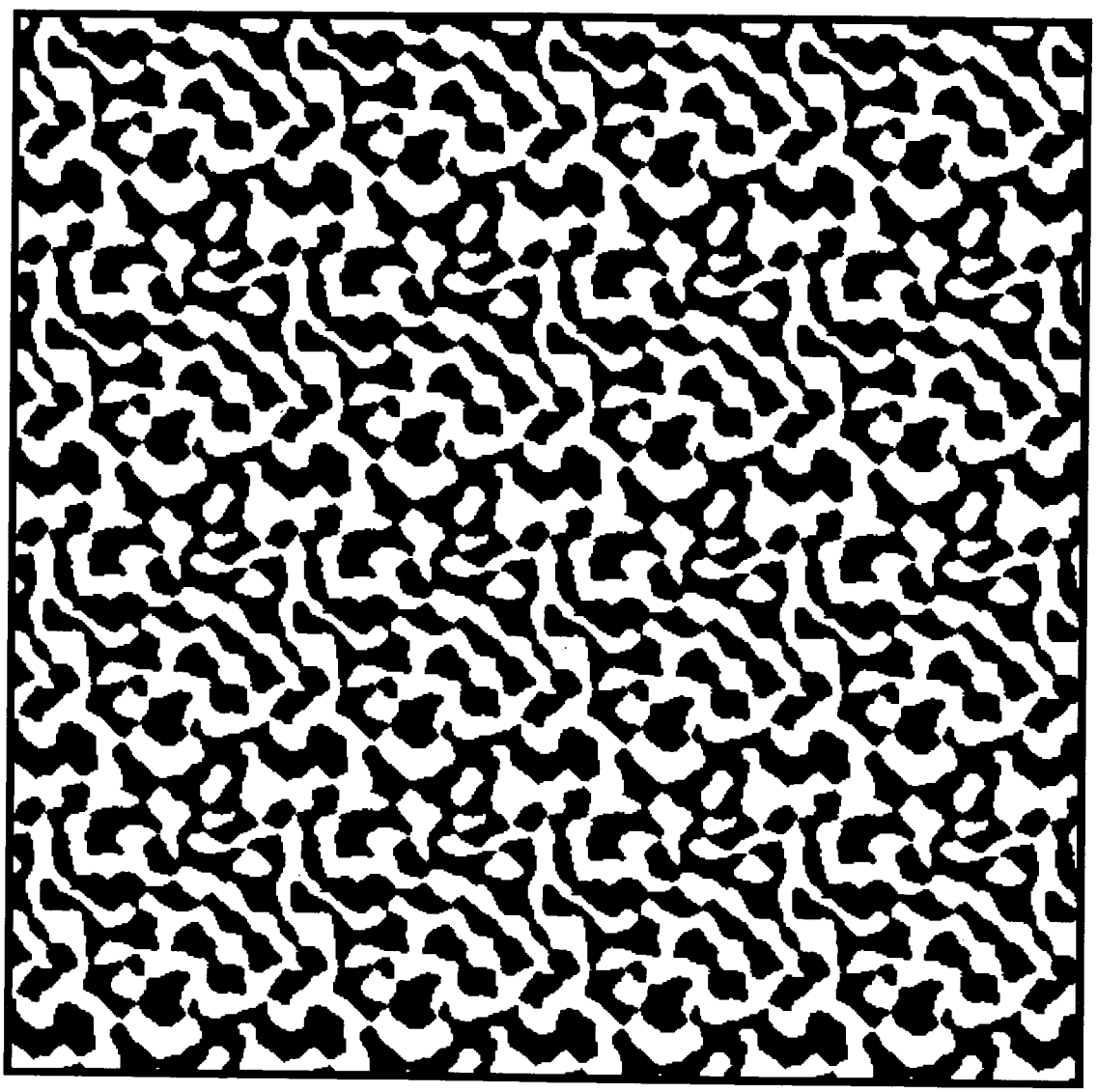
FIG. 27 is a plan view, showing the printing result of a halftone image obtained from an original image, comprising a gray pattern of single density, using an "offset printing mask," generated by a second parameter setting, as the dither mask.
Figure 28:
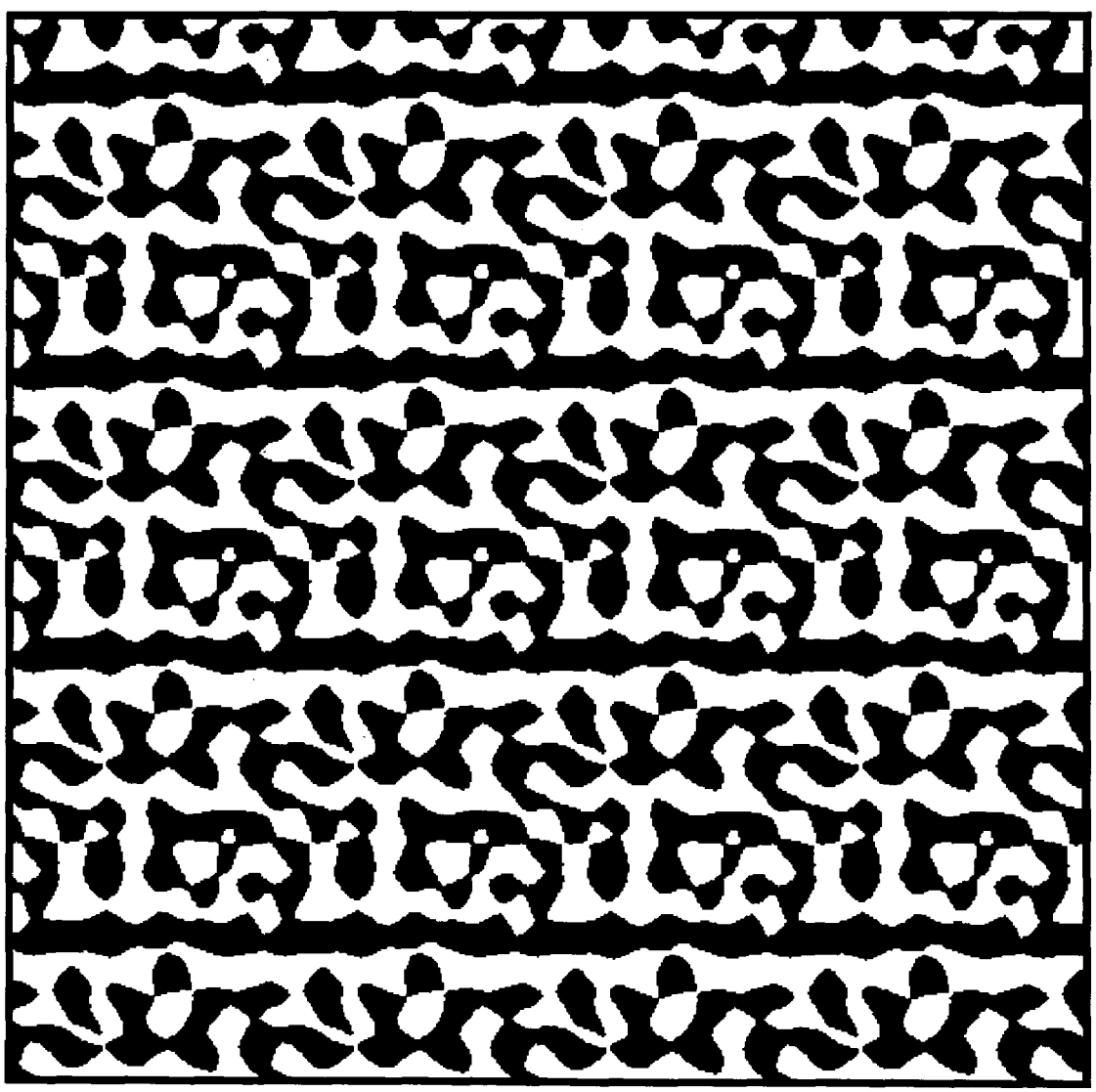
FIG. 28 is a plan view, showing the printing result of a halftone image obtained from an original image, comprising a gray pattern of single density, using an "offset printing mask," generated by a third parameter setting, as the dither mask.

Thus the use of an "offset printing mask" generated by this invention's method provides the merits that halftone dots, which have random, free shapes and yet are comparatively large in area, can be formed and that periodicity can be eliminated completely. Also, the areas of the individual halftone dots can be controlled to some degree by varying the parameters for the dither mask generating process. For example, all of the printing results shown in FIG. 26 through FIG. 28 are printing results of halftone images obtained using, as an original image, an 8-bit tone (pixel values ranging from 0 to 255) continuous-tone image of a single-density pattern with which all pixel values P=192, and all are printing results obtained using this invention's "offset printing masks." However, these differ in the settings of the various parameters used in the processes of generating the "offset printing masks." That is, the printing result of FIG. 26 is the result of using a dither mask that was generated under a condition of decreasing the temperature rapidly, the printing result of FIG. 27 is the result of using a dither mask generated under the condition of decreasing the temperature at an intermediate rate, and the printing result of FIG. 28 is the result of using a dither mask that was generated under a condition of decreasing the temperature slowly.

Though for the sake of convenience, dither masks suited for securing the connectivity of dots were described as dither masks suited for offset printing, such dither masks are suited not only for offset printing but may also be used adequately in other printing methods as well. <<<§5. Dither Mask for Securing the Dispersion of Dots>>>

Next, a method of generating dither masks that are suited for printing by an ink jet printer shall be described as a practical and specific embodiment. For the above-described offset printing, each individual dot preferably has a suitable area and a dither mask that secures the connectivity of dots is used. On the other hand, in the case of performing printing using an ink jet printer, since a granular texture is exhibited when each halftone dot is recognizable by the naked eye, the individual halftone dots are preferably made as small and dispersed as possible. More specifically, the halftone image 202 shown in FIG. 8 is more suited than the halftone image shown in FIG. 14D for printing by an ink jet printer.

To generate a dither mask with a characteristic with which the individual dots (the pixels for ink transfer) on a halftone image will become dispersed, an evaluation function that provides the exact opposite action as that of the above-described evaluation function used in generating the dither mask for offset printing is prepared. Or the target value may be set in an exactly opposite manner. For example, if a function that indicates the "similarity" of the pixel values of a plurality of pixels that are positioned near each other is used, exchange judgment is made based on whether or not the function value approaches a target value of 0 as a result of the exchange.

However, since as an evaluation function, a function that indicates the "difference" of pixel values can be defined more readily and enables easier computation than a function that indicates the "similarity" of pixel values as was mentioned above, for practical use, a function that indicates the "difference" of the pixel values of a plurality of pixels that are positioned near each other is used as the evaluation function and exchange judgment is made based on whether or not the function value approaches a target value of ∞ as a result of the exchange. To determine the "difference" of pixel values, a function, which determines the "absolute value of the difference between pixel values of a single noted pixel and other pixels near the noted pixel" for each of all pixels within a single block as a noted pixel and then indicates the total sum of these determined values, is defined as the evaluation function.

Figure 29:
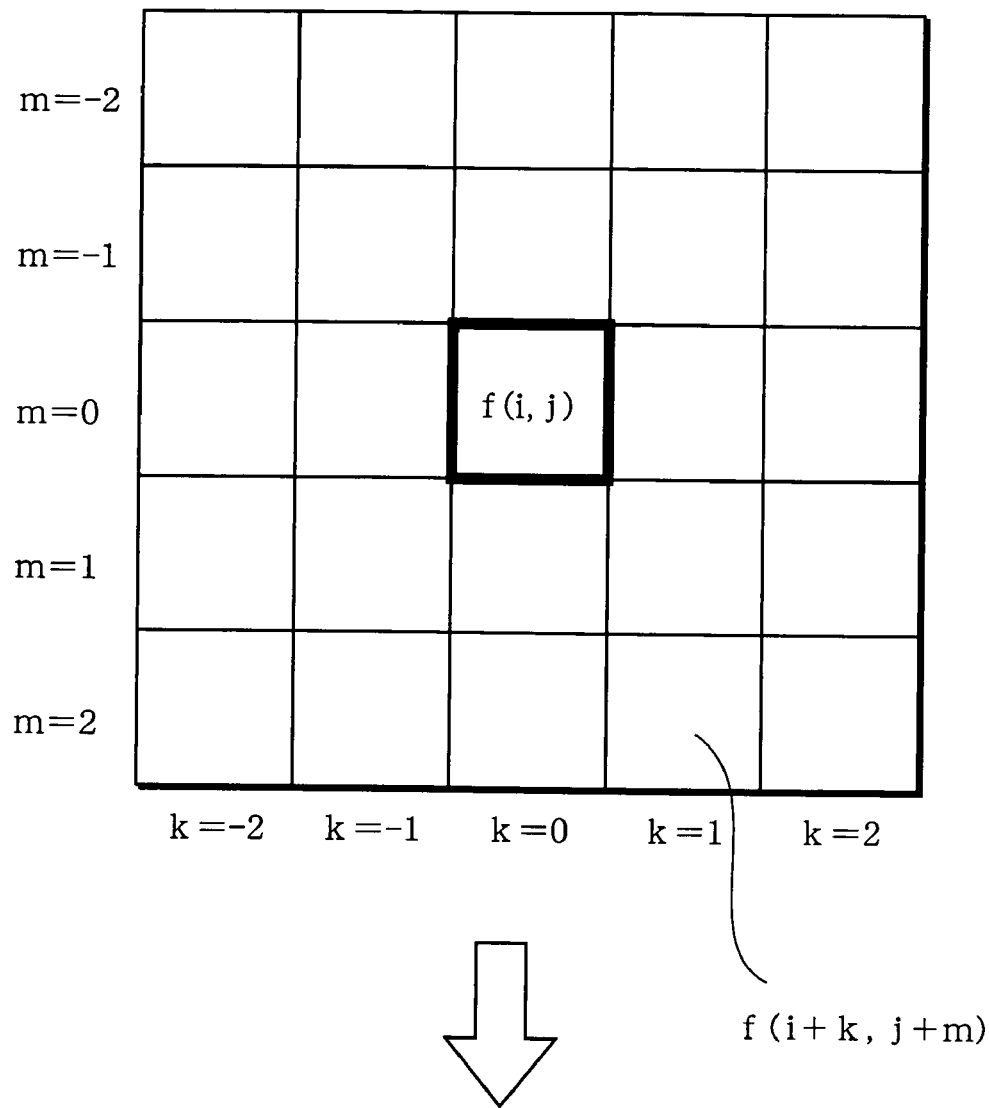
FIG. 29 is a plan view, showing an example of comparing the pixel value f(i, j) of a noted pixel with the pixel value f(i+k, j+m) of a pixel near the noted pixel.
Figure 29:
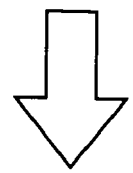

To be more specific, "for a single noted pixel, a plurality of near pixels that are located near the noted pixel are defined and the total sum, of the absolute values of the differences between the pixel value of the single noted pixel and the pixel value of a single near pixel that have been determined for all of the plurality of near pixels," is determined. FIG. 29 is a plan view, which illustrates the principle for computing such a total sum. The pixel indicated at the center of the upper side of the Figure is the noted pixel and has a pixel value f(i, j). Here, 24 pixels that exist in the surroundings of the noted pixel are defined as the near pixels. As shown in the Figure, when for each near pixel, the separation from the noted pixel in the horizontal direction is expressed by k (k=−2, −1, 0, 1, 2) and the separation in the vertical direction is expressed by m (m=−2, −1, 0, 1, 2), the pixel value of each individual near pixel can be expressed as f(i+k, j+m). Since the absolute value of the difference between the pixel value of the noted pixel and a single near pixel will then be;

$$|f(i, j)-f(i+k, j+m)|$$

the total sum, of the absolute values of the differences between the pixel value of the noted pixel and the pixel values that have been determined for the 24 near pixels that exist in the surroundings of the noted pixel, will be;

$$\Sigma_{k=-2 \text{ to } 2, m=-2 \text{ to } 2}|f(i, j)-f(i+k, j+m)|$$

as indicated at the lower side of FIG. 29. Here, if a parameter q is defined for setting the range of near pixels and the range of the horizontal direction separation k from the noted pixel is extended to k=−q to q and the range of the vertical direction separation m is extended to m=−q to q (the example shown at the upper side of FIG. 29 will then be one for which q=2), the above formula will be as follows:

$$\Sigma_{k=-q \text{ to } q, m=-q \text{ to } q}|f(i, j)-f(i+k, j+m)|$$

Thus if the value indicated by this formula is defined as the difference for the noted pixel and a function that indicates the total sum of the differences for all pixels in a single block is to be defined as the evaluation function E2, the evaluation function E2 can be defined as expressed by the following formula:

$$E2=\Sigma_{i=0 \text{ to } I-1, j=0 \text{ to } J-1}\Sigma_{k=-q \text{ to } q, m=-q \text{ to } q}|f(i, j)-f(i+k, j+m)|$$

In the above

E2: function value of the evaluation function

I: total number of rows of the pixel array that makes up a single block

J: total number of columns of the pixel array that makes up a single block i: row number of the noted pixel in a single block (0, 1, 2, . . . , I−1)

j: column number of the noted pixel in a single block (0, 1, 2, . . . , J−1)

k: separation from the noted pixel in the row direction (number of pixels)

m: separation from the noted pixel in the column direction (number of pixels)

q: parameter that sets the range of near pixels (number of pixels)

f(i, j): pixel value of the pixel of the i-th row and j-th column

Though in performing the above computation with the noted pixel being the pixel positioned at the outermost side of the pixel array that makes up a single block, there may arise a case wherein an adjacent pixel does not exist, in this case it may be presumed that periodicity exists within the same block and a computation using a cycling of the pixel values may be performed.

The above-described evaluation function E2 is a function that theoretically takes on a value of 0 or a positive value (0≦E2<∞), and the closer the function value is to ∞, the greater the "difference" and the higher the dispersion of dots, indicating that a dither mask that is suited to printing by an ink jet printer can be realized.

The same applies in the case where the following evaluation function E3 is used in place of the above-described evaluation function E2:

$$E3=\Sigma_{i=0 \text{ to } I-1, j=0 \text{ to } J-1}\Sigma_{k^2+m^2\leq r^2}|f(i, j)-f(i+k, j+m)|$$

In the above:

E3: function value of the evaluation function

I: total number of rows of the pixel array that makes up a single block

J: total number of columns of the pixel array that makes up a single block i: row number of the noted pixel in a single block (0, 1, 2, . . . , I−1)

j: column number of the noted pixel in a single block (0, 1, 2, . . . , J−1)

k: separation from the noted pixel in the row direction (number of pixels)

m: separation from the noted pixel in the column direction (number of pixels)

r: parameter that sets the range of near pixels f(i, j): pixel value of the pixel of the i-th row and j-th column $\Sigma k^2+m^2\leq r^2$ indicates the total sum concerning the pixels within a circular region of radius r.

With this evaluation function E3, instead of defining pixels within a rectangular region surrounding the noted pixel as near pixels, the pixels existing within a circular region of radius r from the center of the noted pixel are defined as near pixels. When the region of definition of near pixels is thus made circular, isotropy is obtained in comparison to the case where the region of definition is made rectangular, and isotropy will also be exhibited in the pixel value configuration of the dither mask that is obtained. Isotropy will also be exhibited in the halftone image that is prepared in the final stage and a more natural pseudo-grayscale expression becomes possible.

According to the above described embodiment, since in order to generate a dither mask that is suited for printing by an ink jet printer, the evaluation function E2 or E3, which indicates the "difference" as has been described above, is used and the target value is set to ∞, the branching logic at step S4 in the procedures shown in the flowchart of FIG. 16 must be reversed. Or, if in place of using the evaluation function E2 or E3, which indicates the "difference," the evaluation function 1/E2 or 1/E3, which corresponds to being the inverse of E2 or E3 (and indicates a function value that is generally called smoothness), is used, since the target value can then be set to 0, the procedures shown in the flowchart of FIG. 16 may be used as they are.

Figure 30:
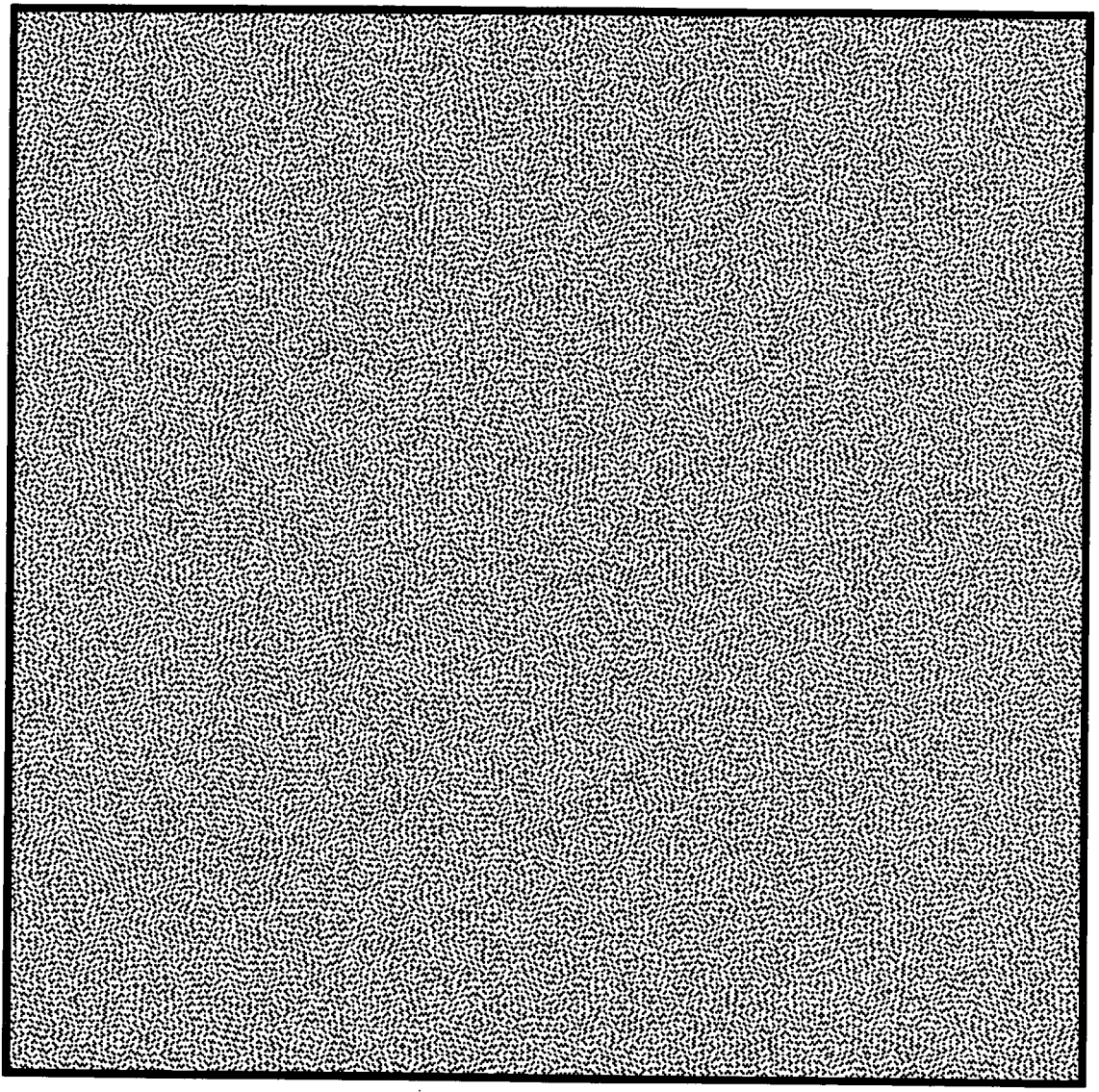
FIG. 30 is a plan view, showing the printing result of a halftone image obtained from an original image, comprising a gray pattern of single density, using an "ink jet printer mask" by this invention as the dither mask.

Lastly, actual printing results obtained by using dither masks suited for printing by an ink jet printer that were generated by this invention's method shall be indicated. First, the printing result of FIG. 30 is a printing result of a halftone image obtained using, as an original image, an 8-bit tone (pixel values ranging from 0 to 255) continuous-tone image of a single-density pattern with which all pixel values P=192, and corresponds to being a printing result using the same original image as the printing result shown in FIG. 22 or FIG. 23. Though the gray scale information that the area of the white part takes up approximately 192/255 of the entirety is expressed accurately, the respective areas of the individual halftone dots are all small and dispersed. A granular texture can thus be reduced even if printing by an ink jet printer is performed (though considerably rough halftone dots that are observable by the naked eye have been generated for the sake of description with the examples of FIG. 30 and FIG. 31, in practical, the image is expressed by finer halftone dots). Of course, no periodicity can be seen in the halftone dot configuration in the image and there is no factor to cause a problem of moire pattern, etc.

Figure 31:
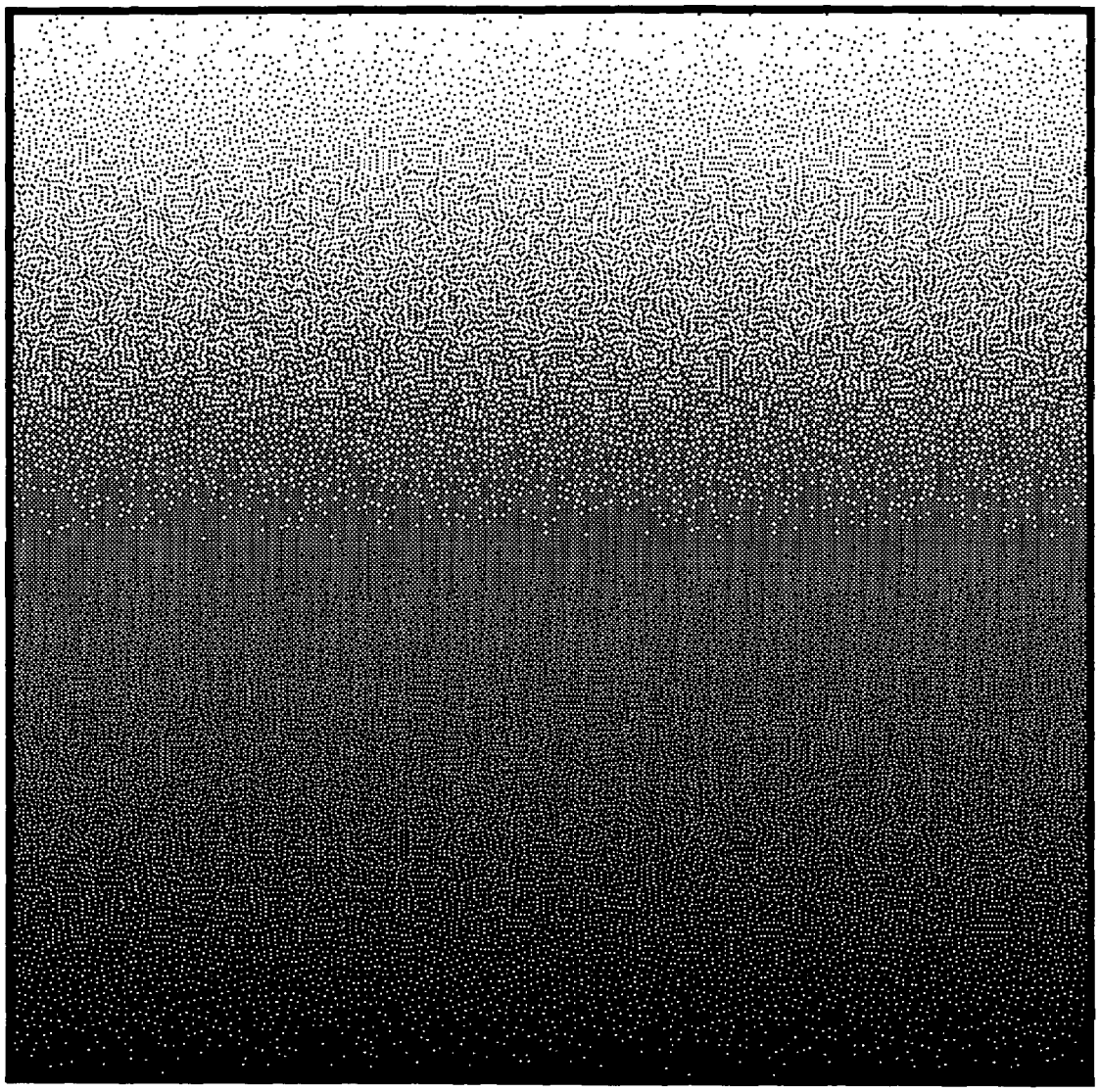
FIG. 31 is a plan view, showing the printing result of a halftone image obtained from an original image, comprising a gradation pattern such as that shown at the left side of FIG. 1, using an "ink jet printer mask" by this invention as the dither mask.

Meanwhile, the printing result of FIG. 31 is a printing result of a halftone image obtained using, as an original image, an 8-bit tone (pixel values ranging from 0 to 225) continuous-tone image of a gradation pattern (for example, a pattern such as that of the continuous-tone image 100 shown in FIG. 1) with which the pixel values are varied gradually in the range of P=0 to 255 in the up/down direction and corresponds to being a printing result using the same original image as the printing result shown in FIG. 24 or FIG. 25. As shown in the figure, the gradation pattern in the up/down direction is adequately expressed and the periodicity of the halftone dots is eliminated so as not to cause a problem of moire pattern, etc.

Though for the sake of convenience, dither masks suited for securing the dispersion of dots were described as dither masks suited for printing by an ink jet printer, such dither masks are suited not only for printing by an ink jet printer but may also be used adequately in other printing methods as well. For example, the dither masks described in this §5 can serve functions equivalent to prior-art "FM screens" and may be used in printing methods that make use of prior-art "FM screens."<<<§6. Dither Masks that Function as Art Screens>>>

Here, a specific embodiment that generates a dither mask, which is generally called an "art screen," by using this invention's method shall be described. An "art screen" has a special design pattern embedded therein as information, and, in the process of converting an original image into a halftone image, serves the function of modulating the gray scale information of the original image by this special design pattern. Such a design pattern to be embedded in an "art screen" shall be referred to as a "primitive design image." When a dither mask in which a pattern is embedded as the primitive design image is used, this pattern will be reflected in the halftone image. If the primitive design image is a canvas cloth pattern, the halftone image will be an image that looks like it has been drawn on canvas.

Figure 32:
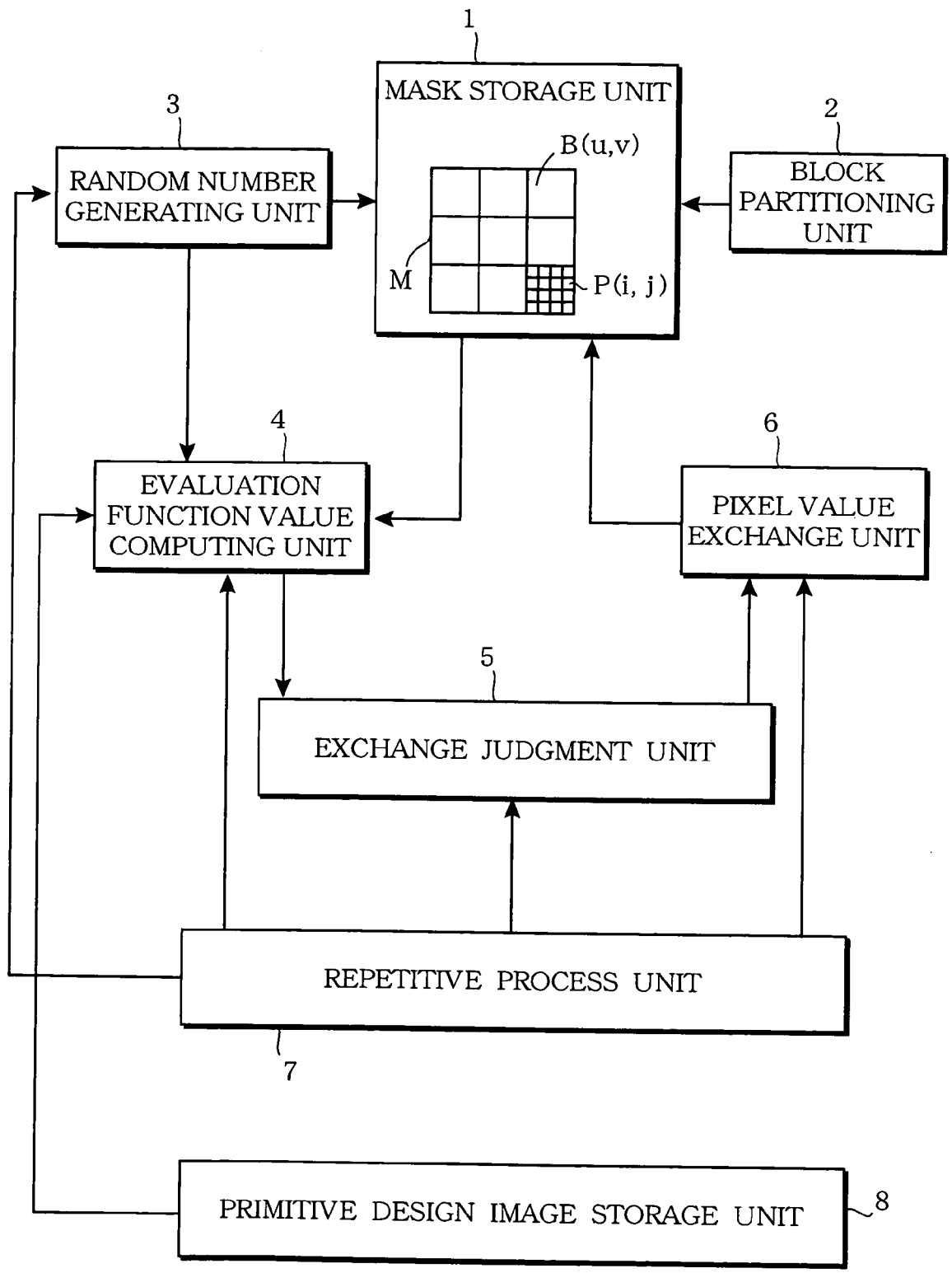
FIG. 32 is a block diagram, showing the basic arrangement of this invention's dither mask generating device, which has a function of generating an art screen.

FIG. 32 is a block diagram, showing the arrangement of a device that generates an above-described dither mask called an "art screen." Obviously in the process of generating a design mask in which a primitive design image is embedded, the primitive design image to be embedded must be prepared as data. The generating device shown in FIG. 32 is thus furthermore provided with a primitive design image storage unit 8 for storing the image data that make up the primitive design image. The only differences between the generating device shown in FIG. 15 and the generating device shown in FIG. 32 are that with the latter generating device, the primitive design image storage unit 8 is added further and the evaluation function value computing unit 4 carries out computation of a function value using an evaluation function that indicates the "degree of matching" or "difference" between the primitive design image and an image expressed by the pixels in a single block that makes up the dither mask.

That is, in the case where a function, which indicates the "difference" between the pixel value configuration of a priorly prepared primitive design image and the pixel value configuration within a single block that makes up the dither mask, is used as the evaluation function, the exchange judgment is made based on whether or not the function value approaches a target value of 0 as a result of the exchange. Oppositely, in the case where a function that indicates the "degree of matching" is used, the exchange judgment is made based on whether or not the function value approaches a target value of ∞ as a result of the exchange. However, since a function that indicates the "difference" of pixel value configurations is easier to define and enables computation to be performed more readily than a function that indicates the "degree of matching," it is preferable for practical purposes to use a function that indicates the "difference."

Figure 33:
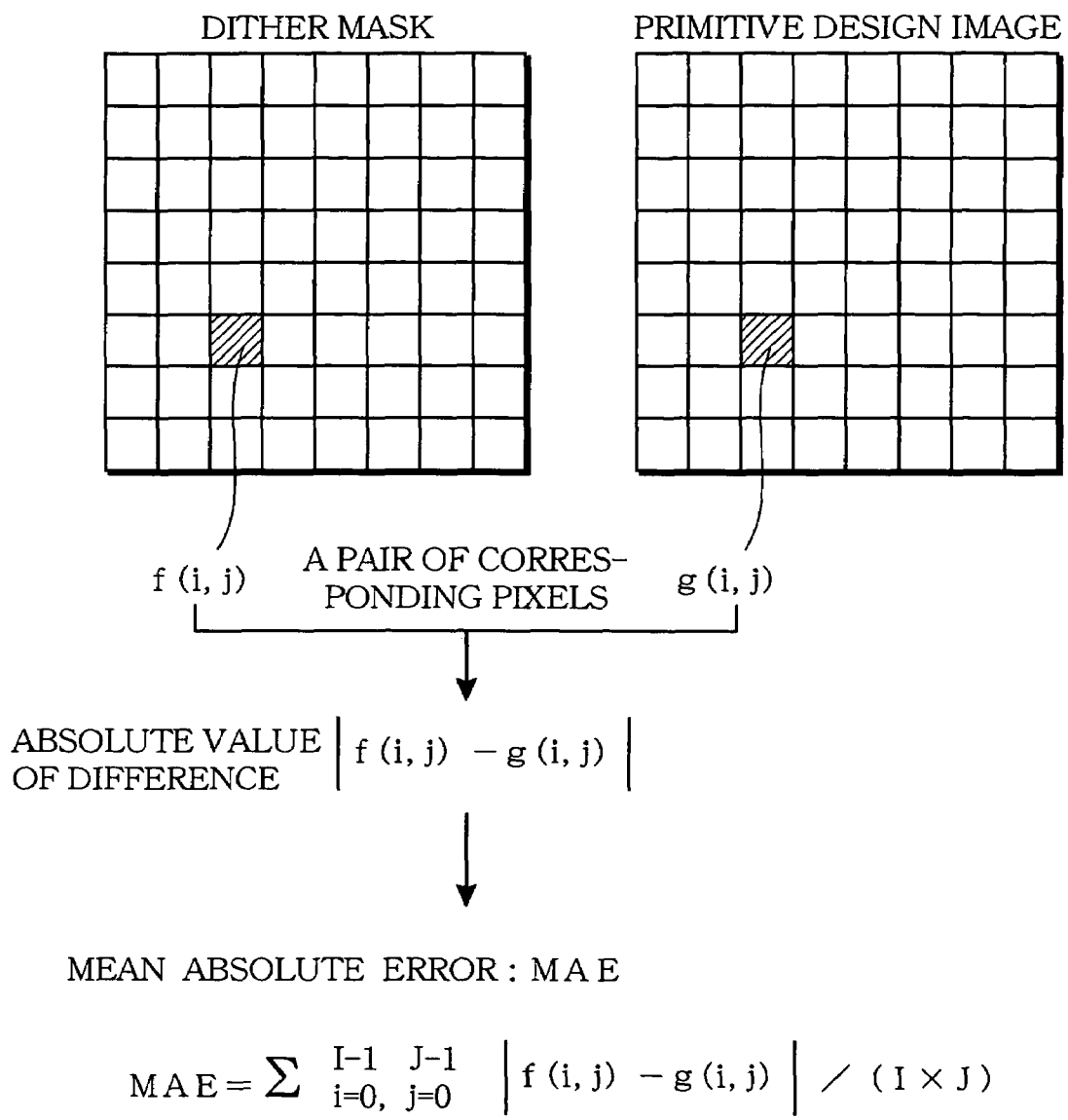
FIG. 33 is a diagram, illustrating the principles of generating an art screen by this invention.

To be more specific, a primitive design image having the same pixel array as the pixel array of a single block that makes up a dither mask is prepared as shown in FIG. 33. The pixel array of a single block that makes up the dither mask shown at the left side of FIG. 33 is the data of the single block in the dither mask that is in the process of being generated and is stored inside mask storage unit 1 and the primitive design image shown at the right side of FIG. 33 is image data stored in primitive design image storage unit 8. The absolute value of the difference of pixel values is then determined for a pair of corresponding pixels at mutually corresponding positions of the pixel arrays. With the example shown in FIG. 33, in order to determine the absolute value of the difference of the pixel values for a pair of pixels that are positioned at the i-th row and j-th column indicated by hatching in the Figure, the following computation is performed:

$$|f(i,j)-g(i,j)|$$

Here, $f(i, j)$ is the pixel value of the pixel at the dither mask side and $g(i, j)$ is the pixel value of the pixel at the primitive design image side.

Generally as an evaluation function for indicating the "difference" between two different images, the mean absolute error MAE, such as indicated at the lower side of FIG. 33, is used. This mean absolute error MAE is determined by determining the above-described absolute value of the difference of pixel values of a pair of corresponding pixels for all pixels in a single block and dividing the total sum of these absolute values by the total number of pixels in the single block (I×J). Here, since it is sufficient that it be possible to ascertain a relative increase or decrease of the "difference," the division by the total number of pixels (I×J) may be omitted and it is thus sufficient to define an evaluation function E4 by the following formula:

$$E4=\Sigma_{i=0 \text{ to } I-1, j=0 \text{ to } J-1}|f(i,j)-g(i,j)|$$

In the above formula;

E4: function value of the evaluation function

I: total number of rows of the pixel array that makes up a single block

J: total number of columns of the pixel array that makes up a single block i: row number of the noted pixel in a single block (0, 1, 2, . . . , I–1)

j: column number of the noted pixel in a single block (0, 1, 2, . . . , J–1)

f(i, j): pixel value of the pixel of the i-th row and j-th column that makes up the dither mask g(i, j): pixel value of the pixel of the i-th row and j-th column that makes up the primitive design image In summary, the evaluation function E4 is a function that indicates the "difference" between a primitive design image and an image that is indicated by the pixel value configuration of a dither mask that is in the process of being generated, and theoretically, is a function that takes on a value of 0 or a positive value ($0 \leq E4 < \infty$). The closer this function value is to 0, the smaller the "difference," signifying that the image of the dither mask side that is in the process of being generated is similar to the primitive design image.

Thus by processing using the evaluation function E4 expressed by the above formula in step S3 shown in the flowchart of FIG. 16 (the branching at step S4 of this FIG. 16 is a branching process with which the target value is set to 0 as was mentioned above), the image on the dither mask that is in the process of being generated and is stored in mask storage unit 1 is gradually made similar to the primitive design image and a dither mask in which the primitive design image is embedded can thus be obtained.

For practical purposes, in the process of generating a dither mask that functions as an art screen as is being described in this §6, it is preferable to combine the method of generating a dither mask suited for offset printing that was described in §4. This is because a primitive design image can be expressed more clearly by arranging the individual dots to gather together as much as possible and making the areas of the individual halftone dots somewhat large. Thus for practical purposes, preferably in addition to the above-described evaluation function E4 (function indicating the "difference" with the primitive design image), the "function E1 that indicates the difference of the pixel values of a plurality of pixels that are positioned near each other," which was described in §4, is used as a sub-evaluation function Esub and the exchange judgment is made in consideration of both evaluation function E4 and sub-evaluation function Esub. In other words, the exchange judgment is made based on the policy of making the function values of both evaluation function E4 and sub-evaluation function Esub approach a target value of 0.

In actuality, it is sufficient to use a synthetic evaluation function $G = W_e \cdot E4 + W_s \cdot Esub$ (where We and Ws are parameters that indicate weight), which is defined as a weighted linear sum of evaluation function E4 and sub-evaluation function Esub, and make the exchange judgment based on whether or not the function value of the synthetic evaluation function G approaches a target value of 0 as a result of the exchange. That is, the above-described synthetic evaluation function G is theoretically a function that takes on a value of 0 or a positive value ($0 \leq G < \infty$), and the closer the function value is to 0, the smaller the "difference," signifying that a dither mask with a pixel value configuration that approximates the primitive design image can be realized. Thus by processing using the synthetic evaluation function G expressed by the above formula in step S3 shown in the flowchart of FIG. 16 (the branching at step S4 of this FIG. 16 is a branching process with which the target value is set to 0 as was mentioned above), a dither mask in which the primitive design image is embedded can be obtained.

Figure 34:
FIG. 34 is a plan view, showing an example of a primitive design image to be imbedded in an art screen.

Lastly, actual printing results obtained using dither masks (art screens) generated by processing using the above-described synthetic evaluation function G shall be described. First, the primitive design image used in the dither mask generation process is shown in FIG. 34. This primitive design image is a pattern comprising the characters "dp" and the black parts are made up of pixels of pixel value of 0 and the white parts are made up of pixels of pixel value of 255. A dither mask that is generated using such a primitive design image will have a pattern, comprising the characters "dp," embedded therein.

Figure 35:
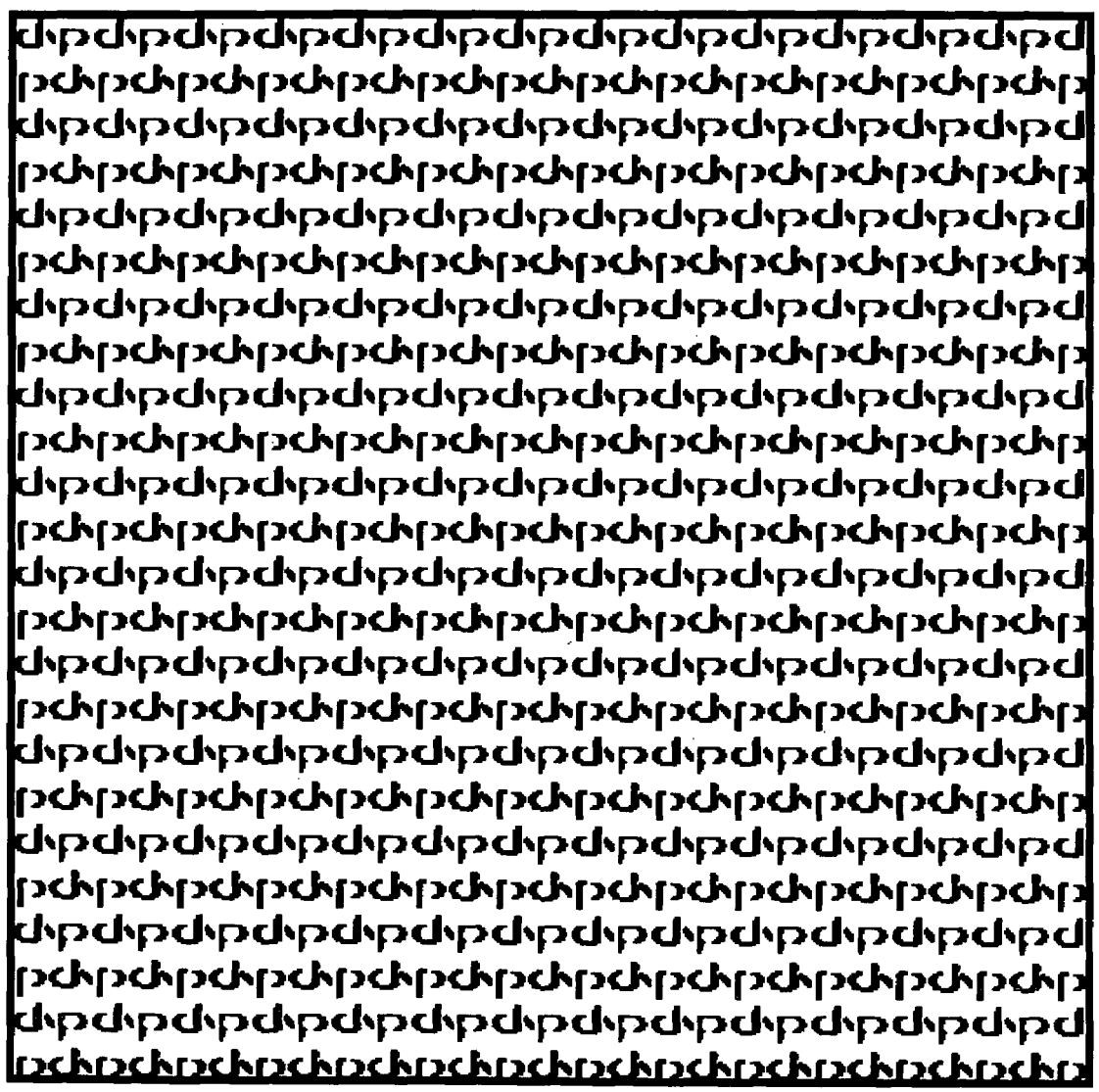
FIG. 35 is a plan view, showing the printing result of a halftone image obtained from an original image, comprising a gray pattern of single density, using an "art screen" by this invention as the dither mask.

Meanwhile, the printing result of FIG. 35 is a printing result of a halftone image obtained using, as an original image, an 8-bit tone (pixel values ranging from 0 to 225) continuous-tone image of a single-density pattern with which all pixel values P=192, and corresponds to being a printing result using the same original image as the printing result shown in FIG. 22, 23, or 30. The gray scale information that the area of the white part takes up approximately 192/255 of the entirety is expressed accurately, and yet the shape of each individual halftone dot is a pattern, comprising the characters "dp," and the primitive design image is expressed as it is.

Figure 36:
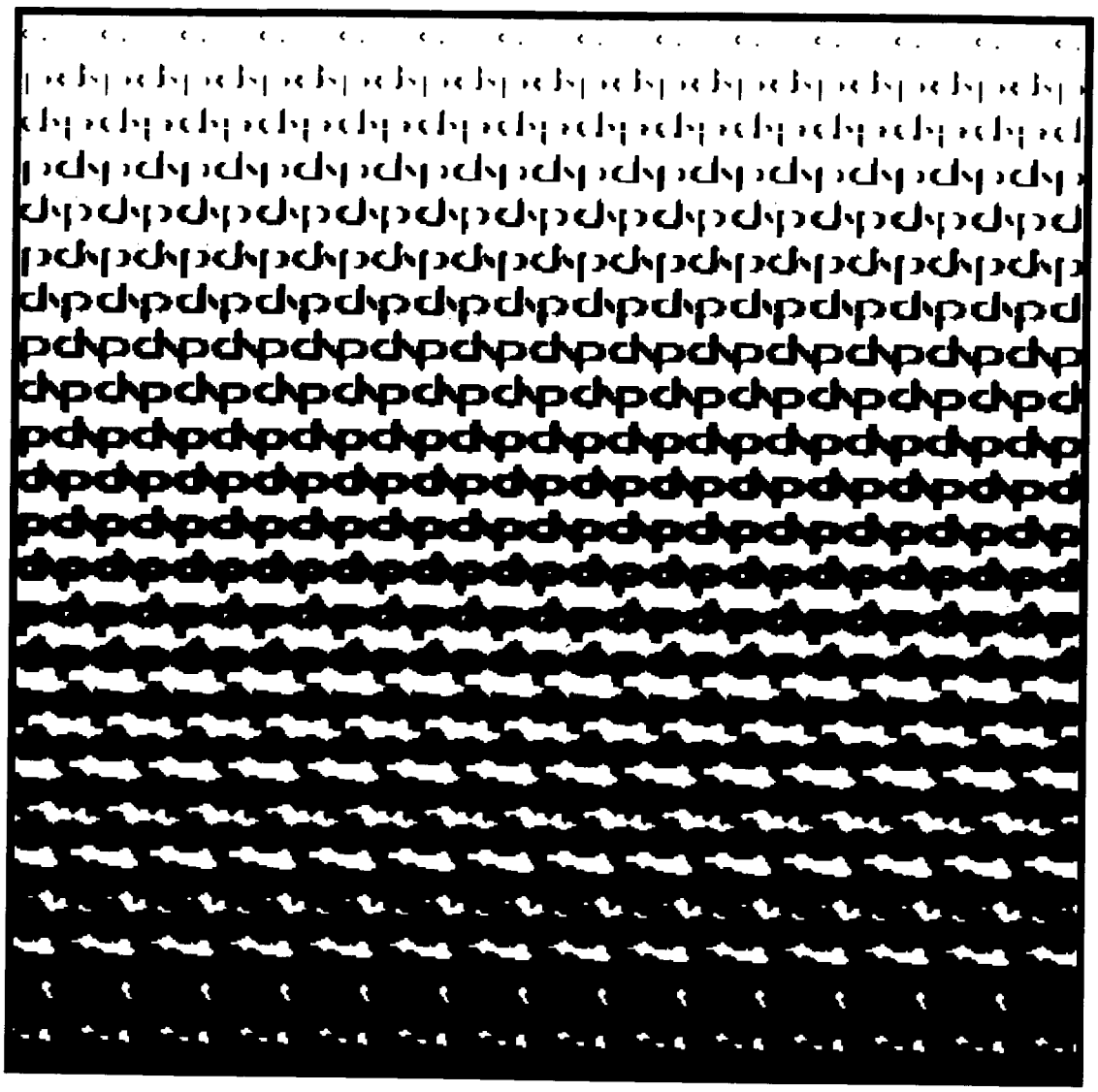
FIG. 36 is a plan view, showing the printing result of a halftone image obtained from an original image, comprising a gradation pattern such as that shown at the left side of FIG. 1, using an "art screen" by this invention as the dither mask.

Meanwhile, the printing result of FIG. 36 is a printing result of a halftone image obtained using, as an original image, an 8-bit tone (pixel values ranging from 0 to 225) continuous-tone image of a gradation pattern (for example, a pattern such as that of the continuous-tone image 100 shown in FIG. 1) with which the pixel values are varied gradually in the range of P=0 to 255 in the up/down direction and corresponds to being a printing result using the same original image as the printing result shown in FIG. 24, 25, or 31. As shown in the Figure, the gradation pattern in the up/down direction is expressed accurately and yet the shape of each individual halftone dot is a pattern, which comprises the characters "dp" and expresses the primitive design image.

Though examples wherein the evaluation function E1, described in §4, is used as sub-evaluation function Esub were described here, the evaluation function E2 or E3, described in §5, may also be used as sub-evaluation function Esub.

<<<§7. Practical Methods of Block Partitioning and Initial Pixel Value Determination>>>

As was described above, in step S1, which is a preparation step in the procedures shown in the flowchart of FIG. 16, the defined pixel array M is partitioned into blocks and in the subsequent step S2, initial pixel value determination is performed for each pixel. Here, practical methods for this block partitioning process and initial pixel value determination process shall be described.

With the embodiments described up until now, a pixel array with a 256×256 size was prepared as pixel array M, and this was partitioned into 16 parts in each of the vertical and horizontal directions to define a total of 256 blocks as shown in FIG. 17. Any single block B(u, v) thus became a pixel array having a 16×16 size and made up of 256 pixels. Such a block arrangement is convenient for preparing a dither mask used in the conversion of a continuous-tone image in which an 8-bit tone expression is carried out. That is, since 8-bit tones are expressed by 256 types of pixel values from 0 to 255, the pixel values that make up a dither mask will be of 255 types from 0 to 254 or 1 to 255. Thus by using blocks, each of which is made up of 256 pixels, mutually differing initial pixel values can be defined for all pixels, except for a single odd pixel, and the frequencies of occurrence of the respective pixel values (in the present case, a frequency of once each) can thus be made uniform.

Furthermore, even when a single block is arranged from a pixel array with which the number of pixels contained is an integer multiple of 256, such a case may be handled in substantially the same manner as the embodiments that have been described up until now. For example, though the block B(u, v) shown at the lower side of FIG. 17 is of a 16×16 size, when two such blocks are aligned to form a pixel array of 32×16 size and this is defined as a single block, by allocating each of the 255 types of pixel values twice as the initial pixel values, the frequencies of occurrence of the respective pixel values (in the present case, a frequency of twice each) can be made uniform with the exception of two odd pixels. Likewise when a pixel array of 32×32 size is defined as a single block, by allocating each of the 255 types of pixel values four times as the initial pixel values, the frequencies of occurrence of the respective pixel values (in the present case, a frequency of four times each) can be made uniform with the exception of four odd pixels. Since the exchange of pixel values in the subsequent processes will always be carried out within the range of a single block, as long as the frequencies of occurrence are uniform in regard to the initial pixel values, this uniformity will be maintained to the end of the processes.

Consequently, the generation of a dither mask to be used for a continuous-tone image having 8-bit pixel values can be handled upon defining a unit cell having 256 pixels and defining blocks, each of which contains one or a plurality of such unit cells. Then, in the initial pixel value determination step, the total of 255 types of pixel values, corresponding to pixel values in the range of 0 to 254 or pixel values in the range of 1 to 255, are made to be respectively written into predetermined positions for the 255 pixels of the 256 pixels of each unit cell and any one pixel value among the 255 types of pixel values is made to be written for the remaining one odd pixel. Since a single block contains n such unit cells, the frequencies of occurrence of the respective pixel values will be n times with the exception of the odd pixels, and substantially uniform frequencies of occurrence will thus be secured. The embodiments that have been described up until now correspond to the case where n=1 and a single block is made up of a single unit cell.

Though examples of the case wherein the continuous-tone image that is provided as the original image is an image with 8-bit pixel values have been described above, generally in order to generate a dither mask to be used for the conversion of a continuous-tone image with W-bit pixel values to a halftone image with 1-bit pixel values, block partitioning is performed so that each individual block contains one or a plurality of unit cells with $2^w$ pixels. And in the initial pixel value determination step, a total of $(2^w-1)$ types of pixel values, corresponding to pixel values in the range of 0 to $(2^w-2)$ or pixel values in the range of 1 to $(2^w-1)$, are made to be respectively written into predetermined positions for $(2^w-1)$ pixels among the $2^w$ pixels of each unit cell, and for the remaining odd pixels, any one pixel value among the total of $(2^w-1)$ pixel values is made to be written redundantly.

With regard to the odd pixels, by making the frequency of occurrence of the pixel value written into the odd pixel of each of the plurality of unit cells uniform for each of the total of $(2^w-1)$ pixel values, the uniformity of pixel values within a single block can be increased even further. For example, when a single block is made up of a set of n (n>1) unit cells, since one odd pixel arises for each unit cell, there will be a total of n odd pixels. If the same initial pixel value is allocated to all of these n odd pixels, the uniformity of the frequencies of occurrence of the pixel values within a single block will be lowered. Thus making the frequencies of occurrence uniform even for the initial pixel values allocated to these n odd pixels, the uniformity of the frequencies of occurrence of pixel values within a single block can be increased further.

Also, the above-described unit cell does not necessarily have to be a square pixel array. For example, though a unit cell comprising a square pixel array will be defined if a cell of a 16×16 size is used as a unit cell that contains 256 pixels, a unit cell that is defined to have an 8×32 size or a 4×64 size maybe handled in the same manner. However, in terms of securing the isotropy of the pixel value configuration of a dither mask, a unit cell comprising a square pixel array is preferably defined. Generally in the case where a dither mask, to be used for a continuous-tone image having W-bit pixel values, is to be generated, it is convenient to define a unit cell comprising a square pixel array in which $2^{w/2}$ pixels are aligned along one side.

Primarily speaking, the frequencies of occurrence of the initial pixel values allocated to the pixels in a single block are preferably completely uniform. For example, with the dither mask 10 shown in FIG. 4, the frequencies of occurrence of the 15 types of pixel values from 0 to 14 are all once with the exception of the pixel value of 13 and the frequency of occurrence of just the pixel value of 13 is twice. Thus strictly speaking, the frequencies of occurrence of the respective pixel values are not completely uniform. This is because despite there being a total of 16 pixels, there are only 15 types of pixel values that can be allocated as initial pixel values, thus giving rise to the odd pixel indicated by *. Such a circumstance applies likewise to a block (unit cell) of 16×16 size, such as shown in the lower side of FIG. 17. That is, despite there being a total of 256 pixels, since there are only 255 types of pixel values that can be allocated as initial pixel values, one odd pixel will arise and the frequencies of occurrence of the respective pixel values cannot be made completely uniform. When the uniformity of the frequencies of occurrence of the respective pixel values is thus lowered, the gray scale information of the original image cannot be reproduced strictly and in some cases, non-uniformity may arise in the tone reproduction and the quality of the halftone image may be lowered.

In order to make the frequencies of occurrence of the respective pixel values completely uniform, the number of variations of pixel values that can be allocated as initial pixel values is matched with the number of pixels within a unit cell. When these are matched, an odd pixel will not arise and the frequencies of occurrence of the respective pixel values in a unit cell will become completely uniform. That is, if a dither mask to be used for the conversion of a continuous-tone image with W-bit pixel values into a halftone image with 1-bit pixel values is to be generated, first, block partitioning is performed so that each individual block will contain one or a plurality of unit cells with $(2^w-1)$ pixels. And in the initial pixel value determination step, a total of $(2^w-1)$ types of pixel values, corresponding to pixel values in the range of 0 to $(2^w-2)$ or pixel values in the range of 1 to $(2^w-1)$, are respectively written into predetermined positions of each unit cell.

For example, if a dither mask, which is to be used for a continuous-tone image with 8-bit pixel values, is to be generated, block partitioning is performed so that a single block will contain one or a plurality of unit cells having 255 pixels. Then by writing each of 255 types of pixel values in the range of 0 to 254 or 1 to 255 once each as an initial pixel value into the each predetermined pixel, initial pixel values can be allocated to all pixels without giving rise to an odd pixel.

However, when the arranging of a single block from a plurality of unit cells, the arranging of a single dither mask from a plurality of blocks, and the performing of threshold processing while moving a single dither mask horizontally and vertically across an original image are considered, each individual unit cell, individual block, and single dither mask preferably have a rectangular pixel array arrangement. In the examples that have been described above, the pixel array of a single block was set to a 4×4 size or a 16×16 size for the sake of arranging a rectangular pixel array.

Consequently, in the case of generating a dither mask to be used for a continuous-tone image with W-bit pixel values, it will extremely convenient if a unit cell, having ($2^w-1$) pixels and yet having a rectangular pixel array, can be defined. For example in the case of W=4, a unit cell with 15 pixels and yet with a rectangular pixel array is preferably defined. To be more specific, by defining a unit cell with a rectangular pixel array arrangement of a 1×15, 3×5, 5×3, or 15×1 size and writing initial pixel values within the range of 0 to 14 or 1 to 15 once each into the total of 15 pixels, respectively, an odd pixel will not arise.

Figure 37:
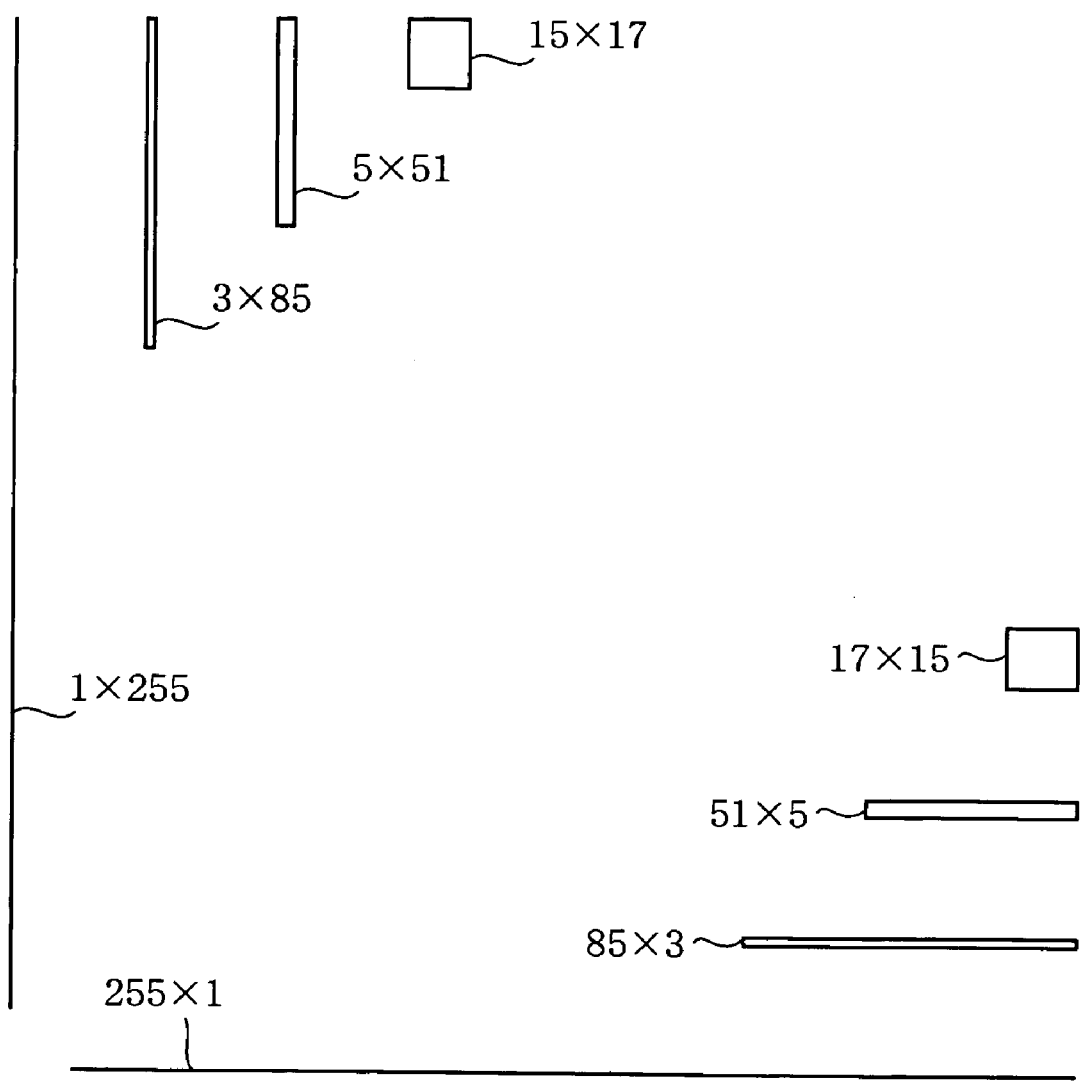
FIG. 37 is a plan view, showing variations of rectangular pixel arrays with 255 pixels.

Likewise, in the case of W=8, a unit cell with 255 pixels and yet with a rectangular pixel array is preferably defined. To be more specific, by defining a unit cell with a rectangular pixel array arrangement of a 1×255, 3×85, 5×51, 15×17, 17×15, 51×5, 85×3, or 255×1 size and writing initial pixel values within the range of 0 to 254 or 1 to 255 once each into the total of 255 pixels, respectively, an odd pixel will not arise. FIG. 37 is a plan view showing variations of a rectangular pixel array with 255 pixels.

Though with the example shown in FIG. 17, a single dither mask is arranged from a pixel array M of 256×256 size and this is partitioned into 16 parts vertically and horizontally to arrange a total of 256 blocks, in the case where an abovementioned block of 15×17 size or 17×15 size is to be used, it will be convenient to arrange a single dither mask from a pixel array M of 255×255 size. That is since 255=15×17, by partitioning the pixel array M of 255×255 size into 15 parts vertically and 17 parts horizontally or into 15 parts horizontally and 17 parts vertically, a total of 255 blocks of 15×17 size or 17×15 size will be formed. Put in another way, a pixel array M of 255×255 size can be arranged by laying 255 blocks of 15×17 size or 17×15 size.

Also, since 255=5×51, by partitioning the pixel array M of 255×255 size into 5 parts vertically and 51 parts horizontally or into 51 parts horizontally and 5 parts vertically, a total of 255 blocks of 5×51 size or 51×5 size will be formed. Likewise, since 255=3×85, by partitioning the pixel array M of 255×255 size into 3 parts vertically and 85 parts horizontally or into 85 parts horizontally and 3 parts vertically, a total of 255 blocks of 3×85 size or 85×3 size will be formed, and since 255=1×255, by partitioning the pixel array M of 255×255 size into 1 part vertically and 255 parts horizontally or into 255 parts horizontally and 1 part vertically, a total of 255 blocks of 1×255 size or 255×1 size will be formed. Thus in the case of W=8, it can be said that a pixel array M of 255×255 size is pixel array of extremely convenient size for not giving rise to an odd pixel. <<<§8. Printing of Halftone Image>>>

A dither mask 10 that has been obtained by this invention's generation method is used in an image conversion device (threshold processing device) 20, such as shown in FIG. 2, to perform the process of converting a continuous-tone image 100, which is to be an original image, to a halftone image 200. Here the actual entities of all of dither mask 10, continuous-tone image 100, and halftone image 200 are information, that is, image data of pixel arrays having predetermined pixel values. These image data can thus be recorded in a magnetic disk, optical disk, or other storage medium that can be read by a computer and can be read out and used as necessary from such a recording medium by use of a computer.

Actually, a halftone image converted by threshold processing using a dither mask is first obtained in the form of digital image data and can be expressed on printed matter using a general DTP (Desk Top Publishing) process. Here, the results of preparing halftone images using four different types of dither masks on the same original image and printing these halftone images are shown in FIG. 38 through FIG. 41. Though all of these printing results are printing results (output by a toner type page printer for personal computer) of halftone images prepared based on the same original image (a continuous-tone image with 8-bit pixel values) of a half-figure of a woman, they differ in the size, shape, and distribution of halftone dots and are thus images that respectively provide a unique impression.

Figure 38:
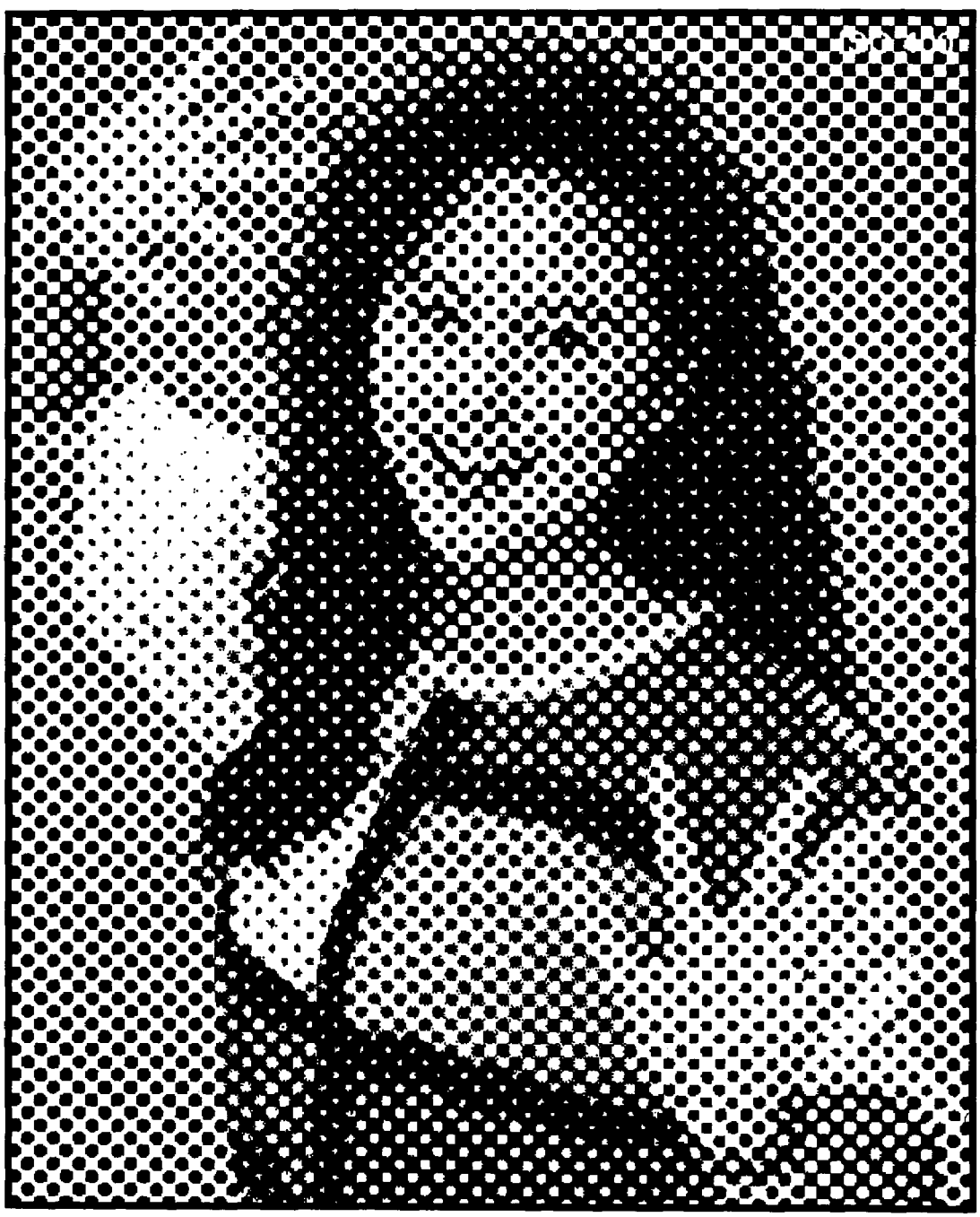
FIG. 38 is a plan view, showing the printing result of a halftone image obtained from an original image, comprising a half-figure of a woman, using a prior-art "AM screen" as the dither mask.

First, the printing result shown in FIG. 38 is that of a halftone image obtained using a general, prior-art "AM screen" as the dither mask and is expressed by substantially circular halftone dots of comparatively large areas. As can be seen here, in the halftone image obtained using a general "AM screen", periodicity of halftone dot configuration is observed so as to cause a problem of moire pattern, etc., as mentioned before.

Figure 39:
FIG. 39 is a plan view, showing the printing result of a halftone image obtained from an original image, comprising a half-figure of a woman, using an "offset printing mask" by this invention as the dither mask.

Meanwhile, the printing result shown in FIG. 39 is that of a halftone image obtained using a dither mask (dither mask suited for offset printing) that was generated by this invention's method described above in §4. Here, the individual halftone dots have a free shape and are randomly positioned. Therefore, periodicity of the halftone dots is completely eliminated and there is no factor to cause a problem of moire pattern, etc.

Figure 40:
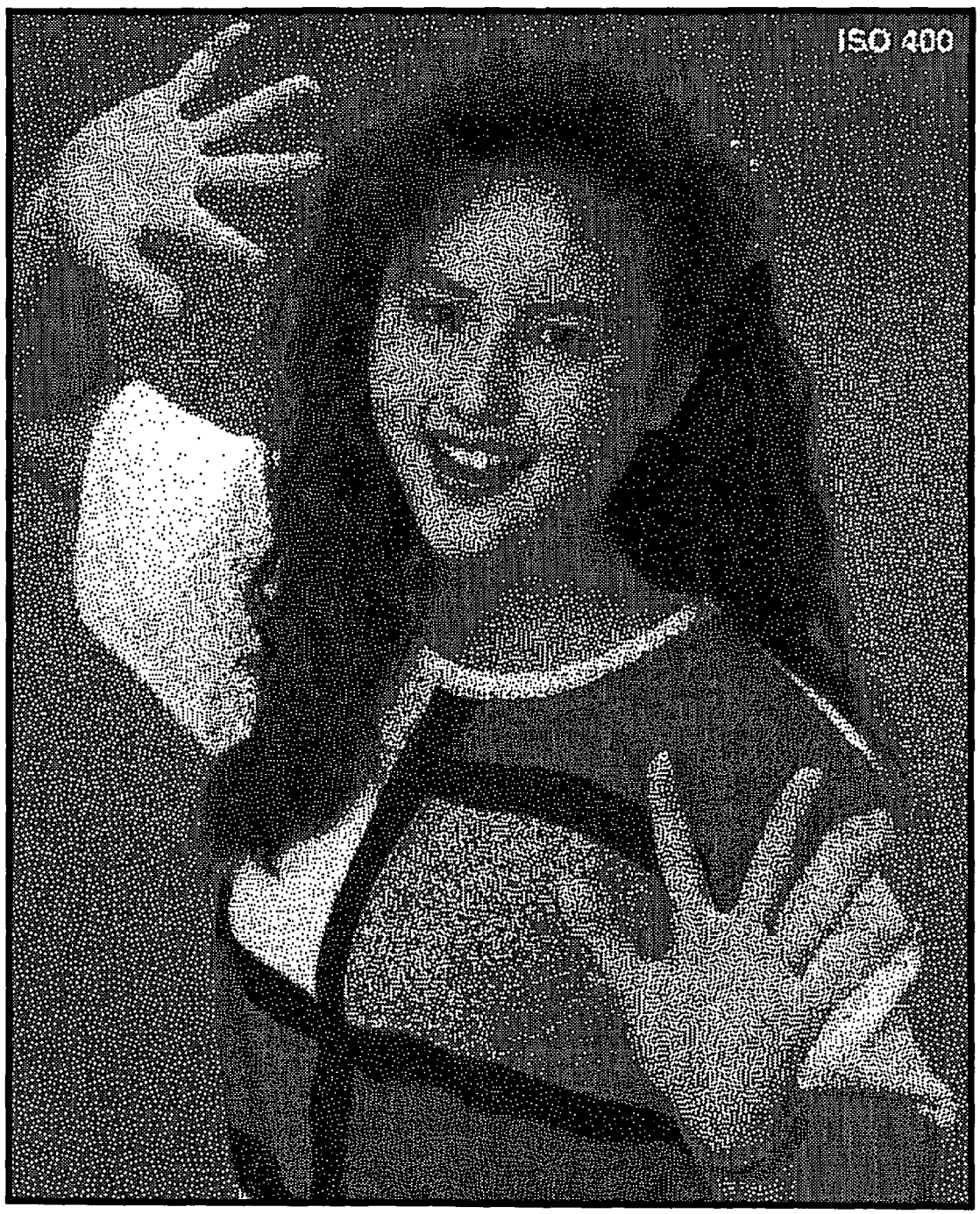
FIG. 40 is a plan view, showing the printing result of a halftone image obtained from an original image, comprising a half-figure of a woman, using an "ink jet printer mask" by this invention as the dither mask.

The printing result shown in FIG. 40 is that of a halftone image obtained using a dither mask (dither mask suited for printing by an ink jet printer) that was generated by this invention's method described above in §5. The individual halftone dots are all small in area and dispersed and a granular texture can be reduced even if printing by an ink jet printer is performed.

Figure 41:
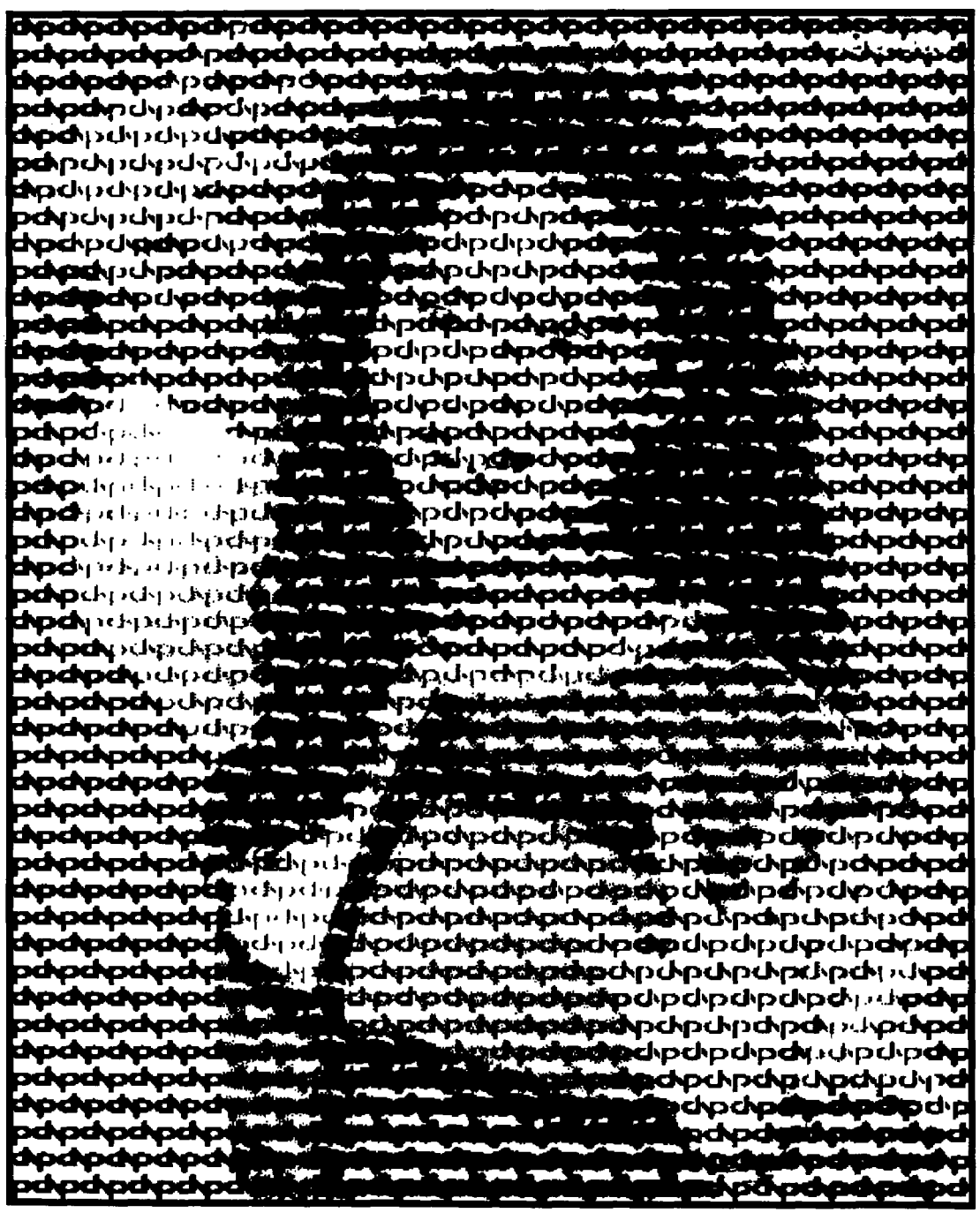
FIG. 41 is a plan view, showing the printing result of a halftone image obtained from an original image, comprising a half-figure of a woman, using an "art screen" by this invention as the dither mask.

The last printing result shown in FIG. 41 is that of a halftone image obtained using a dither mask, that is, an art screen that was generated by this invention's method described above in §6 (the method using the synthetic evaluation function G). Since a primitive design image, such as that shown in FIG. 34, is embedded in this art screen, this primitive design image appears as a pattern on the halftone image that is obtained as well, given rise to a unique effect.

For the sake of description, the printed matter of FIG. 38 through FIG. 41 shown here show halftone images obtained using dither masks that were prepared using special settings so that the individual halftone dots will be of sizes that can be observed by the naked eye, and with an actual printed matter, the individual halftone dots will be expressed as dots that are so fine that they cannot be observed by the naked eye. That is, the halftone dots of the printed matter shown here illustrate conditions wherein the halftone dots of a proper printed matter are magnified by a magnifying glass.

Also, though only the printing results of monochromatic images are shown here, dither masks generated by this invention's method can obviously be used in processes of converting multi-color continuous-tone images into multi-color halftone images. In such a case, a threshold process using a dither mask is performed on each of color separated images for the respective color components of the multi-color continuous-tone image to obtain a halftone image for each color component, and multi-color printing based on these halftone images is performed. For the color separated images of the respective color components, the same dither mask may be applied in common or each of a plurality of different dither masks may be applied separately and independently. In the case of offset printing, preferably a plurality of different dither masks are generated by varying the evaluation function and parameter settings and these dither masks are applied separately and independently to color separated images in accordance with respective color components. By doing so, it is possible to obtain the similar effect to altering angles of contact screens depending on the respective printing colors in the offset printing and to almost completely restrain the incidence of moire pattern or Rosette pattern. In addition, the ink transfer will be good and a printed matter having a high-quality, multi-color halftone image that faithfully reproduces the gray scale information of the original image can be obtained. <<<§9. Other Modification Examples>>>

Though this invention has been described above by way of several embodiments, this invention is not limited to these embodiments and may be carried out in various other modes. Some modification examples shall be described below.

(1) With the embodiments described thus far, a pair of exchange target pixels were selected randomly from the pixels in a single block stored in mask storage unit 1, whether or not exchange of pixel values between these pair of exchange target pixels should be performed was judged, and the pixel values were exchanged if it was judged that the exchange should be performed. However, in carrying out this invention, the exchange of pixel values does not necessarily have to be carried out between a pair of pixels (between a single pixel and another single pixel). In essence, with this invention, a plurality of exchange target pixels may be selected at random from the pixels in a single block and any exchange method may be used as long as a some method for exchanging pixel values among the selected plurality of exchange target pixels can be defined.

For example, a method may be employed wherein a first group of pixels belonging to a pixel array with a 3×3 size (all 9 pixels) and a second group of pixels likewise belonging to a pixel array with a 3×3 size (all 9 pixels) are selected as exchange target pixels and the respective pixel values of the 9 pixels of the first group and the respective pixel values of the 9 pixels of the second group are exchanged. An exchange method may also be employed wherein the 3 pixels of a first pixel P(A), second pixel P(B), and third pixel P(C) are selected as exchange target pixels and the pixel values of the plurality of exchange target pixels are exchanged in a rotating manner such that the pixel value of pixel P(A) is allocated to pixel P(B), the pixel value of pixel P(B) is allocated to pixel P(C), and the pixel value of P(C) is allocated to pixel P(A). Needless to say, an exchange method may also be employed wherein exchange is performed in a rotating manner among the 3 groups of a plurality of pixels belonging to a group A, a plurality of pixels belonging to a group B, and a plurality of pixels belonging to a group C. Though there is thus a need to select at least two exchange target pixels, with which the exchange of pixel values is to be performed, any number of pixels may be selected from within a single block as long as two or more pixels are selected. Also, any form of exchange may be performed among the selected plurality of exchange target pixels.

However, in actuality, performing exchange of pixel values between a pair of exchange target pixels is most practical in that the merit of lightening the computation load, including that of the exchange judgment, is provided.

(2) Though examples using the synthetic evaluation function G=We·E+Ws·Esub were indicated as embodiments for generating "art screens" in §6, the method of using such a synthetic evaluation function is not limited to just the generation of an "art screen." Since the evaluation function to be used in this invention may essentially be any function as long as it is a function that can indicate characteristics of the pixel value configuration of the pixels in a single block, for practical purposes, the making of an exchange judgment using a synthetic evaluation function that combines a plurality of evaluation functions enables the generation of dither masks that suit more finely tuned needs.

For example, with regard to the generation of offset printing dither masks, though embodiments using the evaluation function E1 were described in §4, by using, for example, the evaluation function E2 that was described in §5 and defining the synthetic evaluation function G=W1·E1−W2·E2 (where W1 and W2 are parameters that indicate weights) and making exchange judgments using this synthetic evaluation function G, a dither mask with somewhat different characteristics than that which can be obtained using the evaluation function E1 solitarily can be obtained. Needless to say, dither masks of different characteristics can also be generated by changing the functions that are combined and changing the parameters that indicate weights. The number of functions to be synthesized may also be increased to three or more. In general, by defining a synthetic evaluation function G by the formula G=ΣWi·Ei, the synthetic evaluation function can be defined in the form of a linear sum in which the i-th function Ei is added at a proportion of the weight parameter Wi.

(3) Though in §4 to §6, examples of generating dither masks for conversion of continuous-tone images with 8-bit pixel values into halftone images were described, dither masks for continuous-tone images with pixel values besides those of 8 bits can obviously be prepared by this invention's method. With this invention, "continuous-tone image" essentially refers widely to an image with gray scale information that is to be converted to a binary image, and an image with 4-bit pixel values (16-tone image) also falls within the scope of the "continuous-tone image" that is subject to the dither mask generated by this invention's method.

INDUSTRIAL APPLICABILITY

This invention's dither mask generating method and generating device can be used widely in applications wherein a dither mask for conversion of a continuous-tone image to a halftone image is to be generated. In particular, this invention's dither mask generating method and generating device are useful for various printing applications, such as offset printing, and can also be used in special printing applications that make use of an art screen. Use in applications of image processing by a personal computer, printer, etc., is also possible.

The invention claimed is:

1. A method of generating a dither mask (10) which is used for conversion of a continuous-tone image (100) into a halftone image (200), said method comprising the steps of:

a preparation step (S1) for defining a pixel array (M) having a size in accordance with a dither mask to be generated and partitioning said pixel array into a plurality of blocks (B(u, v));

an initial pixel value determination step (S2) for determining an initial pixel value (f(i, j)) for respective pixels which are members of said pixel array, in a manner such that frequencies of occurrence of pixel values within a predetermined numerical value range that is required by said dither mask become uniform in each individual block;

a function value computation step (S3) for selecting a plurality of exchange target pixels at random from among pixels in a single block and computing function values of a predetermined evaluation function that indicates a characteristic of a pixel value configuration of pixels in said single block for two cases of performing exchange of pixel values among said plurality of exchange target pixels and not performing said exchange;

an exchange judgment step (S4, S5, S6) for judging whether or not the exchange of pixel values among said plurality of exchange target pixels should be performed by comparing said function values for the two cases; and a pixel value exchange step (S7) for performing a process of the exchange of pixel values among said plurality of exchange target pixels, when it has been judged in said exchange judgment step that the exchange should be performed;

wherein said function value computation step, said exchange judgment step and said pixel value exchange step are executed repeatedly for all blocks until a predetermined condition is met (S8, S9, S10) and the dither mask is generated by pixel values of said pixel array that is finally obtained.

2. The dither mask generating method according to claim 1, wherein:

in the exchange judgment step, a judgment that exchange should be performed is made if a function value of the evaluation function approaches a predetermined target value as a result of performing the exchange (S4), and if a function value of the evaluation function does not approach a predetermined target value as a result of performing the exchange (S4), a judgment that exchange should be performed is made based on a predetermined exchange probability (S5, S6) and said exchange probability is decreased in accordance with the number of times of repetitions (S9).

3. The dither mask generating method according to claim 2, wherein:

an initial value of a temperature parameter Tn (0<Tn) and a temperature decrease factor $\alpha$ (0<$\alpha$<1) are set in advance, a process of renewing a value of the temperature parameter Tn with anew value of Tn×$\alpha$ is performed each time the number of repetitions increases, and the exchange probability P is determined by the formula of P=exp(-|$\Delta$E|/Tn), where $\Delta$E is a difference in function values for the two cases.

4. The dither mask generating method according to claim 1 wherein:

a function, which indicates a difference of pixel values of a plurality of pixels that are positioned near each other, is used as the evaluation function and exchange judgment is made based on whether or not a function value approaches a target value of 0 as a result of the exchange.

5. The dither mask generating method according to claim 4, wherein:

a function, which determines "an absolute value of a difference between pixel values of a noted pixel and another pixel adjacent said noted pixel" for each of all pixels within a single block as being a noted pixel and then indicates a sum of determined values, is used as the evaluation function.

6. The dither mask generating method according to claim 4, wherein:

a function, which determines "an absolute value of two-dimensional Laplacian for a pixel in the case where a pixel value configuration within a single block is expressed by a function f(x, y) in a two-dimensional xy-coordinate system" for each of all pixels within a single block and then indicates a sum of determined values, is used as the evaluation function.

7. The dither mask generating method according to claim 4, wherein:

a two-dimensional xy-coordinate system having an x-axis and a y-axis as coordinate axes is defined on the pixel array and a function, which determines "with respect to a noted pixel, a sum of absolute values of one-dimensional Laplacians for four axial directions of the x-axis direction, the y-axis direction, and two axial directions that form a 45° angle with respect to the coordinate axes" for each of all pixels within a single block and then indicates a total sum of determined sums, is used as the evaluation function.

8. The dither mask generating method according to claim 7, wherein:

a function expressed by the following formula is used as the evaluation function:

$$E = \Sigma_{i=0 \text{ to } I-1, j=0 \text{ to } J-1}$$

$$|2f(i, j) - f(i-1, j) - f(i+1, j)| +$$
$$|2f(i, j) - f(i, j-1) - f(i, j+1)| +$$
$$|2f(i, j) - f(i-1, j-1) - f(i+1, j+1)| +$$
$$|2f(i, j) - f(i+1, j-1) - f(i-1, j+1)|$$

wherein

E: function value of the evaluation function

I: total number of rows of a pixel array that makes up a single block

J: total number of columns of the pixel array that makes up the single block i: row number of a noted pixel in the single block (0, 1, 2, . . . , I–1)

j: column number of the noted pixel in the single block (0, 1, 2, . . . , J–1)

f(i, j): pixel value of a pixel of i-th row and j-th column.

9. The dither mask generating method according to claim 1, wherein:

a function, which indicates a difference of pixel values of a plurality of pixels that are positioned near each other, is used as the evaluation function and exchange judgment is made based on whether or not a function value approaches a target value of $\infty$ as a result of the exchange.

10. The dither mask generating method according to claim 9, wherein:

a function, which determines "an absolute value of a difference between pixel values of a noted pixel and another pixel positioned near said noted pixel" for each of all pixels within a single block as being a noted pixel and then indicates a sum of determined values, is used as the evaluation function.

11. The dither mask generating method according to claim 10, wherein:
a function, which defines, for a noted pixel, a plurality of near pixels that are positioned near said noted pixel, determines "a sum of absolute values of differences between pixel values of said noted pixel and said near pixels," for each of all pixels within a single block as being a noted pixel, and then indicates a total sum of determined sums, is used as the evaluation function.

12. The dither mask generating method according to claim 11, wherein:
a function expressed by the following formula is used as the evaluation function:

$$E = \Sigma_{i=0\ to\ I-1,\ j=0\ to\ J-1} \Sigma_{k=-q\ to\ q,\ m=-q\ to\ q} |f(i,j) - f(i+k, j+m)|$$

wherein
E: function value of the evaluation function
I: total number of rows of a pixel array that makes up a single block
J: total number of columns of the pixel array that makes up the single block
i: row number of a noted pixel in the single block (0, 1, 2, . . . , I–1)
j: column number of the noted pixel in the single block (0, 1, 2, . . . , J–1)
k: separation from the noted pixel in the row direction (number of pixels)
m: separation from the noted pixel in the column direction (number of pixels)
q: parameter that sets a range of near pixels (number of pixels)
f(i, j): pixel value of a pixel of i-th row and j-th column.

13. The dither mask generating method according to claim 11, wherein:
a function expressed by the following formula is used as the evaluation function:

$$E = \Sigma_{i=0\ to\ I-1,\ j=0\ to\ J-1} \Sigma_{k^2+m^2 \leq r^2} |f(i,j) - f(i+k, j+m)|$$

wherein
E: function value of the evaluation function
I: total number of rows of a pixel array that makes up a single block
J: total number of columns of the pixel array that makes up the single block
i: row number of a noted pixel in the single block (0, 1, 2, . . . , I–1)
j: column number of the noted pixel in the single block (0, 1, 2, . . . , J–1)
k: separation from the noted pixel in the row direction (number of pixels)
m: separation from the noted pixel in the column direction (number of pixels)
r: parameter that sets a range of near pixels
f(i, j): pixel value of a pixel of i-th row and j-th column
$\Sigma k^2 + m^2 \leq r^2$ indicates a total sum concerning pixels within a circular region of radius r.

14. The dither mask generating method according to claim 1, wherein:
a function, which indicates a difference of a pixel value configuration in a single block that makes up the dither mask and a pixel value configuration of a priorly prepared primitive design image, is used as the evaluation function and exchange judgment is made based on whether or not a function value approaches a target value of 0 as a result of the exchange.

15. The dither mask generating method according to claim 14, wherein:
a primitive design image, which has a same pixel array as a pixel array of a single block that makes up the dither mask, is prepared, an absolute value of a difference between pixel values of a pair of corresponding pixels at mutually corresponding positions in the respective pixel arrays is determined for all pixels inside the single block and a function that indicates a sum of determined values is used as the evaluation function.

16. The dither mask generating method according to claim 15, wherein:
a function expressed by the following formula is used as the evaluation function:

$$E = \Sigma_{i=0\ to\ I-1,\ j=0\ to\ J-1} |f(i,j) - g(i,j)|$$

wherein
E: function value of the evaluation function
I: total number of rows of a pixel array that makes up a single block
J: total number of columns of the pixel array that makes up the single block
i: row number of a noted pixel in the single block (0, 1, 2, . . . , I–1)
j: column number of the noted pixel in the single block (0, 1, 2, . . . , J–1)
f(i, j): pixel value of a pixel of i-th row and j-th column of the dither mask
g(i, j): pixel value of a pixel of i-th row and j-th column of the primitive design image.

17. The dither mask generating method according to claim 14, wherein:
in addition to the evaluation function, a function, which indicates a difference of pixel values of a plurality of pixels that are positioned near each other, is used as a sub-evaluation function and whether or not a function value of said sub-evaluation function approaches 0 as a result of the exchange is added as a condition of the exchange judgment.

18. The dither mask generating method according to claim 17, wherein:
a function, which determines "an absolute value of a difference between pixel values of a noted pixel and another pixel adjacent said noted pixel" for each of all pixels within a single block as being a noted pixel and then indicates a sum of determined values, is used as the sub-evaluation function.

19. The dither mask generating method according to claim 17, wherein:
a function, which determines "an absolute value of two-dimensional Laplacian for a pixel in the case where a pixel value configuration within a single block is expressed by a function f(x, y) in a two-dimensional xy-coordinate system" for each of all pixels within a single block and then indicates a sum of determined values, is used as the sub-evaluation function.

20. The dither mask generating method according to claim 17, wherein:
a two-dimensional xy-coordinate system having an x-axis and a y-axis as coordinate axes is defined on the pixel array and a function, which determines "with respect to a noted pixel, a sum of absolute values of one-dimensional Laplacians for four axial directions of the x-axis direction, the y-axis direction, and two axial directions that form a 45° angle with respect to the coordinate axes" for each of all pixels within a single block and then indicates a total sum of determined sums, is used as the sub-evaluation function.

21. The dither mask generating method according to claim 20, wherein:
a function expressed by the following formula is used as the sub-evaluation function:

$$E\text{sub} = \Sigma_{i=0 \ to \ I-1, j=0 \ to \ J-1}$$

$$|2f(i, j) - f(i-1, j) - f(i+1, j)| +$$
$$|2f(i, j) - f(i, j-1) - f(i, j+1)| +$$
$$|2f(i, j) - f(i-1, j-1) - f(i+1, j+1)| +$$
$$|2f(i, j) - f(i+1, j-1) - f(i-1, j+1)|$$

wherein
Esub: function value of the sub-evaluation function
I: total number of rows of a pixel array that makes up a single block
J: total number of columns of the pixel array that makes up the single block
i: row number of a noted pixel in the single block (0, 1, 2, ..., I-1)
j: column number of the noted pixel in the single block (0, 1, 2, ..., J-1)
f(i, j): pixel value of a pixel of i-th row and j-th column.

22. The dither mask generating method according to claim 21, wherein:
a synthetic evaluation function $G = we \cdot E + ws \cdot E\text{sub}$ (where we and ws are parameters that indicate weight), which is defined as a linear sum of an evaluation function E and a sub-evaluation function Esub, is used and the exchange judgment is made based on whether or not a function value of said synthetic evaluation function G approaches a target value of 0 as a result of the exchange.

23. The dither mask generating method according to claim 1, wherein:
in order to generate a dither mask to be used for conversion of a continuous-tone image with w-bit pixel values to a halftone image with 1-bit pixel values,
in the preparation step, block partitioning is performed in a manner such that each individual block contains one or a plurality of unit cells with $2^w$ pixels,
in the initial pixel value determination step, a total of $(2^w-1)$ types of pixel values, corresponding to pixel values in a range of 0 to $(2^w-2)$ or pixel values in a range of 1 to $(2^w-1)$, are made to be respectively written into predetermined positions for $(2^w-1)$ pixels among the $2^w$ pixels of each unit cell, and for a remaining odd pixel, any one pixel value among the total of $(2^w-1)$ pixel values is made to be written.

24. The dither mask generating method according to claim 23, wherein:
frequencies of occurrence of pixel values that are respectively written into the odd pixel of each of the plurality of unit cells are made uniform for the total of $(2^w-1)$ pixel values.

25. The dither mask generating method according to claim 23, wherein:
a unit cell comprising a square pixel array in which $2^{w/2}$ pixels are aligned along one side is defined.

26. The dither mask generating method according to claim 1, wherein:
in order to generate a dither mask to be used for conversion of a continuous-tone image with w-bit pixel values to a halftone image with 1-bit pixel values,
in the preparation step, block partitioning is performed in a manner such that each individual block contains one or a plurality of unit cells with $(2^w-1)$ pixels,
in the initial pixel value determination step, a total of $(2^w-1)$ types of pixel values, corresponding to pixel values in a range of 0 to $(2^w-2)$ or pixel values in a range of 1 to $(2^w-1)$, are made to be respectively written into predetermined positions of each unit cell.

27. The dither mask generating method according to claim 26, wherein:
a unit cell with a rectangular pixel array arrangement having $(2^w-1)$ pixels is defined.

28. The dither mask generating method according to claim 27, wherein:
w=8 and a unit cell with a rectangular pixel array arrangement, selected from the group consisting of 1×255, 3×85, 5×51, 15×17, 17×15, 51×5, 85×3, or 255×1, is defined.

29. The dither mask generating method according to claim 1, wherein:
a Simulated Annealing Method is used in making judgment in the exchange judgment step.

30. The dither mask generating method according to claim 1, wherein:
a process using a Discrete Combinatory Optimization Method, selected from the group consisting of Genetic Algorithms, Great Deluge Algorithm, Ant Colony Algorithm, and Tabu Search Algorithm, is executed to gradually vary a pixel value configuration and make pixel values finally converge.

31. An image conversion device (20) which uses a dither mask that has been generated by a dither mask generating method according to claim 1 to convert a continuous-tone image into a halftone image.

32. A computer-readable recording medium, in which is recorded data of a pixel array that makes up a dither mask that has been generated by a dither mask generating method according to claim 1.

33. A computer-readable recording medium, in which is stored an image data of a halftone image obtained by performing a conversion process on a continuous-tone image using a dither mask that has been generated by a dither mask generating method according claim 1.

34. A printed matter prepared using image data according to claim 33.

35. A computer-readable recording medium, in which is stored an image data of a multi-color halftone image obtained by performing a conversion process on color separated images of respective color components of a multi-color continuous-tone image using a same dither mask that has been generated by a dither mask generating method according to claim 1.

36. A computer-readable recording medium, in which is stored an image data of a multi-color halftone image obtained by performing a conversion process on color separated images of respective color components of a multi-color continuous-tone image using dither masks generated by the dither mask generating method according to claim 1.

37. A dither mask generating device, which generates a dither mask (10) for conversion of a continuous-tone image (100) into a halftone image (200), said dither mask generating device comprising:
- a mask storage unit (1) which stores a pixel array (M) along with pixel values of individual pixels, said pixel array having a size that is in accordance with the dither mask to be generated;
- a block partitioning unit (2) which partitions the pixel array stored in said mask storage unit into a plurality of blocks (B(u, v));
- a random number generating unit (3) which has a function of generating predetermined random numbers and executes an initial pixel value determination process, by which for each pixel that is a member of said pixel array, pixel values (f(i, j)) are allocated randomly in a manner such-that frequencies of occurrence of the pixel values within a predetermined numerical value range that is deemed necessary for the dither mask are uniform in each individual block, and an exchange target pixel selection process, by which a plurality of exchange target pixels are selected randomly from among the pixels in a single block;
- an evaluation function value computing unit (4) which computes function values of a predetermined evaluation function that indicates a characteristic of a pixel value configuration of the pixels in a single block for two cases of a case where pixel values of said plurality of exchange target pixels are exchanged and a case where exchange is not performed;
- an exchange judgment unit (5) which compares function values determined for said two cases by said evaluation function value computing unit to judge whether or not pixel values should be exchanged among said plurality of exchange target pixels;
- a pixel value exchange unit (6) which performs a process of exchanging the pixel values among said plurality of exchange target pixels that are stored in said mask storage unit, when said exchange judgment unit makes a judgment that exchange should be performed; and
- a repetitive process unit (7) which performs control so that a process concerning a pixel exchange for a single block, that are executed by said random number generating unit, said evaluation function value computing unit, said exchange judgment unit, and said pixel value exchange unit, are executed repeatedly until a predetermined condition is satisfied with all blocks.

38. The dither mask generating device according to claim 37, wherein:
- a primitive design image storage unit (8) which stores image data that make up a primitive design image, is furthermore equipped and the evaluation function value computing unit (4) computes function values by using an evaluation function that indicates a degree of matching or a difference of an image, which is expressed by pixels in a single block that makes up the dither mask, and said primitive design image.

* * * * *